US012108181B2

United States Patent
Miyatani

(10) Patent No.: US 12,108,181 B2
(45) Date of Patent: Oct. 1, 2024

(54) IMAGING DEVICE, DISPLAY DEVICE, AND IMAGING SYSTEM

(71) Applicant: Sony Group Corporation, Tokyo (JP)

(72) Inventor: Yoshitaka Miyatani, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 205 days.

(21) Appl. No.: 17/769,764

(22) PCT Filed: Oct. 16, 2020

(86) PCT No.: PCT/JP2020/039053
§ 371 (c)(1),
(2) Date: Apr. 18, 2022

(87) PCT Pub. No.: WO2021/085173
PCT Pub. Date: May 6, 2021

(65) Prior Publication Data
US 2022/0377275 A1 Nov. 24, 2022

(30) Foreign Application Priority Data
Oct. 30, 2019 (JP) .................................. 2019-197022

(51) Int. Cl.
*H04N 25/778* (2023.01)
*B60R 1/26* (2022.01)
(Continued)

(52) U.S. Cl.
CPC ............. *H04N 25/778* (2023.01); *B60R 1/26* (2022.01); *B60R 1/28* (2022.01); *H04N 7/181* (2013.01);
(Continued)

(58) Field of Classification Search
CPC .... H04N 25/778; H04N 7/181; H04N 23/955; H04N 25/75; H04N 23/54; H04N 23/55;
(Continued)

(56) References Cited

U.S. PATENT DOCUMENTS

| 10,863,127 | B1 * | 12/2020 | Mohammed | ....... G02B 26/0833 |
| 11,449,294 | B2 * | 9/2022 | Lee | .......................... G06F 3/017 |
| 2009/0179142 | A1 * | 7/2009 | Duparre | ............ H01L 27/14605 |
|  |  |  |  | 438/69 |
| 2015/0036029 | A1 * | 2/2015 | Theuwissen | ........... H04N 23/67 |
|  |  |  |  | 348/273 |

(Continued)

FOREIGN PATENT DOCUMENTS

| JP | 2012-113605 A | 6/2012 |
| JP | 2016-523204 A | 8/2016 |

(Continued)

OTHER PUBLICATIONS

M. Salman Asif et al: "FlatCam: Thin, Bare-Sensor Cameras Using Coded Aperture and Computation", Aug. 31, 2015 (Aug. 31, 2015), 12 pgs., XP055250990, Retrieved from the Internet: URL: http://arxiv.org/pdf/1509.00116v2.pdf[retrieved on Feb. 17, 2016].

(Continued)

*Primary Examiner* — Albert H Cutler
(74) *Attorney, Agent, or Firm* — XSENSUS LLP

(57) ABSTRACT

An imaging device includes a plurality of pixels that receives incident light entering from an object after passing through neither an imaging lens nor a pinhole, and each outputs a detection signal indicating an output pixel value modulated in accordance with an incident angle of the incident light. The imaging device is attached to a vehicle so that a light receiving surface faces a side of the vehicle, and the average of the centroids of incident angle directivities indicating directivities of the plurality of pixels with respect to the incident angle of the incident light deviates in one direction from the center of the pixel. The present technology can be applied to an electronic sideview mirror, for example.

17 Claims, 43 Drawing Sheets

(51) Int. Cl.
- *B60R 1/28* (2022.01)
- *B60R 1/30* (2022.01)
- *H04N 7/18* (2006.01)
- *H04N 23/955* (2023.01)
- *H04N 25/75* (2023.01)

(52) U.S. Cl.
CPC .......... *H04N 23/955* (2023.01); *H04N 25/75* (2023.01); *B60R 1/30* (2022.01)

(58) Field of Classification Search
CPC ...... H04N 23/57; H04N 23/957; H04N 7/183; H04N 9/69; H04N 23/843; H04N 23/88; H04N 25/00; H04N 25/70; H04N 23/00; H04N 23/13; H04N 23/16; H04N 23/634; H04N 23/635; H04N 23/95; H04N 23/80; H04N 25/702; H04N 25/704; H04N 25/705; H04N 25/706; H04N 25/76; B60R 1/26; B60R 1/28; B60R 1/30; B60R 2300/802; B60R 2300/8066; B60R 1/25; B60R 1/00; B60R 2300/20; B60R 2300/30; B60R 1/006; B60R 2001/1238

See application file for complete search history.

(56) References Cited

U.S. PATENT DOCUMENTS

| | | | |
|---|---|---|---|
| 2017/0111558 A1* | 4/2017 | Brueckner | H04N 17/002 |
| 2017/0305365 A1* | 10/2017 | Matsumoto | G08G 1/16 |
| 2018/0035046 A1* | 2/2018 | Yuan | G02B 27/58 |
| 2019/0215473 A1* | 7/2019 | Miyatani | H04N 25/75 |
| 2020/0219947 A1* | 7/2020 | Yang | H10K 59/121 |
| 2020/0288076 A1 | 9/2020 | Kozuka | |

FOREIGN PATENT DOCUMENTS

| | | | | |
|---|---|---|---|---|
| WO | 2017/145348 A1 | | 8/2017 | |
| WO | WO-2018012492 A1 | * | 1/2018 | ............ G02B 5/00 |
| WO | 2019/054092 A1 | | 3/2019 | |
| WO | WO-2019106999 A1 | | 6/2019 | |

OTHER PUBLICATIONS

International Search Report and Written Opinion mailed on Nov. 24, 2020, received for PCT Application PCT/JP2020/039053, Filed on Oct. 16, 2020, 8 pages including English Translation.

* cited by examiner

FIG. 30
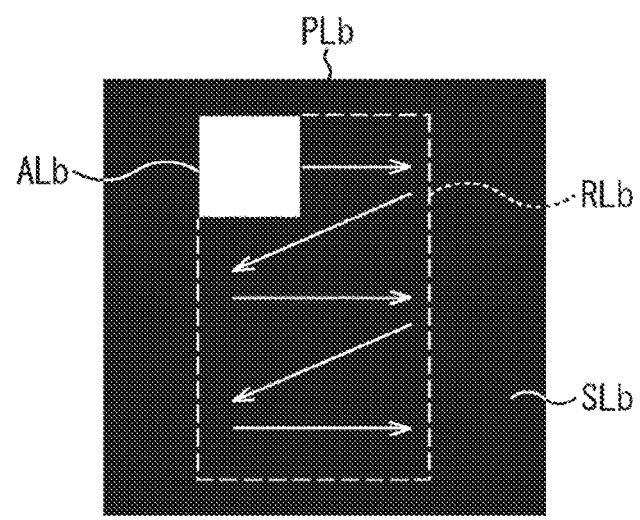
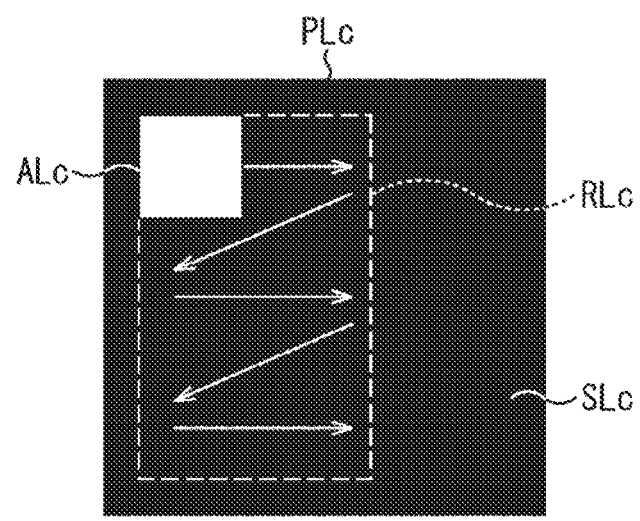

IMAGING DEVICE, DISPLAY DEVICE, AND IMAGING SYSTEM

CROSS-REFERENCE TO RELATED APPLICATIONS

The present application is based on PCT filing PCT/JP2020/039053, filed Oct. 16, 2020, which claims priority to Japanese Application No. 2019-197022, filed Oct. 30, 2019, the entire contents of each are incorporated herein by reference.

TECHNICAL FIELD

The present technology relates to an imaging device, a display device, and an imaging system, and more particularly, to an imaging device, a display device, and an imaging system that are suitable for use in forming an electronic sideview mirror of a vehicle.

BACKGROUND ART

Vehicles equipped with electronic sideview mirrors, instead of conventional sideview mirrors, have become widespread recently. An electronic sideview mirror is a system in which a camera captures an image of a range similar to a range reflected by a conventional sideview mirror, and the obtained image is displayed on a monitor installed in the vehicle (see Patent Documents 1 and 2, for example).

CITATION LIST

Patent Documents

Patent Document 1: Japanese Patent Application Laid-Open No. 2012-113605
Patent Document 2: JP 2016-523204 W

SUMMARY OF THE INVENTION

Problems to be Solved by the Invention

In Patent Documents 1 and 2, cameras are installed at positions similar to the installation positions of conventional door mirrors, and the cameras project externally rightward and leftward from the vehicle body. Therefore, like conventional door mirrors, the cameras might hinder passage through a narrow place, or might be damaged by contact or the like.

In a case where cameras are installed inside a vehicle to counter this problem, it is necessary to install the cameras diagonally with respect to the side windows of the vehicle so as to capture images of ranges similar to those of sideview mirrors. In this case, spaces are formed between the camera lenses and the side windows. Therefore, reflection on the side windows might occur.

On the other hand, if the camera lenses are brought close to the side windows to prevent reflection, the imaging direction is directed to the sides of the vehicle, which makes it difficult to capture a view diagonally behind the vehicle.

The present technology has been made in view of such circumstances, and aims to increase the degree of freedom in installation of an imaging apparatus that is used for an electronic sideview mirror.

Solutions to Problems

An imaging device according to a first aspect of the present technology includes a plurality of pixels that receives incident light entering from an object after passing through neither an imaging lens nor a pinhole, and each outputs a detection signal indicating an output pixel value modulated in accordance with an incident angle of the incident light. The imaging device is attached to a vehicle so that a light receiving surface faces a side of the vehicle, and the average of the centroids of incident angle directivities indicating directivities of the plurality of pixels with respect to the incident angle of the incident light deviates in one direction from the center of the pixel.

A display device according to a second aspect of the present technology is provided diagonally on the left side or the right side in front of the driver inside a vehicle, and includes: a display surface on which a plurality of display elements is aligned; and a plurality of pixels that is provided on the display surface, receives incident light entering from an object after passing through neither an imaging lens nor a pinhole, and each outputs a detection signal indicating an output pixel value modulated in accordance with an incident angle of the incident light.

An imaging system according to a third aspect of the present technology includes: an imaging device that includes a plurality of pixels that receives incident light entering from an object after passing through neither an imaging lens nor a pinhole, and each outputs a detection signal indicating an output pixel value modulated in accordance with an incident angle of the incident light, the imaging device being attached to a vehicle so that a light receiving surface faces a side of the vehicle, in which the average of the centroids of incident angle directivities indicating directivities of the plurality of pixels with respect to the incident angle of the incident light deviates in one direction from the center of the pixel; and a display unit that displays a restored image restored from a detection image based on the detection signals of the plurality of pixels.

In the first aspect of the present technology, imaging is performed in a direction deviating from a side of a vehicle.

In the second aspect of the present technology, an image is displayed by a plurality of display elements provided on the display surface, and the plurality of pixels provided on the display surface receives incident light entering from an object after going through neither an imaging lens nor a pinhole. Each of the pixels outputs a detection signal indicating an output pixel value modulated in accordance with an incident angle of the incident light.

In the third aspect of the present technology, imaging is performed in a biased direction from a side of a vehicle, and a restored image restored from a detection image obtained as a result of the imaging is displayed.

BRIEF DESCRIPTION OF DRAWINGS

FIG. 30 is a diagram showing an example of the light shielding pattern of the pixels shown in FIG. 29.

MODE FOR CARRYING OUT THE INTENTION

Figure 1:
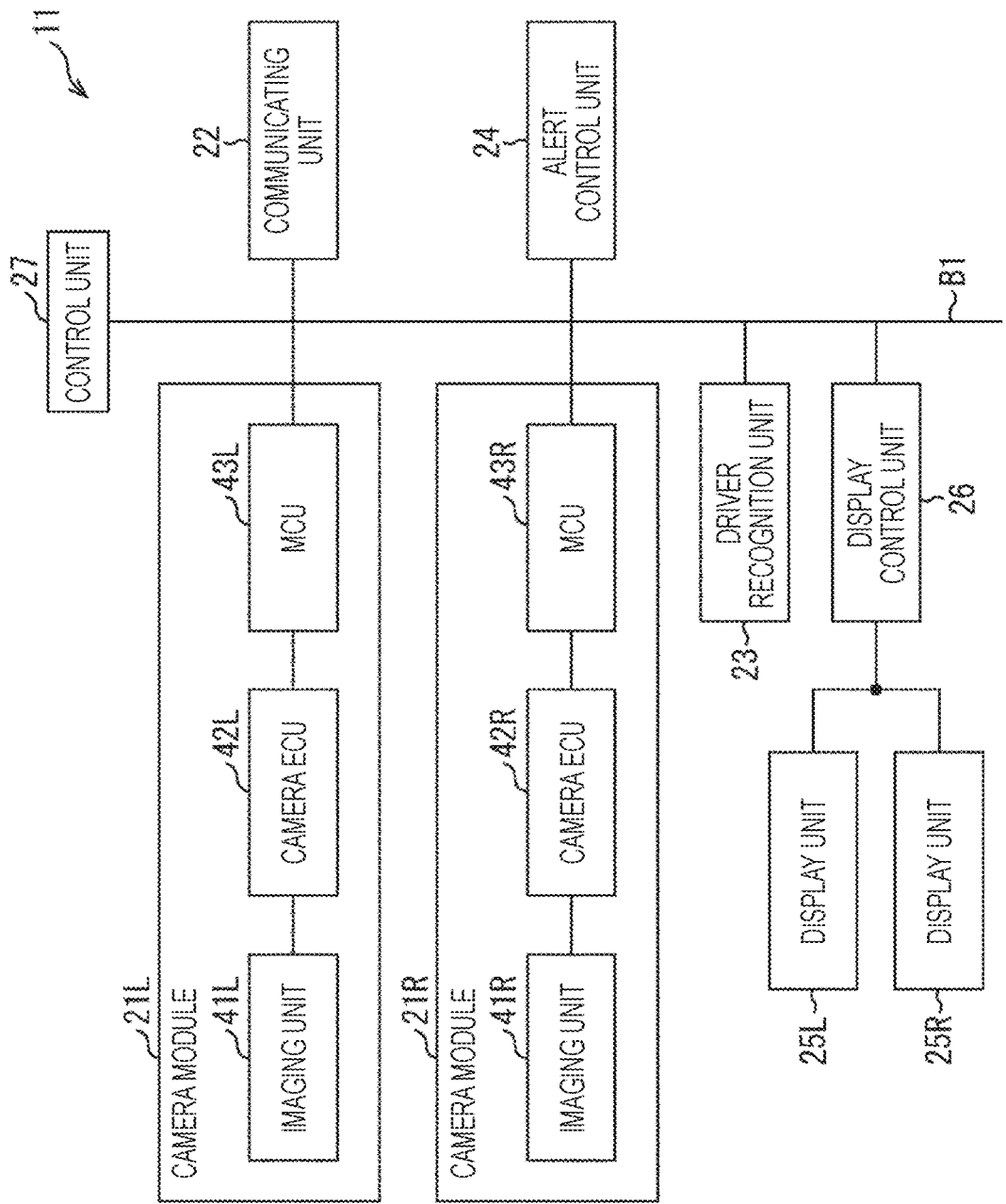
FIG. 1 is a block diagram showing an example configuration of an in-vehicle system according to the present technology.

The following is a detailed description of preferred embodiments of the present technology, with reference to the accompanying drawings. Note that, in this specification and the drawings, components having substantially the same functional configurations are denoted by the same reference numerals, and repeated explanation of them will not be made.

Further, explanation will be made in the following order.
1. First Embodiment
2. Second Embodiment
3. Modifications
4. Other aspects 1. First Embodiment Referring to FIGS. 1 to 28, a first embodiment of the present technology is first described.

<Example Configuration of an In-Vehicle System 11>

FIG. 1 is a block diagram showing an example configuration of an in-vehicle system 11 according to the present technology.

The in-vehicle system 11 is a system that is provided in a vehicle, and performs electronic sideview mirror control and the like. The in-vehicle system 11 includes a camera module 21L, a camera module 21R, a communicating unit 22, a driver recognition unit 23, an alert control unit 24, a display unit 25L, a display unit 25R, a display control unit 26, and a control unit 27. The camera module 21L, the camera module 21R, the communicating unit 22, the driver recognition unit 23, the alert control unit 24, the display control unit 26, and the control unit 27 are connected to one another via a bus B1.

Note that, in the description below, the bus B1 in a case where each component of the in-vehicle system 11 performs data transmission/reception and the like via the bus B1 will not be mentioned, for ease of explanation. For example, a case where the control unit 27 supplies data to the communicating unit 22 via the bus B1 will be described simply as a case where the control unit 27 supplies data to the communicating unit 22.

As described later, the camera module 21L performs processing such as imaging and image recognition on the left side and the rear side of the vehicle. The camera module 21L includes an imaging unit 41L, a camera ECU 42L, and a micro control unit (MCU) 43L.

The imaging unit 41L includes a lensless camera (LLC) that uses neither an imaging lens nor a pinhole, as described later. The imaging unit 41L captures images of the left side and the rear side of the vehicle, and restores a restored image in which an image of the target object is formed from the obtained detection images, as described later. The imaging unit 41L supplies the camera ECU 42L with the restored image (hereinafter referred to as a left-side image) as a sensing image obtained by sensing the left side and the rear side of the vehicle.

The camera ECU 42L performs an image quality adjustment process, such as gain adjustment, white balance adjustment, a high dynamic range (HDR) process, and a traffic signal flicker correction process, for example, on the left-side image. Note that the image quality adjustment process is not necessarily performed by the camera ECU 42L, but may be performed inside the imaging unit 41L.

The camera ECU 42L also performs an object recognition process on the left-side image, and detects a dangerous object (such as a pedestrian, a bicycle, a motorcycle, or a vehicle, for example) on the left side and the rear side of the vehicle. The camera ECU 42L supplies the MCU 43L with the left-side image, and data indicating the result of the dangerous object detection.

The MCU 43L converts the data supplied from the camera ECU 42L into data in a format for communication, and outputs the data to the bus B1. The MCU 43L also converts data received from the bus B1 into data in a format for the camera ECU 42L, and supplies the data to the camera ECU 42L.

As described later, the camera module 21R performs processing such as imaging and image recognition on the right side and the rear side of the vehicle. The camera module 21R includes an imaging unit 41R, a camera ECU 42R, and a micro control unit (MCU) 43R.

The imaging unit 41R includes a lensless camera (LLC) that uses neither an imaging lens nor a pinhole, as described later. The imaging unit 41R captures images of the right side and the rear side of the vehicle, and restores a restored image in which an image of the target object is formed from the obtained detection images, as described later. The imaging unit 41R supplies the camera ECU 42R with the restored image (hereinafter referred to as a right-side image) as a sensing image obtained by sensing the right side and the rear side of the vehicle.

The camera ECU 42R performs an image quality adjustment process, such as gain adjustment, white balance adjustment, a high dynamic range (HDR) process, and a traffic signal flicker correction process, for example, on the right-side image. Note that the image quality adjustment process is not necessarily performed by the camera ECU 42R, but may be performed inside the imaging unit 41R.

The camera ECU 42R also performs an object recognition process on the right-side image, and detects a dangerous object (such as a pedestrian, a bicycle, a motorcycle, or a vehicle, for example) on the right side and the rear side of the vehicle. The camera ECU 42R supplies the MCU 43R with the right-side image, and data indicating the result of the dangerous object detection.

The MCU 43R converts the data supplied from the camera ECU 42R into data in a format for communication, and outputs the data to the bus B1. The MCU 43R also converts data received from the bus B1 into data in a format for the camera ECU 42R, and supplies the data to the camera ECU 42R.

Note that the camera module 21L and the camera module 21R will be hereinafter referred to simply as the camera modules 21 in a case where there is no need for distinction. The imaging unit 41L and the imaging unit 41R will be hereinafter referred to simply to as the imaging units 41 in a case where there is no need for distinction. The camera ECU 42L and the camera ECU 42R will be hereinafter referred to simply as the camera ECUs 42 in a case where there is no need for distinction. The MCU 43L and the MCU 43R will be hereinafter referred to simply as the MCUs 43 in a case where there is no need for distinction. The left-side image and the right-side image will be hereinafter referred to simply as the side images in a case where there is no need for distinction.

Conversely, in a case where it is necessary to distinguish between the respective components of the camera module 21L and the respective components of the camera module 21R, the letter "L" is attached to reference numeral of each component of the camera module 21L, and the letter "R" is attached to reference numeral of each component of the camera module 21R.

The communicating unit 22 transmits/receives information to and from a nearby vehicle, a portable terminal device being carried by a pedestrian, a roadside device, and an external server by various kinds of wireless communication such as vehicle-to-vehicle communication, vehicle-to-pedestrian communication, and road-to-vehicle communication, for example.

The driver recognition unit 23 recognizes a state of the driver who is driving the vehicle (or monitors the driver), and outputs data indicating the recognition result to the bus B1.

The alert control unit 24 performs a process of superimposing a warning display facilitating attention to a dangerous object on the left-side image, on the basis of the result of the detection performed by the camera ECU 42L to detect a dangerous object on the left side and the rear side of the vehicle. The alert control unit 24 outputs the left-side image on which the warning display is superimposed, to the bus B1. Likewise, the alert control unit 24 performs a process of superimposing a warning display facilitating attention to a dangerous object on the right-side image, on the basis of the result of the detection performed by the camera ECU 42R to detect a dangerous object on the right side and the rear side of the vehicle. The alert control unit 24 outputs the right-side image on which the warning display is superimposed, to the bus B1.

Note that, in a case where any dangerous object has not been detected, the alert control unit 24 outputs the left-side image and the right-side image to the bus B1, without superimposition of any warning display thereon.

The display unit 25L is formed with a display such as an organic EL display or a liquid crystal display, for example, and displays the left-side image.

The display unit 25R is formed with a display such as an organic EL display or a liquid crystal display, for example, and displays the right-side image.

Note that the display unit 25L and the display unit 25R will be hereinafter referred to simply as the display units 25 in a case where there is no need for distinction.

The display control unit 26 controls the display processes being performed by the display unit 25L and the display unit 25R. For example, the display control unit 26 controls the display range of the left-side image displayed by the display unit 25L. Also, the display control unit 26 controls the display of the warning display by controlling the display of the left-side image that is displayed by the display unit 25 and has the warning display superimposed thereon, for example. Likewise, the display control unit 26 controls the display range of the right-side image displayed by the display unit 25R, for example. Also, the display control unit 26 controls the display of the warning display by controlling the display of the right-side image that is displayed by the display unit 25 and has the warning display superimposed thereon, for example.

The control unit 27 includes various processors, for example, to control each component of the in-vehicle system 11 and perform various kinds of processing.

<Example Configuration of an Imaging Unit 41>

Figure 2:
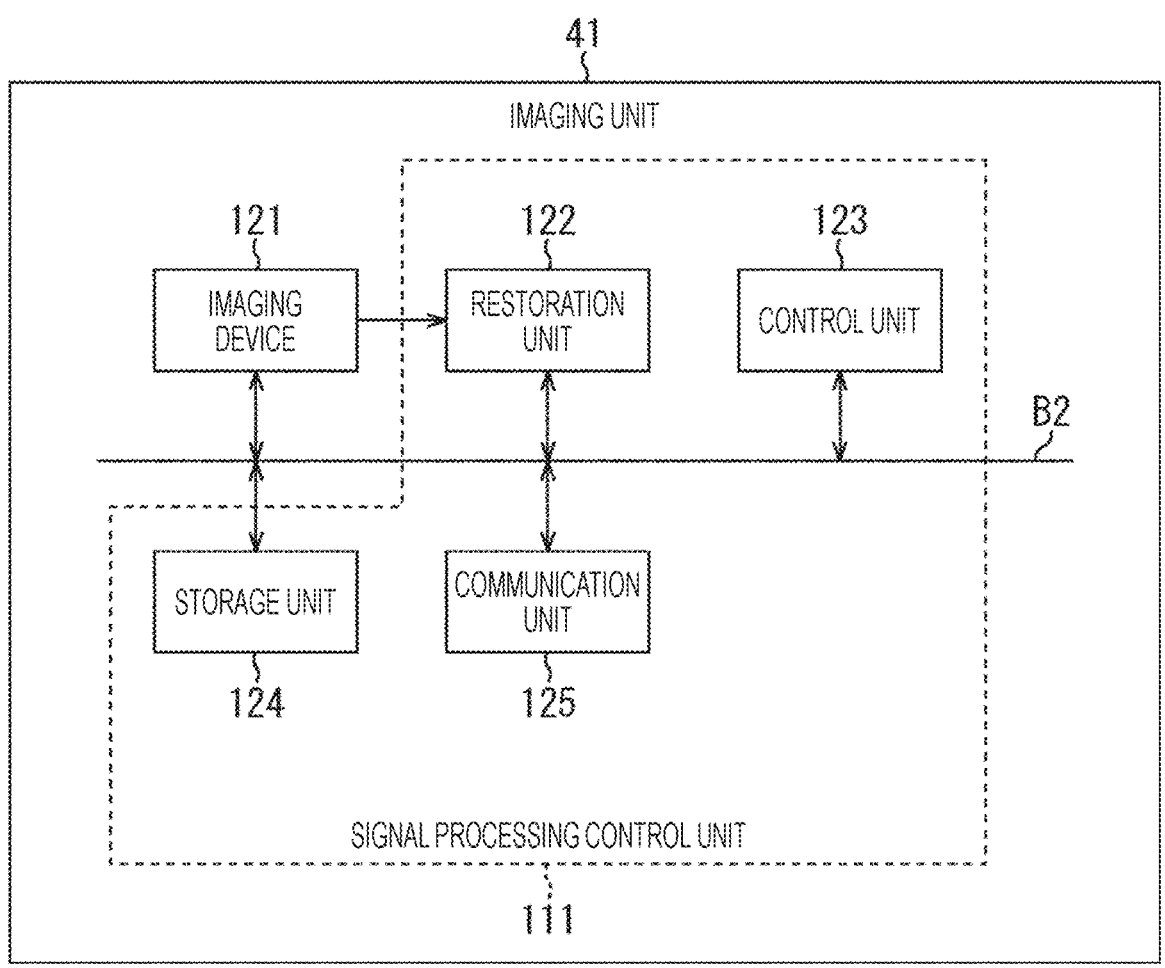
FIG. 2 is a block diagram showing an example configuration of an imaging unit of the in-vehicle system shown in FIG. 1.

FIG. 2 is a block diagram showing an example configuration of the imaging unit 41 of a camera module 21.

The imaging unit 41 includes an imaging device 121, a restoration unit 122, a control unit 123, a storage unit 124, and a communication unit 125. Further, the restoration unit 122, the control unit 123, the storage unit 124, and the communication unit 125 constitute a signal processing control unit 111 that performs signal processing, control on the imaging unit 41, and the like. Note that the imaging unit 41 does not include any imaging lens (free of imaging lenses).

Further, the imaging device 121, the restoration unit 122, the control unit 123, the storage unit 124, and the communication unit 125 are connected to one another via a bus B2, and transmit/receive data and the like via the bus B2. Note that, in the description below, the bus B2 in a case where each component of the imaging unit 41 performs data transmission/reception or the like via the bus B2 will not be mentioned, for ease of explanation. For example, a case where the communication unit 125 supplies data to the control unit 123 via the bus B2 will be described as a case where the communication unit 125 supplies data to the control unit 123.

The imaging device 121 is an imaging device in which the detection sensitivity of each pixel has an incident angle directivity, and outputs an image including a detection signal indicating a detection signal level corresponding to the amount of incident light, to the restoration unit 122 or the bus B2. The detection sensitivity of each pixel having an incident angle directivity means that the light-receiving sensitivity characteristics corresponding to the incident angle of incident light entering each pixel vary with each pixel. However, the light-receiving sensitivity characteristics of all the pixels are not necessarily completely different, and the light-receiving sensitivity characteristics of some pixels may be the same.

More specifically, the imaging device 121 may have a basic structure similar to that of a general imaging device such as a complementary metal oxide semiconductor (CMOS) image sensor, for example. However, the configuration of each of the pixels constituting the pixel array unit of the imaging device 121 differs from that of a general imaging device, and is a configuration that has an incident angle directivity, as will be described later with reference to FIGS. 4 to 6, for example. Further, the imaging device 121 has light-receiving sensitivity that varies (changes) with the incident angle of incident light in each pixel, and has an incident angle directivity with respect to the incident angle of incident light in each pixel.

Figure 3:
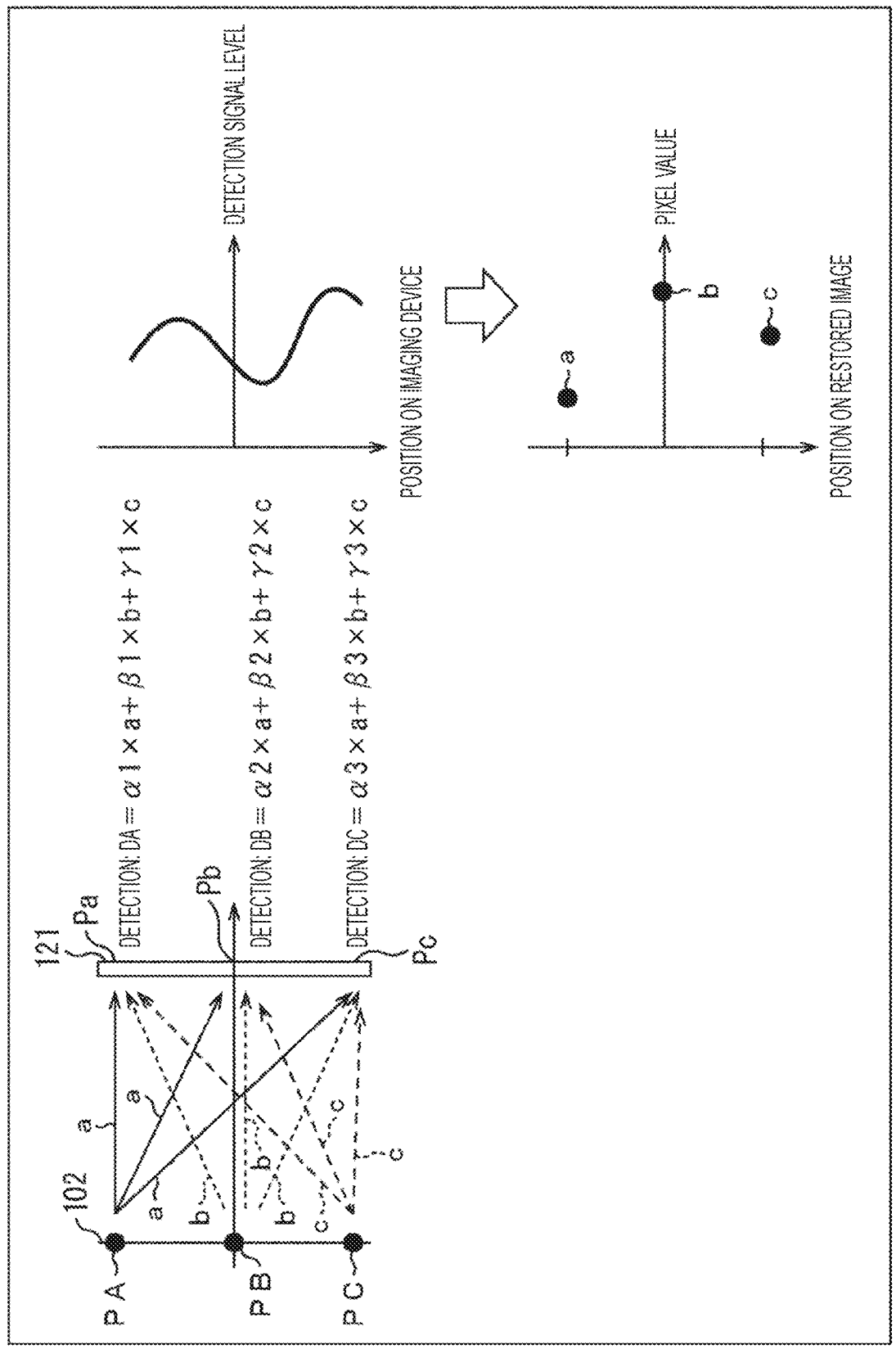
FIG. 3 is a diagram for explaining the principles of imaging in the imaging device shown in FIG. 2.

Here, all objects are a set of point light sources, for example, and light is emitted from each point light source in all directions. For example, an object surface 102 of an object in the top left of FIG. 3 is formed with point light sources PA to PC, and the point light sources PA to PC emit a plurality of light beams of light intensities a to c, respectively, to the surroundings. Further, in the description below, the imaging device 121 includes pixels (hereinafter referred to as pixels Pa to Pc) having different incident angle directivities at positions Pa to Pc.

In this case, as shown in the top left of FIG. 3, light beams of the same light intensity emitted from the same point light source are made to enter the respective pixels of the imaging device 121. For example, a light beam of the light intensity a emitted from the point light source PA is made to enter the respective pixels Pa to Pc of the imaging device 121. However, light beams emitted from the same point light source are made to enter the respective pixels at different incident angles. For example, light beams from the point light source PA are made to enter the respective pixels Pa to Pc at different incident angles.

On the other hand, since the incident angle directivities of the pixels Pa to Pc differ from one another, light beams of the same light intensity emitted from the same point light source are detected with different sensitivities in the respective pixels. As a result, light beams of the same light intensity are detected at different detection signal levels in the respective pixels. For example, the detection signal levels with respect to the light beams of the light intensity a from the point light source PA have different values in the respective pixels Pa to Pc.

Further, the light-receiving sensitivity level of each pixel with respect to a light beam from each point light source is determined by multiplying the light intensity of the light beam by a coefficient indicating the light-receiving sensitivity (which is the incident angle directivity) with respect to the incident angle of the light beam. For example, the detection signal level of the pixel Pa with respect to the light beam from the point light source PA is determined by multiplying the light intensity a of the light beam of the point light source PA by a coefficient indicating the incident angle directivity of the pixel Pa with respect to the incident angle of the light beam entering the pixel Pa.

Accordingly, the detection signal levels DA, DB, and DC of the pixels Pc, Pb, and Pa are expressed by Equations (1) to (3) shown below, respectively.

$$DA = \alpha1 \times a + \beta1 \times b + \gamma1 \times c \qquad (1)$$

$$DB = \alpha2 \times a + \beta2 \times b + \gamma2 \times c \qquad (2)$$

$$DC = \alpha3 \times a + \beta3 \times b + \gamma3 \times c \qquad (3)$$

Here, the coefficient α1 is a coefficient indicating the incident angle directivity of the pixel Pc with respect to the incident angle of the light beam from the point light source PA to the pixel Pc, and is set in accordance with the incident angle. Further, α1×a indicates the detection signal level of the pixel Pc with respect to the light beam from the point light source PA.

The coefficient β1 is a coefficient indicating the incident angle directivity of the pixel Pc with respect to the incident angle of the light beam from the point light source PB to the pixel Pc, and is set in accordance with the incident angle. Further, β1×b indicates the detection signal level of the pixel Pc with respect to the light beam from the point light source PB.

The coefficient γ1 is a coefficient indicating the incident angle directivity of the pixel Pc with respect to the incident angle of the light beam from the point light source PC to the pixel Pc, and is set in accordance with the incident angle. Further, γ1×c indicates the detection signal level of the pixel Pc with respect to the light beam from the point light source PC.

As described above, the detection signal level DA of the pixel Pa is determined by the sum of products of the respective light intensities a, b, and c of the light beams from the point light sources PA, PB, and PC in the pixel Pc, and the coefficients α1, β1, and γ1 indicating the incident angle directivities depending on the respective incident angles.

Likewise, the detection signal level DB of the pixel Pb is determined by the sum of products of the respective light intensities a, b, and c of the light beams from the point light sources PA, PB, and PC in the pixel Pb, and the coefficients $\alpha2$, $\beta2$, and $\gamma2$ indicating the incident angle directivities depending on the respective incident angles, as shown in Equation (2). Also, the detection signal level DC of the pixel Pc is determined by the sum of products of the respective light intensities a, b, and c of the light beams from the point light sources PA, PB, and PC in the pixel Pa, and the coefficients $\alpha2$, $\beta2$, and $\gamma2$ indicating the incident angle directivities depending on the respective incident angles, as shown in Equation (3).

However, the detection signal levels DA, DB, and DC of the pixels Pa, Pb, and Pc are mixed with the light intensities a, b, and c of the light beams emitted from the point light sources PA, PB, and PC, respectively, as shown in Equations (1) to (3). Therefore, as shown in the top right of FIG. 3, the detection signal level in the imaging device 121 differs from the light intensity of each point light source on the object surface 102. Accordingly, an image obtained by the imaging device 121 differs from that in which an image of the object surface 102 is formed.

Meanwhile, the light intensities a to c of the light beams of the respective point light sources PA to PC are determined by creating simultaneous equations formed with Equations (1) to (3) and solving the created simultaneous equations. The pixels having the pixel values corresponding to the obtained light intensities a to c are then arranged in accordance with the layout (relative positions) of the point light sources PA to PC, so that a restored image in which an image of the object surface 102 is formed is restored as shown in the bottom right of FIG. 3.

In this manner, the imaging device 121 that has an incident angle directivity in each pixel without requiring any imaging lens and any pinhole can be obtained.

In the description below, a set of coefficients (the coefficients $\alpha1$, $\beta1$, and $\gamma1$, for example) for each of the equations forming the simultaneous equations will be referred to as a coefficient set. In the description below, a group formed with a plurality of coefficient sets (the coefficient set of $\alpha1$, $\beta1$, and $\gamma1$, the coefficient set of $\alpha2$, $\beta2$, and $\gamma2$, the coefficient set of $\alpha3$, $\beta3$, and $\gamma3$, for example) corresponding to a plurality of equations included in the simultaneous equations will be referred to as a coefficient set group.

Here, if the object distance from the object surface 102 to the light receiving surface of the imaging device 121 varies, the incident angles of the light beams from the respective point light sources on the object surface 102 to the imaging device 121 vary, and therefore, a different coefficient set group is required for each object distance.

Therefore, in the imaging unit 41, coefficient set groups for the respective distances (object distances) from the imaging device 121 to the object surface are prepared in advance, simultaneous equations are created by switching the coefficient set groups for each object distance, and the created simultaneous equations are solved. Thus, restored images of the object surface at various object distances can be obtained on the basis of one detection image. For example, after a detection image is captured and recorded once, the coefficient set groups are switched in accordance with the distance to the object surface, and a restored image is restored, so that a restored image of the object surface at a desired object distance can be generated.

Further, even on the object surface 102 at the same object distance, if the number and the layout of the point light sources to be set vary, the incident angles of the light beams from the respective point light sources to the imaging device 121 also vary. Therefore, a plurality of coefficient set groups might be required for the object surface 102 at the same object distance in some cases. Furthermore, the incident angle directivity of each pixel 121a needs to be set so that the independence of the simultaneous equations described above can be ensured.

Further, an image to be output by the imaging device 121 is an image formed with detection signals in which an image of the object is not formed as shown in the top right of FIG. 3, and therefore, the object cannot be visually recognized. That is, a detection image formed with detection signals output from the imaging device 121 is a set of pixel signals, but also is an image from which the user cannot visually recognize the object (the object is visually unrecognizable).

In view of this, an image formed with detection signals in which an image of the object is not formed as shown in the top right of FIG. 3, or an image captured by the imaging device 121, will be hereinafter referred to as a detection image.

Note that all the pixels do not need to have different incident angle directivities from one another, but some pixels may have the same incident angle directivity.

Referring back to FIG. 2, the restoration unit 122 acquires, from the storage unit 124, a coefficient set group that corresponds to the object distance corresponding to the distance from the imaging device 121 to the object surface 102 (the object surface corresponding to the restored image) in FIG. 3, for example, and corresponds to the above coefficients $\alpha1$ to $\alpha3$, $\beta1$ to $\beta3$, and $\gamma1$ to $\gamma3$. The restoration unit 122 also creates simultaneous equations as expressed by Equations (1) to (3) described above, using the detection signal level of each pixel of the detection image output from the imaging device 121 and the acquired coefficient set group. The restoration unit 122 then solves the created simultaneous equations, to obtain the pixel values of the respective pixels constituting the image in which an image of the object as shown in the bottom right of FIG. 3 is formed. Thus, an image from which the user can visually recognize the object (visually recognizable object) is restored from the detection image.

The image restored from the detection image will be referred to as a restored image. However, in a case where the imaging device 121 has sensitivity only to light outside the visible wavelength band, such as ultraviolet rays, the restored image is not an image from which the object can be recognized as in a normal image, but is also referred to as a restored image in this case.

Further, a restored image that is an image in which an image of the object is formed and is an image not yet subjected to color separation such as demosaicing or a synchronization process will be hereinafter referred to as a RAW image, and a detection image captured by the imaging device 121 will be distinguished as an image compliant with the array of color filters, but not as a RAW image.

Note that the number of pixels of the imaging device 121 and the number of pixels constituting the restored image are not necessarily the same.

Further, the restoration unit 122 performs demosaicing, $\gamma$ correction, white balance adjustment, conversion into a predetermined compression format, and the like, on the restored image as necessary. The restoration unit 122 then outputs the restored image to the bus B2.

The control unit 123 includes various processors, for example, to control each component of the imaging unit 41 and perform various kinds of processing.

The storage unit 124 includes one or more storage devices such as a read only memory (ROM), a random access memory (RAM), and a flash memory, and stores programs, data, and the like to be used in processes by the imaging unit 41, for example. The storage unit 124 associates coefficient set groups corresponding to the above coefficients α1 to α3, β1 to β3, and γ1 to γ3 with various object distances, and stores the coefficient set groups, for example. More specifically, the storage unit 124 stores, for each object surface 102 at each object distance, a coefficient set group including coefficients for the respective pixels 121a of the imaging device 121 with respect to the respective point light sources set on the object surface 102, for example.

The communication unit 125 communicates with the camera ECU 42L by a predetermined communication method.

<First Example Configuration of the Imaging Device 121>

Next, a first example configuration of the imaging device 121 of the imaging unit 41 shown in FIG. 2 is described with reference to FIGS. 4 and 5.

Figure 4:
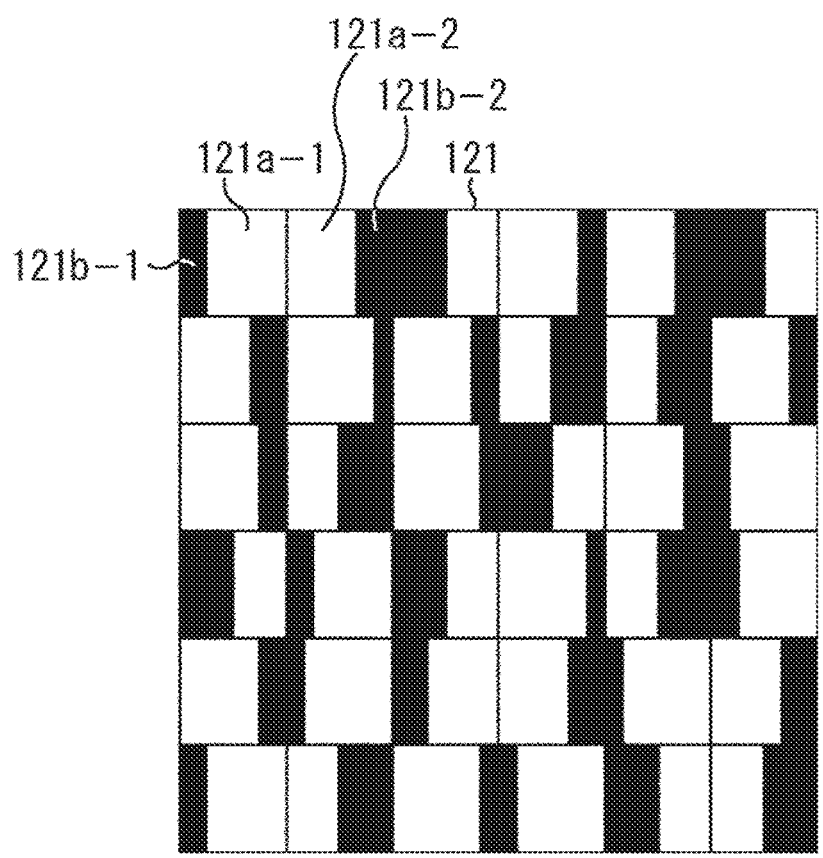
FIG. 4 is a diagram showing an example configuration of the pixel array unit of the imaging device shown in FIG. 2.

FIG. 4 shows a front view of part of the pixel array unit of the imaging device 121. Note that FIG. 4 shows an example case where the number of pixels in the pixel array unit is 6×6. However, the number of pixels in the pixel array unit is not limited to this. Also, the example configuration of the pixel array unit shown in FIG. 4 is for explaining the first example configuration of the imaging device 121, and an actual example configuration of the pixel array unit will be described later.

In the imaging device 121 shown in FIG. 4, a light shielding film 121b that is one of modulation elements is provided for each pixel 121a so as to cover part of the light receiving region (light receiving surface) of the photodiode, and incident light entering each pixel 121a is optically modulated in accordance with the incident angle. The light shielding film 121b is then provided in a different region for each pixel 121a, the light-receiving sensitivity with respect to the incident angle of incident light varies with each pixel 121a, and each pixel 121a has a different incident angle directivity, for example.

For example, in a pixel 121a-1 and a pixel 121a-2, the ranges in which the light receiving regions of the photodiodes are shielded from light by a light shielding film 121b-1 and a light shielding film 121b-2 are different (at least the light shielding regions (positions) or the light shielding areas are different). Specifically, in the pixel 121a-1, the light shielding film 121b-1 is provided so as to shield part of the left-side portion of the light receiving region of the photodiode from light by a predetermined width. On the other hand, in the pixel 121a-2, the light shielding film 121b-2 is provided so as to shield part of the right-side portion of the light receiving region from light by a predetermined width. Note that the width by which the light shielding film 121b-1 shields the light receiving region of the photodiode from light, and the width by which the light shielding film 121b-2 shields the light receiving region of the photodiode from light may be different or may be the same. Likewise, in the other pixels 121a, the light shielding films 121b are randomly disposed in the pixel array unit so as to shield a different region in the light receiving region from light for each pixel.

Figure 5:
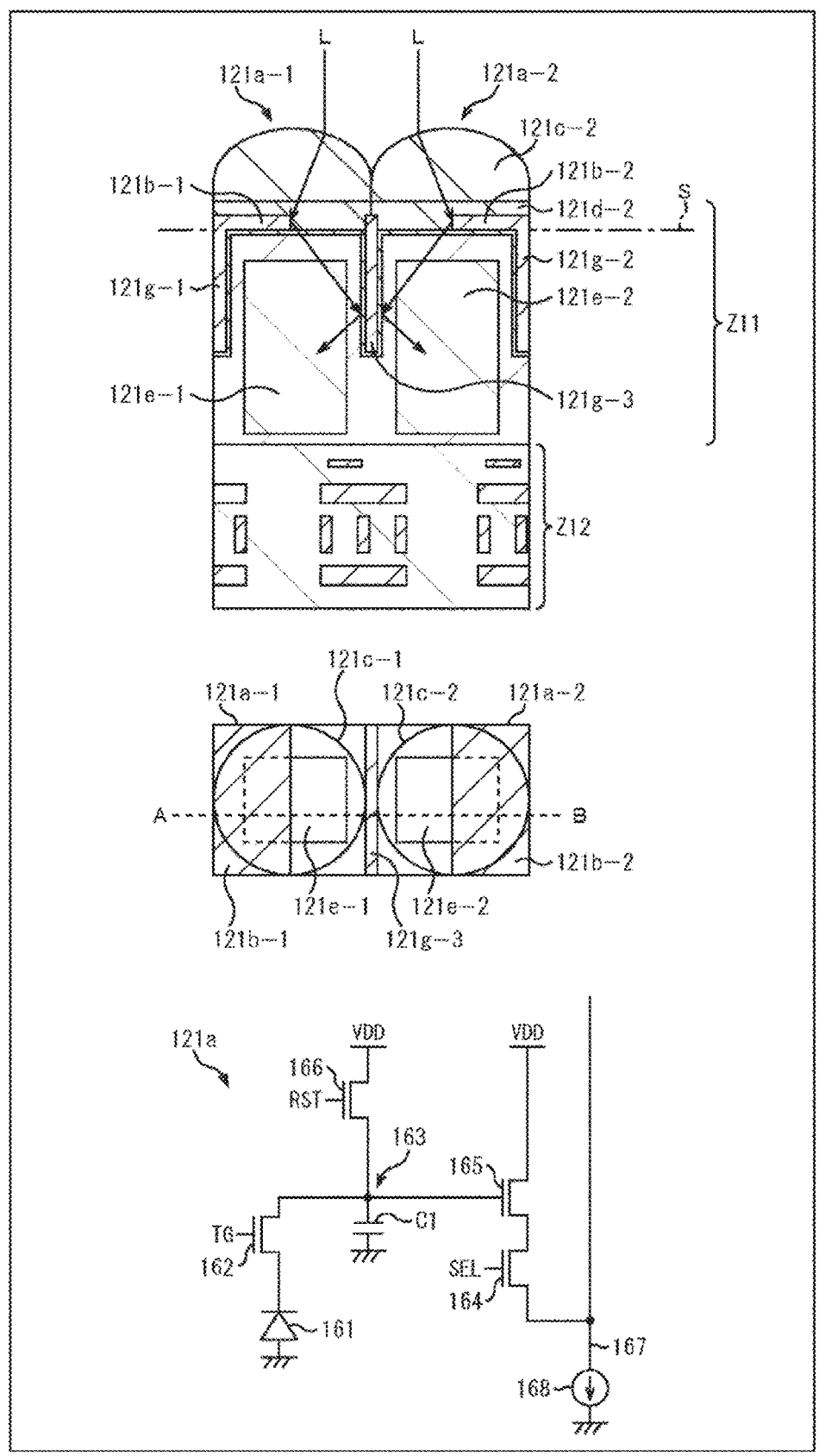
FIG. 5 is a diagram for explaining a first example configuration of the imaging device shown in FIG. 2.

The top portion of FIG. 5 is a side cross-sectional view of the first example configuration of the imaging device 121, and the middle portion of FIG. 5 is a top view of the first example configuration of the imaging device 121. The side cross-sectional view in the top portion of FIG. 5 is also an A-B cross-section in the middle portion of FIG. 5. Further, the bottom portion of FIG. 5 shows an example circuit configuration of the imaging device 121.

In the imaging device 121 in the top portion of FIG. 5, incident light enters from the top side toward the bottom side of the drawing. The adjacent pixels 121a-1 and 121a-2 are of a so-called back-illuminated type, having a wiring layer 412 provided as the lowermost layer in the drawing and a photoelectric conversion layer Z11 provided thereon.

Note that, in the description below, in a case where there is no need to distinguish the pixels 121a-1 and 121a-2 from each other, the number at the end of each reference numeral will be omitted, and the pixels will be simply referred to as the pixels 121a. In the description below, numbers and alphabets at the end of reference numerals might be omitted too for other components in the specification.

Further, FIG. 5 shows a side view and a top view of only two of the pixels constituting the pixel array unit of the imaging device 121, and more pixels 121a are of course also provided but are not shown in the drawings.

The pixels 121a-1 and 121a-2 further include photodiodes 121e-1 and 121e-2, respectively, as photoelectric conversion elements in the photoelectric conversion layer Z11. Furthermore, on the photodiodes 121e-1 and 121e-2, on-chip lenses 121c-1 and 121c-2, and color filters 121d-1 and 121d-2 are stacked in this order from the top.

The on-chip lenses 121c-1 and 121c-2 condense incident light onto the photodiodes 121e-1 and 121e-2.

The color filters 121d-1 and 121d-2 are optical filters that transmit light of a specific wavelength such as red, green, blue, infrared, or white, for example. Note that, in the case of white, the color filters 121d-1 and 121d-2 may be transparent filters, or may not be provided.

In the photoelectric conversion layer Z11 of the pixels 121a-1 and 121a-2, light shielding films 121g-1 to 121g-3 are formed at boundaries between the respective pixels, and prevent incident light L from entering the adjacent pixels and causing crosstalk, as shown in FIG. 5, for example.

Further, as shown in the top and the middle portions of FIG. 5, the light shielding films 121b-1 and 121b-2 shield part of the light receiving surface S from light as viewed from above. On the light receiving surface S of the photodiodes 121e-1 and 121e-2 in the pixels 121a-1 and 121a-2, different regions are shielded from light by the light shielding films 121b-1 and 121b-2, so that a different incident angle directivity is set independently for each pixel. However, the regions to be shielded from light do not need to be different among all the pixels 121a of the imaging device 121, and there may be some pixels 121a among which the same region is shielded from light.

Note that, as shown in the top portion of FIG. 5, the light shielding film 121b-1 and the light shielding film 121g-1 are connected to each other, and are arranged in an L shape when viewed from the side. Likewise, the light shielding film 121b-2 and the light shielding film 121g-2 are connected to each other, and are arranged in an L shape when viewed from the side. Further, the light shielding film 121b-1, the light shielding film 121b-2, and the light shielding films 121g-1 to 121g-3 are formed with a metal, and, for example, are formed with tungsten (W), aluminum (Al), or an alloy of Al and copper (Cu). Also, the light shielding film 121b-1, the light shielding film 121b-2, and the light shielding films 121g-1 to 121g-3 may be simultaneously formed with the same metal as the wiring lines in the same process as the process of forming the wiring lines in a semiconductor process. Note that the thicknesses of the light shielding film 121b-1, the light shielding film 121b-2, and the light shielding films 121g-1 to 121g-3 may not be the same depending on positions.

Further, as shown in the bottom portion of FIG. 5, a pixel 121a includes a photodiode 161 (corresponding to the photodiode 121e), a transfer transistor 162, a floating diffusion (FD) unit 163, a select transistor 164, an amplification transistor 165, and a reset transistor 166, and is connected to a current source 168 via a vertical signal line 167.

The anode electrode of the photodiode 161 is grounded, and the cathode electrode of the photodiode 161 is connected to the gate electrode of the amplification transistor 165 via the transfer transistor 162.

The transfer transistor 162 is driven in accordance with a transfer signal TG. For example, when the transfer signal TG supplied to the gate electrode of the transfer transistor 162 switches to the high level, the transfer transistor 162 is turned on. As a result, the electric charge accumulated in the photodiode 161 is transferred to the FD unit 163 via the transfer transistor 162.

The FD unit 163 is a floating diffusion region that has a charge capacity C1 and is provided between the transfer transistor 162 and the amplification transistor 165, and temporarily accumulates the electric charge transferred from the photodiode 161 via the transfer transistor 162. The FD unit 163 is a charge detection unit that converts electric charge into voltage, and the electric charge accumulated in the FD unit 163 is converted into voltage at the amplification transistor 165.

The select transistor 164 is driven in accordance with a select signal SEL. When the select signal SEL supplied to the gate electrode of the select transistor 164 is switched to the high level, the select transistor 164 is turned on, to connect the amplification transistor 165 and the vertical signal line 167.

The amplification transistor 165 serves as the input unit for a source follower that is a readout circuit that reads out a signal obtained through photoelectric conversion performed at the photodiode 161, and outputs a detection signal (pixel signal) at the level corresponding to the electric charge accumulated in the FD unit 163, to the vertical signal line 167. That is, the amplification transistor 165 has its drain terminal connected to a power supply VDD, and its source terminal connected to the vertical signal line 167 via the select transistor 164, to form a source follower together with the current source 168 connected to one end of the vertical signal line 167. The value (output pixel value) of the detection signal is modulated in accordance with the incident angle of incident light from the object, and has characteristics (directivity) that vary with the incident angle (or has an incident angle directivity).

The reset transistor 166 is driven in accordance with a reset signal RST. For example, when the reset signal RST supplied to the gate electrode of the reset transistor 166 is switched to the high level, the electric charge accumulated in the FD unit 163 is released to the power supply VDD, so that the FD unit 163 is reset.

Note that the shape of the light shielding film 121b of each pixel 121a is not limited to the example shown in FIG. 4, but can have any appropriate shape. For example, it is possible to adopt a shape extending in the horizontal direction in FIG. 4, an L shape extending in the vertical direction and the horizontal direction, a shape having a rectangular opening, or the like.

<Second Example Configuration of the Imaging Device 121>

Figure 6:
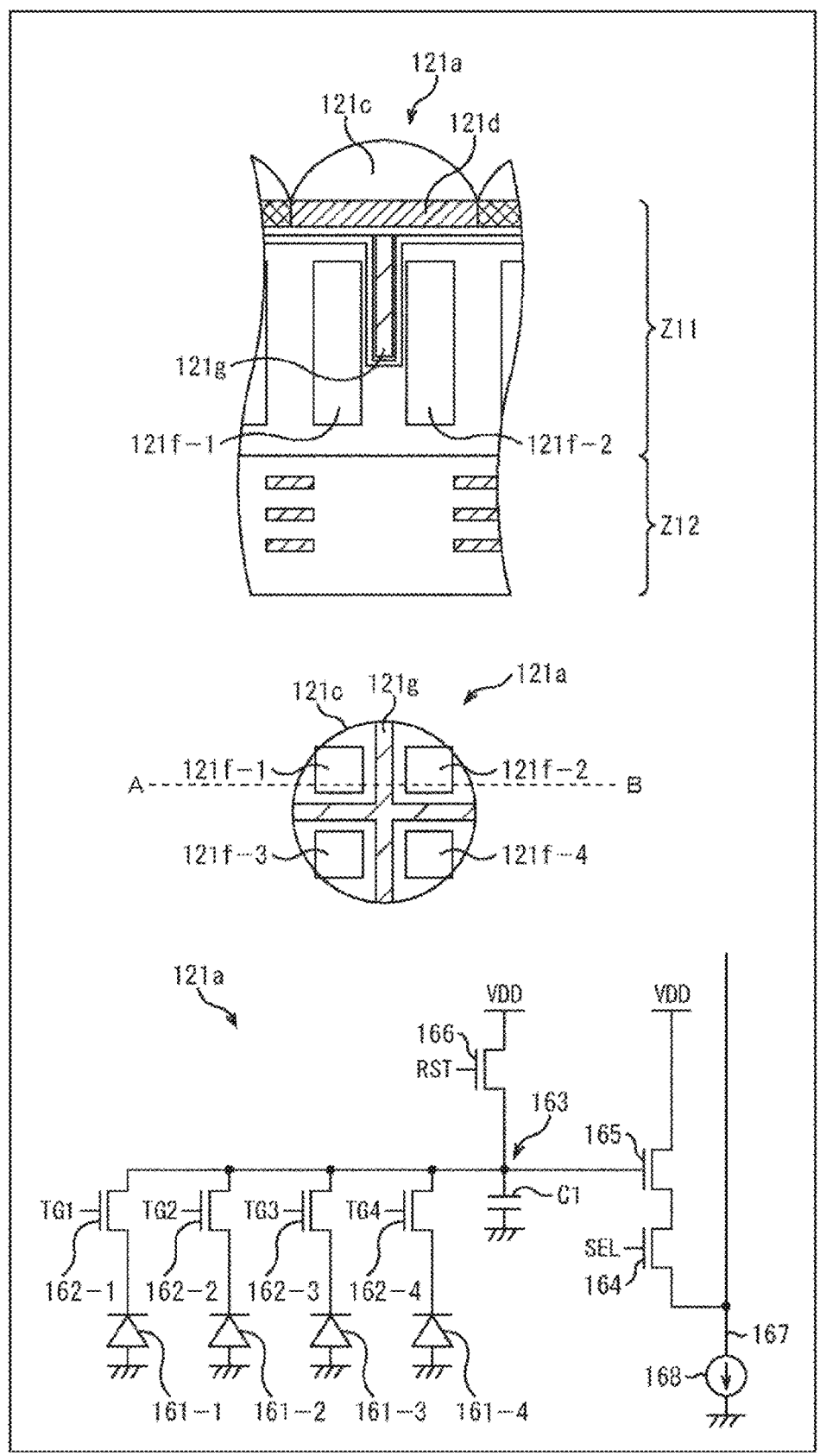
FIG. 6 is a diagram for explaining a second example configuration of the imaging device shown in FIG. 2.

FIG. 6 is a diagram showing a second example configuration of the imaging device 121. The top portion of FIG. 6 shows a side cross-sectional view of a pixel 121a of the imaging device 121 as the second example configuration, and the middle portion of FIG. 6 shows a top view of the imaging device 121. The side cross-sectional view in the top portion of FIG. 6 is also an A-B cross-section in the middle portion of FIG. 6. Further, the bottom portion of FIG. 6 shows an example circuit configuration of the imaging device 121.

The configuration of the imaging device 121 in FIG. 6 differs from that of the imaging device 121 in FIG. 5 in that four photodiodes 121f-1 to 121f-4 are formed in one pixel 121a, and a light shielding film 121g is formed in a region that separates the photodiodes 121f-1 to 121f-4 from one another. That is, in the imaging device 121 in FIG. 6, the light shielding film 121g is formed in a cross shape as viewed from above. Note that the same components as those shown in FIG. 5 are denoted by the same reference numerals as those in FIG. 5, and detailed explanation of them is not made herein.

In the imaging device 121 in FIG. 6, the photodiodes 121f-1 to 121f-4 are separated by the light shielding film 121g, so that occurrence of electrical and optical crosstalk among the photodiodes 121f-1 to 121f-4 is prevented. That is, like the light shielding films 121g of the imaging device 121 in FIG. 5, the light shielding film 121g in FIG. 6 is for preventing crosstalk, and is not for providing an incident angle directivity.

Further, in the imaging device 121 in FIG. 6, one FD unit 163 is shared among the four photodiodes 121f-1 to 121f-4. The bottom portion of FIG. 6 shows an example circuit configuration in which one FD unit 163 is shared among the four photodiodes 121f-1 to 121f-4. Note that, as for the bottom portion of FIG. 6, explanation of the same components as those shown in the bottom portion of FIG. 5 is not made herein.

The circuit configuration shown in the bottom portion of FIG. 6 differs from that shown in the bottom portion of FIG. 5 in that photodiodes 161-1 to 161-4 (corresponding to the photodiodes 121f-1 to 121f-4 in the top portion of FIG. 6) and transfer transistors 162-1 to 162-4 are provided in place of the photodiode 161 (corresponding to the photodiode 121e in the top portion of FIG. 5) and the transfer transistor 162, and the FD unit 163 is shared.

With such a configuration, the electric charges accumulated in the photodiodes 121f-1 to 121f-4 are transferred to the common FD unit 163 having a predetermined capacity provided in the connecting portion between the photodiodes 121f-1 to 121f-4 and the gate electrode of the amplification transistor 165. A signal corresponding to the level of the electric charge retained in the FD unit 163 is then read as a detection signal (pixel signal).

Accordingly, the electric charges accumulated in the photodiodes 121f-1 to 121f-4 can be made to selectively contribute to the output of the pixel 121a, or the detection signal in various combinations. That is, electric charges can be read independently from each of the photodiodes 121f-1 to 121f-4, and the photodiodes 121f-1 to 121f-4 to contribute to outputs (or the degrees of contribution of the photodiodes 121f-1 to 121f-4 to outputs) are made to differ from one another. Thus, different incident angle directivities can be obtained.

For example, the electric charges in the photodiode 121f-1 and the photodiode 121f-3 are transferred to the FD unit 163, and the signals obtained by reading the respective electric charges are added, so that an incident angle directivity in the horizontal direction can be obtained. Likewise, the electric charges in the photodiode 121f-1 and the photodiode 121f-2 are transferred to the FD unit 163, and the signals obtained by reading the respective electric charges are added, so that an incident angle directivity in the vertical direction can be obtained.

Further, a signal obtained on the basis of the electric charges selectively read out independently from the four photodiodes 121f-1 to 121f-4 is a detection signal corresponding to one pixel of a detection image.

Note that contribution of (the electric charge in) each photodiode 121f to a detection signal depends not only on whether or not the electric charge (detection value) in each photodiode 121f is to be transferred to the FD unit 163, but also on resetting of the electric charges accumulated in the photodiodes 121f before the transfer to the FD unit 163 using an electronic shutter function or the like, for example. For example, if the electric charge in a photodiode 121f is reset immediately before the transfer to the FD unit 163, the photodiode 121f does not contribute to a detection signal at all. On the other hand, time is allowed between resetting the electric charge in a photodiode 121f and transfer of the electric charge to the FD unit 163, so that the photodiode 121f partially contributes to a detection signal.

As described above, in the case of the imaging device 121 in FIG. 6, the combination to be used for a detection signal is changed among the four photodiodes 121f-1 to 121f-4, so that a different incident angle directivity can be provided for each pixel. Further, a detection signal that is output from each pixel 121a of the imaging device 121 in FIG. 6 has a value (output pixel value) modulated in accordance with the incident angle of incident light from the object, and has characteristics (directivity) that vary with the incident angle (has an incident angle directivity).

Note that, in the imaging device 121 in FIG. 6, incident light enters all the photodiodes 121f-1 to 121f-4 without being optically modulated. Therefore, a detection signal is not a signal obtained by optical modulation. Meanwhile, a photodiode 121f that does not contribute to a detection signal will be hereinafter also referred to as a photodiode 121f that does not contribute to the pixel or its output.

Further, FIG. 6 shows an example in which the light receiving surface of a pixel (a pixel 121a) is divided into four equal regions, and the photodiodes 121f each having a light receiving surface of the same size are disposed in the respective regions, or an example in which a photodiode is divided into four equal portions. However, the number of divisions and dividing positions of a photodiode can be set as appropriate.

For example, a photodiode is not necessarily divided into equal portions, and the dividing positions of the photodiode may vary with each pixel. Therefore, even if the photodiodes 121f at the same position among a plurality of pixels are made to contribute to outputs, for example, the incident angle directivity varies among the pixels. Also, the number of divisions is made to vary among the pixels, for example, so that incident angle directivities can be set more freely. Further, both the number of divisions and the dividing positions may be made to vary among the pixels, for example.

Furthermore, both the imaging device 121 in FIG. 5 and the imaging device 121 in FIG. 6 have a configuration in which each pixel can have an incident angle directivity that is set independently. Note that, in the imaging device 121 in FIG. 5, the incident angle directivity of each pixel is set by the light shielding film 121b at the time of the manufacture. In the imaging device 121 in FIG. 6, on the other hand, the number of divisions and the dividing position of the photodiode of each pixel are set at the time of the manufacture, but the incident angle directivity (the combination of photodiodes to contribute to an output) of each pixel can be set at a time of use (for example, at a time of imaging). Note that, in both the imaging device 121 in FIG. 5 and the imaging device 121 in FIG. 6, not all the pixels necessarily need to have an incident angle directivity.

Note that, as for the imaging device 121 in FIG. 5, the shape of the light shielding film 121b of each pixel 121a will be hereinafter referred to as a light shielding pattern. Meanwhile, as for the imaging device 121 in FIG. 6, the shape of the region of a photodiode 121f that does not contribute to an output in each pixel 121a will be hereinafter referred to as a light shielding pattern.

<Basic Characteristics and the Like of the Imaging Device 121>

Next, the basic characteristics and the like of the imaging device 121 are described with reference to FIGS. 7 to 14.

<Principles of Generating an Incident Angle Directivity>

Figure 7:
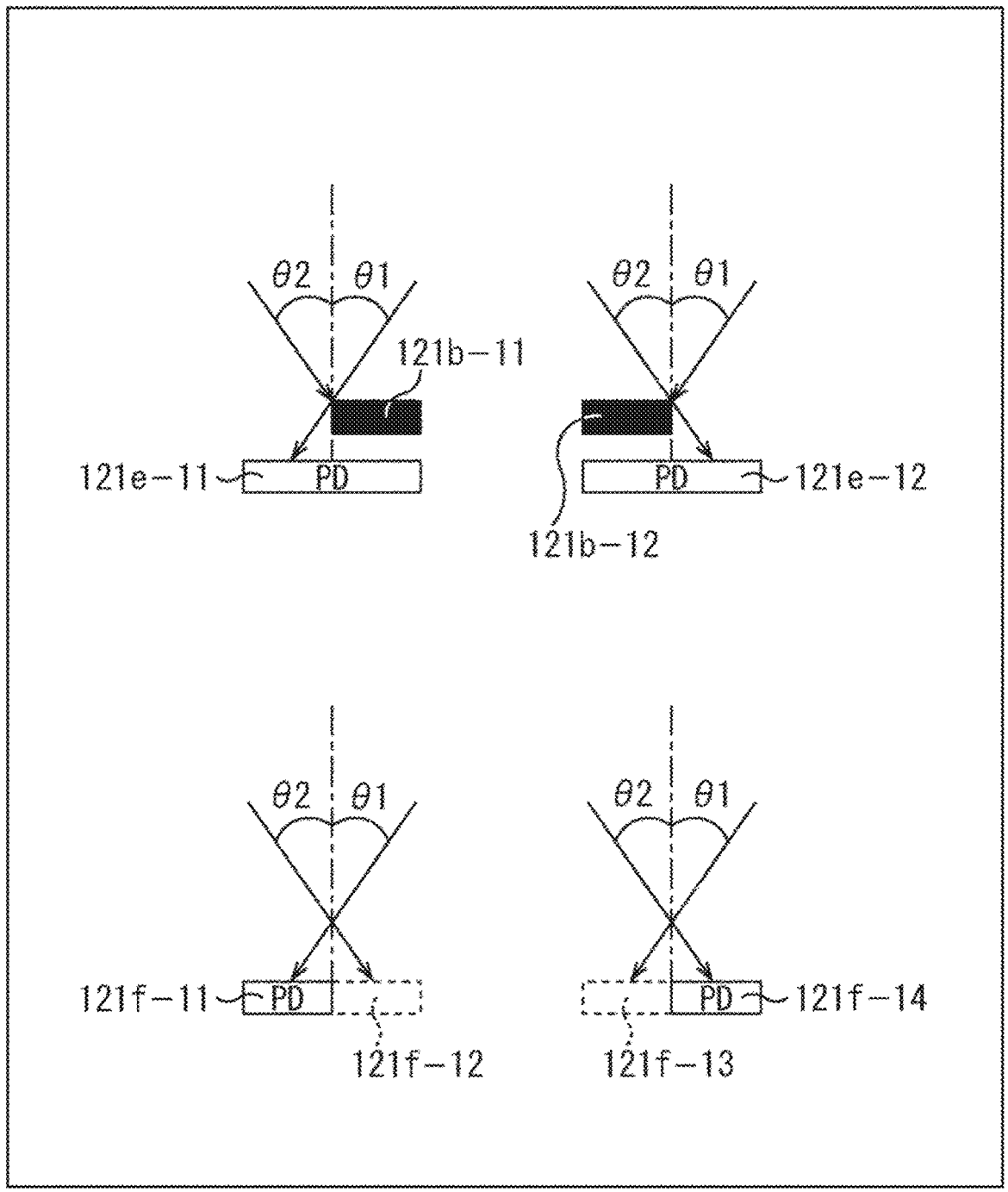
FIG. 7 is a diagram for explaining the principles of generation of incident angle directivities.

The incident angle directivity of each pixel of the imaging device 121 is generated by the principles illustrated in FIG. 7, for example. Note that the top left portion and the top right portion of FIG. 7 are diagrams for explaining the principles of generation of an incident angle directivity in the imaging device 121 shown in FIG. 5. The bottom left portion and the bottom right portion of FIG. 7 are diagrams for explaining the principles of generation of an incident angle directivity in the imaging device 121 shown in FIG. 6.

Each of the pixels in the top left portion and the top right portion of FIG. 7 includes one photodiode 121e. On the other hand, each of the pixels in the bottom left portion and the bottom right portion of FIG. 7 includes two photodiodes 121f. Note that an example in which one pixel includes two photodiodes 121f is shown herein, for ease of explanation. However, the number of photodiodes 121f included in one pixel may be other than two.

In the pixel shown in the top left portion of FIG. 7, a light shielding film 121b-11 is formed so as to shield the right half of the light receiving surface of the photodiode 121e-11. Meanwhile, in the pixel shown in the top right portion of FIG. 7, a light shielding film 121b-12 is formed so as to shield the left half of the light receiving surface of the photodiode 121e-12. Note that each dot-and-dash line in the drawing is an auxiliary line that passes through the center of the light receiving surface of the photodiode 121e in the horizontal direction and is perpendicular to the light receiving surface.

For example, in the pixel shown in the top left portion of FIG. 7, incident light from upper right that forms an incident angle θ1 with the dot-and-dash line in the drawing is easily received by the left half region of the photodiode 121e-11 that is not shielded from light by the light shielding film 121b-11. On the other hand, incident light from upper left that forms an incident angle θ2 with the dot-and-dash line in the drawing is hardly received by the left half region of the photodiode 121e-11 that is not shielded from light by the light shielding film 121b-11. Accordingly, the pixel shown in the top left portion of FIG. 7 has an incident angle directivity with a high light-receiving sensitivity to incident light from upper right in the drawing and a low light-receiving sensitivity to incident light from upper left.

Meanwhile, in the pixel shown in the top right portion of FIG. 7, for example, incident light from upper right that forms the incident angle θ1 is hardly received by the left half region of the photodiode 121e-12 shielded from light by the light shielding film 121b-12. On the other hand, incident light from upper left that forms the incident angle θ2 with the dot-and-dash line is easily received by the right half region of the photodiode 121e-12 that is not shielded from light by the light shielding film 121b-12. Accordingly, the pixel shown in the top right portion of FIG. 7 has an incident angle directivity with a low light-receiving sensitivity to incident light from upper right in the drawing and a high light-receiving sensitivity to incident light from upper left.

Further, in the pixel shown in the bottom left portion of FIG. 7, photodiodes 121f-11 and 121f-12 are provided on the right and left sides in the drawing, and one of the detection signals is read. Thus, the pixel has an incident angle directivity, without any light shielding film 121b.

Specifically, in the pixel shown in the bottom left portion of FIG. 7, only the signal of the photodiode 121f-11 provided on the left side in the drawing is read out. Thus, an incident angle directivity similar to that of the pixel shown in the top left portion of FIG. 7 can be obtained. That is, incident light from upper right that forms the incident angle θ1 with the dot-and-dash line in the drawing enters the photodiode 121f-11, and the signal corresponding to the amount of received light is read out from the photodiode 121f-11. Thus, the incident light contributes to the detection signal to be output from this pixel. On the other hand, incident light from upper left that forms the incident angle θ2 with the dot-and-dash line in the drawing enters the photodiode 121f-12, but is not read out from the photodiode 121f-12. Therefore, the incident light does not contribute to the detection signal to be output from this pixel.

Likewise, in a case where two photodiodes 121f-13 and 121f-14 are included as in the pixel shown in the bottom right portion of FIG. 7, only the signal of the photodiode 121f-14 provided on the right side in the drawing is read out, so that an incident angle directivity similar to that of the pixel shown in the top right portion of FIG. 7 can be obtained. That is, incident light from upper right that forms the incident angle θ1 enters the photodiode 121f-13, but any signal is not read out from the photodiode 121f-13. Therefore, the incident light does not contribute to the detection signal to be output from this pixel. On the other hand, incident light from upper left that forms the incident angle θ2 enters the photodiode 121f-14, and the signal corresponding to the amount of received light is read out from the photodiode 121f-14. Thus, the incident light contributes to the detection signal to be output from this pixel.

Note that, in each pixel shown in the top portions of FIG. 7, the region shielded from light and the region not shielded from light are divided at the center position of (the light receiving surface of the photodiode 121e of) the pixel in the horizontal direction in the example described above. However, the regions may be divided at some other position. Meanwhile, in each pixel shown in the bottom portions of FIG. 7, the two photodiodes 121f are divided at the center position of the pixel in the horizontal direction in the example described above. However, the two photodiodes may be divided at some other position. As the light-shielded region or the position at which the photodiodes 121f are divided is changed in the above manner, different incident angle directivities can be generated.

<Incident Angle Directivities in Configurations Including On-Chip Lenses>

Next, incident angle directivities in configurations including on-chip lenses 121c are described with reference to FIG. 8.

Figure 8:
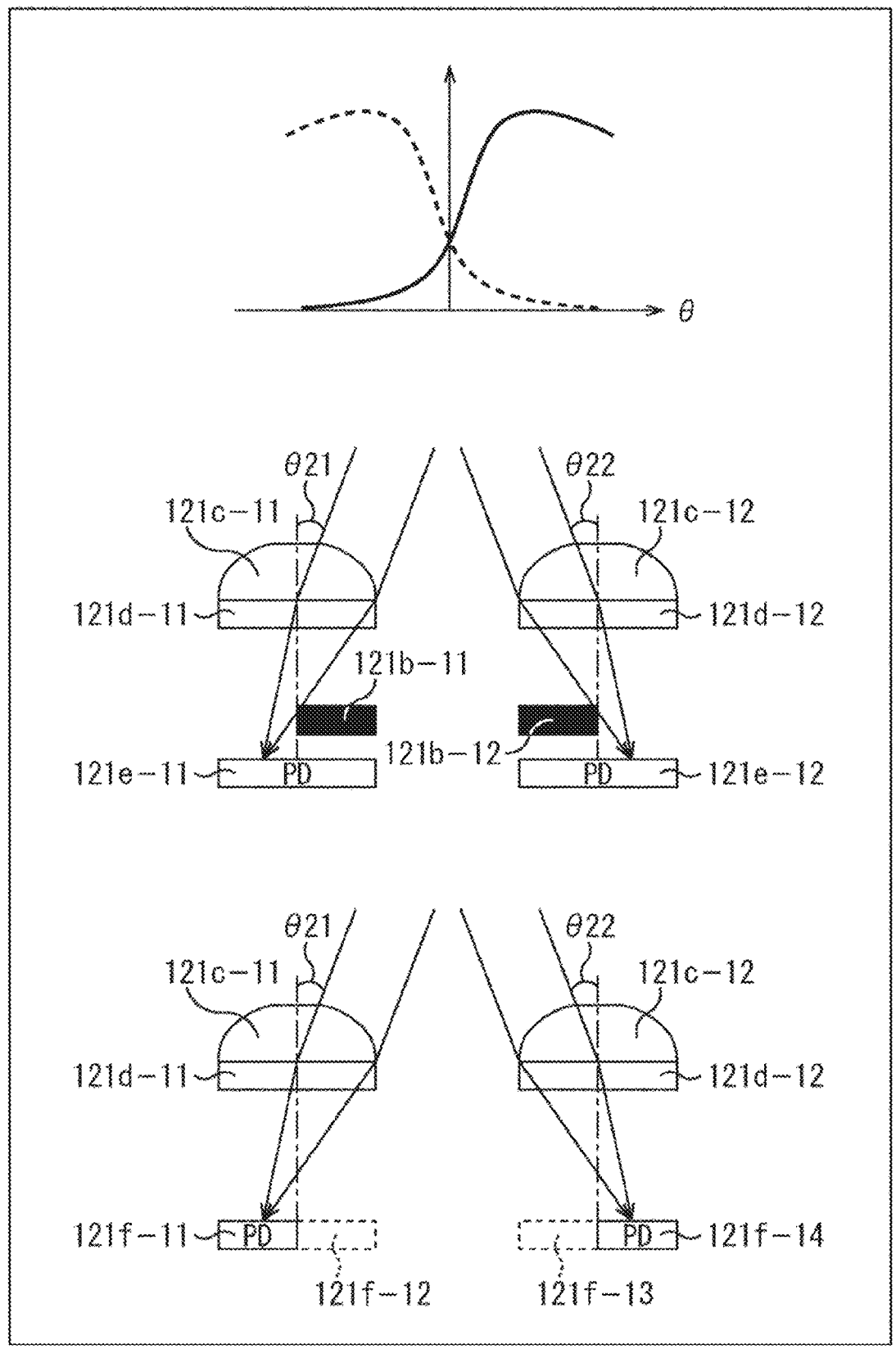
FIG. 8 is a diagram for explaining changes in incident angle directivity using on-chip lenses.

The graph in the top portion of FIG. 8 shows the incident angle directivities of the pixels shown in the middle and bottom portions of FIG. 8. Note that the abscissa axis indicates incident angle θ, and the ordinate axis indicates detection signal level. Note that the incident angle θ is 0 degrees in a case where the direction of incident light coincides with the dot-and-dash line on the left side of the middle part of FIG. 8, the incident angle θ21 side on the left side in the middle portion of FIG. 8 is a positive direction, and the side of an incident angle θ22 on the right side in the middle portion of FIG. 8 is a negative direction. Accordingly, the incident angle of incident light entering the on-chip lens 121c from upper right is greater than that of incident light entering from upper left. That is, the incident angle θ is greater when the inclination of the traveling direction of incident light to the left is greater (or the incident angle θ increases in the positive direction), and the incident angle θ is smaller when the inclination of the traveling direction of incident light to the right is greater (or the incident angle θ increases in the negative direction).

Meanwhile, the pixel shown in the middle left portion of FIG. 8 is obtained by adding an on-chip lens 121c-11 that condenses incident light and a color filter 121d-11 that transmits light of a predetermined wavelength, to the pixel shown in the top left portion of FIG. 7. That is, in this pixel, the on-chip lens 121c-11, the color filter 121d-11, the light shielding film 121b-11, and the photodiode 121e-11 are stacked in this order from the incident direction of light from above in the drawing.

Likewise, the pixel shown in the middle right portion of FIG. 8, the pixel shown in the bottom left portion of FIG. 8, and the pixel shown in the bottom right portion of FIG. 8 are obtained by adding an on-chip lens 121c-11 and a color filter 121d-11, or an on-chip lens 121c-12 and a color filter 121d-12 to the pixel shown in the top right portion of FIG. 7, the pixel shown in the bottom left portion of FIG. 7, and the pixel shown in the bottom right portion of FIG. 7, respectively.

In the pixel shown in the middle left portion of FIG. 8, as indicated by the solid-line waveform in the top portion of FIG. 8, the detection signal level (light-receiving sensitivity) of the photodiode 121e-11 varies depending on the incident angle θ of incident light. That is, when the incident angle θ, which is the angle formed by incident light with respect to the dot-and-dash line in the drawing, is greater (or when the incident angle θ is greater in the positive direction (or inclines to the right in the drawing)), light is condensed in the region in which the light shielding film 121b-11 is not provided, and accordingly, the detection signal level of the photodiode 121e-11 becomes higher. Conversely, when the incident angle θ of incident light is smaller (or when the incident angle θ is greater in the negative direction (as inclines to the left in the drawing)), light is condensed in the region in which the light shielding film 121b-11 is provided, and accordingly, the detection signal level of the photodiode 121e-11 becomes lower.

Also, in the pixel shown in the middle right portion of FIG. 8, as indicated by the dashed-line waveform in the top portion of FIG. 8, the detection signal level (light-receiving sensitivity) of the photodiode 121e-12 varies depending on the incident angle θ of incident light. Specifically, when the incident angle θ of incident light is greater (or when the incident angle θ is greater in the positive direction), light is condensed in the region in which the light shielding film 121b-12 is provided, and accordingly, the detection signal level of the photodiode 121e-12 becomes lower. Conversely, when the incident angle θ of incident light is smaller (or when the incident angle θ is greater in the negative direction), light is condensed in the region in which the light shielding film 121*b*-12 is not provided, and accordingly, the detection signal level of the photodiode 121*e*-12 becomes higher.

The solid-line and dashed-line waveforms shown in the top portion of FIG. 8 can be made to vary depending on the region of the light shielding film 121*b*. Accordingly, different incident angle directivities that vary with the respective pixels can be generated, depending on the region of the light shielding film 121*b*.

As described above, an incident angle directivity is the characteristics of the light-receiving sensitivity of each pixel depending on the incident angle θ, but it can also be said that this is the characteristics of the light shielding value depending on the incident angle θ in each pixel in the middle portions of FIG. 8. That is, the light shielding film 121*b* blocks incident light in a specific direction at a high level, but cannot sufficiently block incident light from other directions. The changes caused in level by this light shielding generates detection signal levels that vary with the incident angle θ as shown in the top portion of FIG. 8. Therefore, when the direction in which light can be blocked at the highest level in each pixel is defined as the light shielding direction of each pixel, the respective pixels having different incident angle directivities from one another means the respective pixels having different light shielding directions from one another.

Further, in the pixel shown in the bottom left portion of FIG. 8, only the signal of the photodiode 121*f*-11 in the left portion of the drawing is used, so that an incident angle directivity similar to that of the pixel shown in the middle left portion of FIG. 8 can be obtained, as in the pixel shown in the bottom left portion of FIG. 7. That is, as the incident angle θ of incident light becomes greater (or as the incident angle θ becomes greater in the positive direction), light is condensed in the region of the photodiode 121*f*-11 from which the signal is to be read, and accordingly, the detection signal level becomes higher. Conversely, as the incident angle θ of incident light is smaller (or as the incident angle θ is greater in the negative direction), light is condensed in the region of the photodiode 121*f*-12 from which the signal is not to be read, and accordingly, the detection signal level becomes lower.

Further, likewise, in the pixel shown in the bottom right portion of FIG. 8, only the signal of the photodiode 121*f*-14 in the right portion of the drawing is used, so that an incident angle directivity similar to that of the pixel shown in the middle right portion of FIG. 8 can be obtained, as in the pixel shown in the bottom right portion of FIG. 7. That is, when the incident angle θ of incident light is greater (or when the incident angle θ is greater in the positive direction), light is condensed in the region of the photodiode 121*f*-13 that does not contribute to the output (detection signal), and accordingly, the level of the detection signal of each pixel becomes lower. Conversely, when the incident angle θ of incident light is smaller (or when the incident angle θ is greater in the negative direction), light is condensed in the region of the photodiode 121*f*-14 that contributes to the output (detection signal), and accordingly, the level of the detection signal in each pixel becomes higher.

Here, the centroid of the incident angle directivity of a pixel 121*a* is defined as follows.

The centroid of the incident angle directivity is the centroid of the distribution of the intensity of incident light that enters the light receiving surface of the pixel 121*a*. The light receiving surface of the pixel 121*a* is the light receiving surface of the photodiode 121*e* in each pixel 121*a* shown in the middle portions of FIG. 8, and is the light receiving surface of the photodiode 121*f* in each pixel 121*a* shown in the bottom portions of FIG. 8.

For example, the detection signal level on the ordinate axis of the graph shown in the top portion of FIG. 8 is represented by a(θ), and a light beam having an incident angle θ g calculated according to Equation (4) shown below is a centroidal light beam.

$$\theta g = \Sigma(a(\theta) \times \theta)/\Sigma a(\theta) \qquad (4)$$

Further, the point at which the centroidal light beam intersects the light receiving surface of the pixel 121*a* is the centroid of the incident angle directivity of the pixel 121*a*.

Also, as in the pixels shown in the bottom portions of FIG. 8, in a pixel that includes a plurality of photodiodes so as to be able to change the photodiode contributing to an output, each photodiode is made to have a directivity with respect to the incident angle of incident light. The on-chip lenses 121*c* need to be provided in each pixel so that an incident angle directivity is generated in each pixel.

Note that, in the description below, an example case where pixels 121*a* that achieve incident angle directivities using the light shielding films 121*b* like the pixel 121*a* shown in FIG. 5 will be mainly described. However, unless the light shielding films 121*b* are necessary, it is also possible to use pixels 121*a* that basically divide photodiodes to obtain incident angle directivities.

<Relationship Between Light-Shielded Region and Field of View>

Next, the relationship between the light-shielded regions and the fields of view of pixels 121*a* is described with reference to FIGS. 9 and 14.

Figure 9:
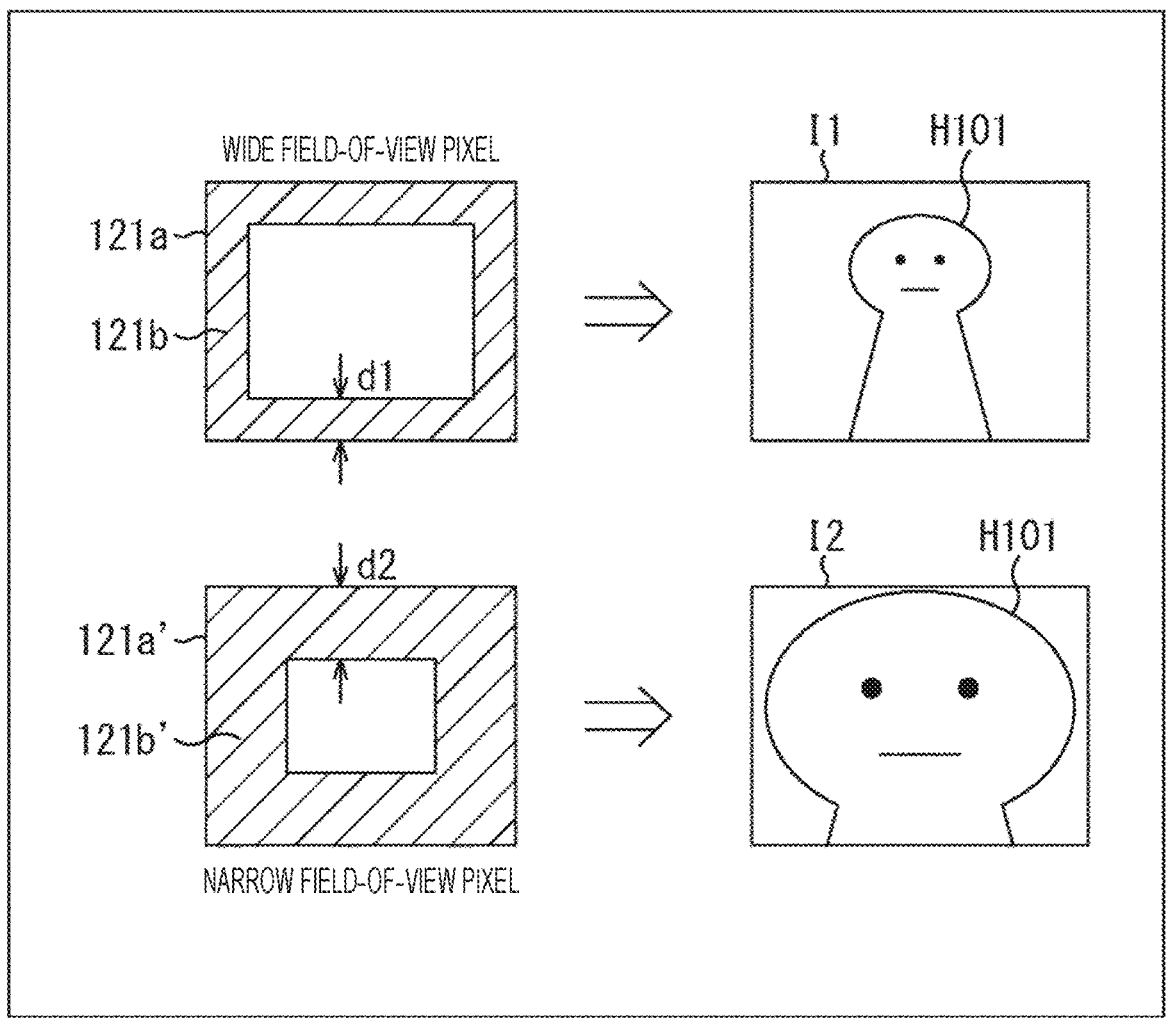
FIG. 9 is a diagram for explaining the relationship between a narrow field-of-view pixel and a wide field-of-view pixel.

For example, a pixel 121*a* shielded from light by the light shielding film 121*b* by a width d1 from each edge of the four sides as shown in the top portion of FIG. 9, and a pixel 121*a*' shielded from light by the light shielding film 121*b* by a width d2 (>d1) from each edge of the four sides as shown in the bottom portion of FIG. 9 are now described.

Figure 10:
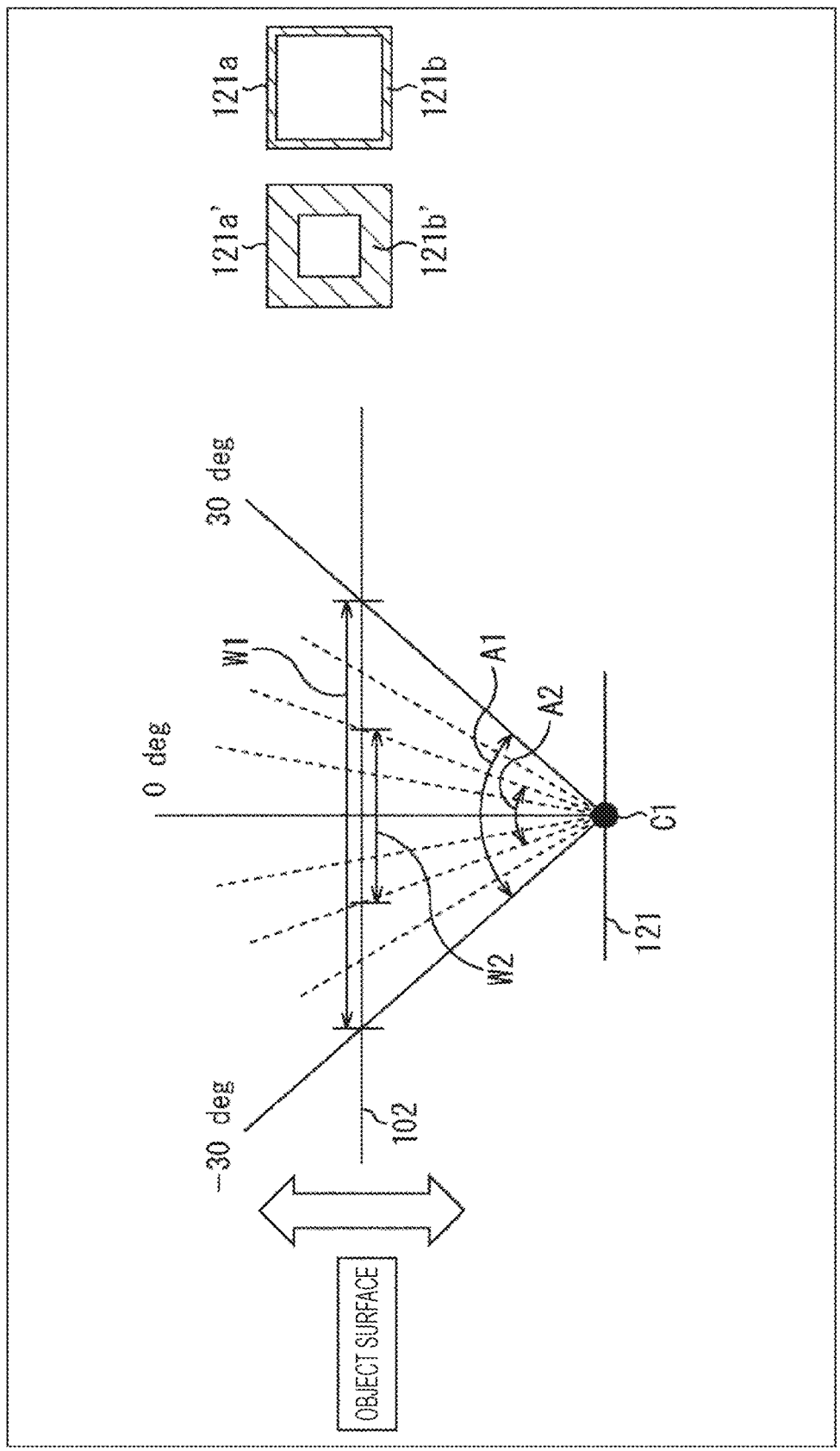
FIG. 10 is a diagram for explaining the relationship between a narrow field-of-view pixel and a wide field-of-view pixel.

FIG. 10 shows an example of incident angles of incident light from the object surface 102 to the center position C1 of the imaging device 121. Note that FIG. 10 shows an example of incident angles of incident light in the horizontal direction, but similar incident angles are observed in the vertical direction. Further, the right portion of FIG. 10 shows the pixels 121*a* and 121*a*' shown in FIG. 9.

For example, in a case where the pixel 121*a* shown in FIG. 9 is disposed at the center position C1 of the imaging device 121, the range of the incident angle of incident light from the object surface 102 to the pixel 121*a* is represented by an angle A1 as shown in the left portion of FIG. 10. Accordingly, the pixel 121*a* can receive incident light of the width W1 of the object surface 102 in the horizontal direction.

On the other hand, in a case where the pixel 121*a*' in FIG. 9 is disposed at the center position C1 of the imaging device 121, the range of the incident angle of incident light from the object surface 102 to the pixel 121*a*' is represented by an angle A2 (<A1) as shown in the left portion of FIG. 10, because the pixel 121*a*' has a wider light-shielded region than the pixel 121*a*. Therefore, the pixel 121*a*' can receive incident light of the width W2 (<W1) of the object surface 102 in the horizontal direction.

That is, the pixel 121*a* having a narrow light-shielded region is a wide field-of-view pixel suitable for imaging a wide region on the object surface 102, while the pixel 121*a*' having a wide light-shielded region is a narrow field-of-view pixel suitable for imaging a narrow region on the object surface 102. Note that the wide field-of-view pixel and the narrow field-of-view pixel mentioned herein are expressions for comparing both the pixels 121a and 121a' shown in FIG. 9, and are not limited to these pixels in comparing pixels having other fields of view.

Therefore, the pixel 121a is used to restore an image I1 shown in FIG. 9, for example. The image I1 is an image that includes an entire person H101 as the object shown in the top portion of FIG. 11, and has a field of view SQ1 corresponding to the object width W1. On the other hand, the pixel 121a' is used to restore an image I2 shown in FIG. 9, for example. The image I2 is an image that shows the face of the person H101 shown in the top portion of FIG. 11 and the area surrounding the face in an enlarged manner, and has a field of view SQ2 corresponding to the object width W2.

Figure 11:
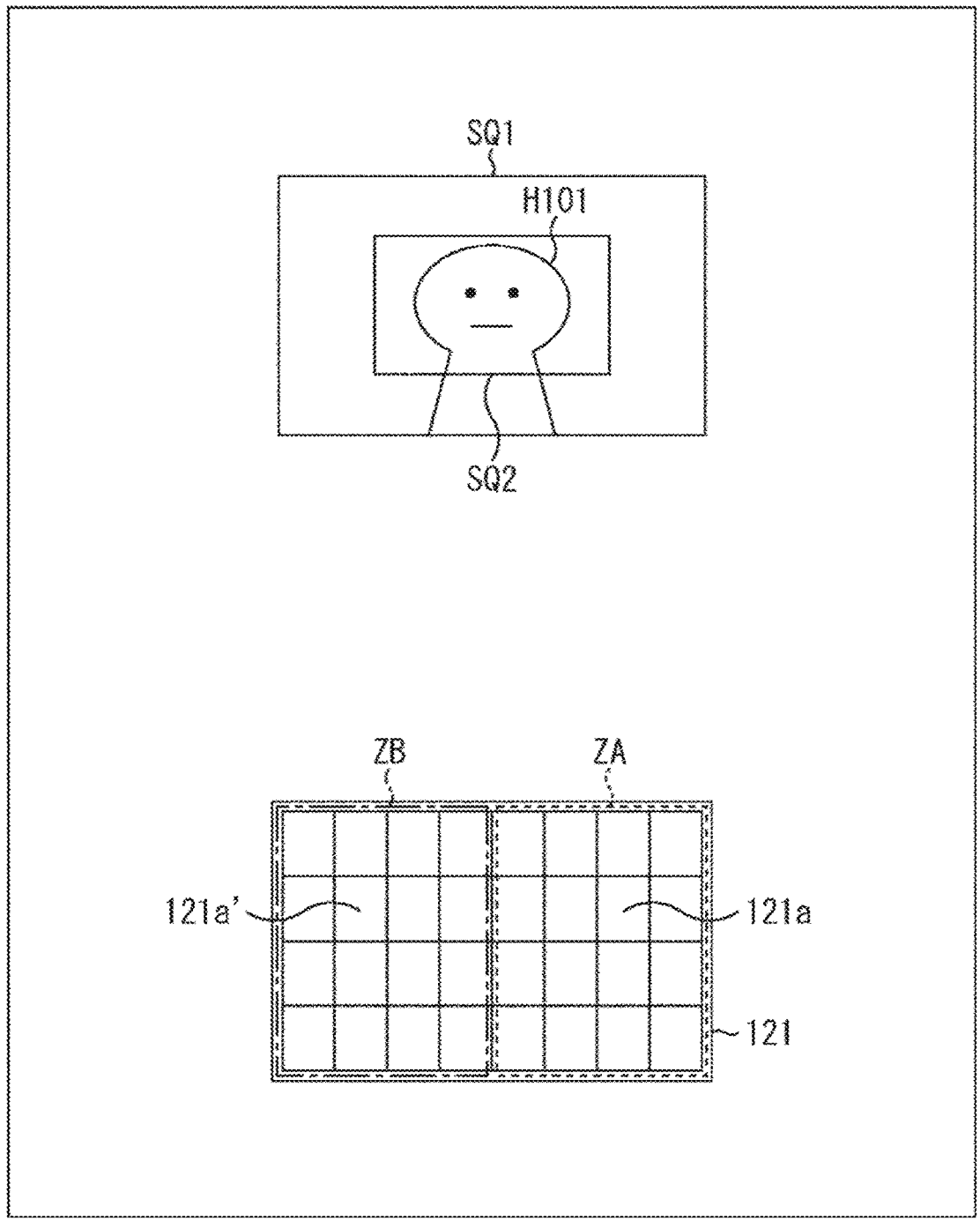
FIG. 11 is a diagram for explaining the relationship between a narrow field-of-view pixel and a wide field-of-view pixel.

Meanwhile, as shown in the bottom portion of FIG. 11, it is possible to gather and arrange a predetermined number of pixels 121a shown in FIG. 9 in a region ZA surrounded by a dashed line in the imaging device 121, and a predetermined number of pixels 121a' in a region ZB surrounded by a dot-and-dash line, for example. Further, when an image of the field of view SQ1 corresponding to the object width W1 is to be restored, for example, the detection signals of the respective pixels 121a in the region ZA are used, so that the image of the field of view SQ1 can be appropriately restored. On the other hand, when an image of the field of view SQ2 corresponding to the object width W2 is to be restored, the detection signals of the respective pixels 121a' in the region ZB are used, so that the image of the field of view SQ2 can be appropriately restored.

Note that the field of view SQ2 is smaller than the field of view SQ1. Therefore, in a case where an image of the field of view SQ2 and an image of the field of view SQ1 are to be restored with the same number of pixels, it is possible to obtain a restored image with higher image quality (higher resolution) by restoring the image of the field of view SQ2 than by restoring the image of the field of view SQ1.

That is, in a case where restored images are to be obtained with the same number of pixels, a restored image with higher image quality can be obtained by restoring an image with a smaller field of view.

Figure 12:
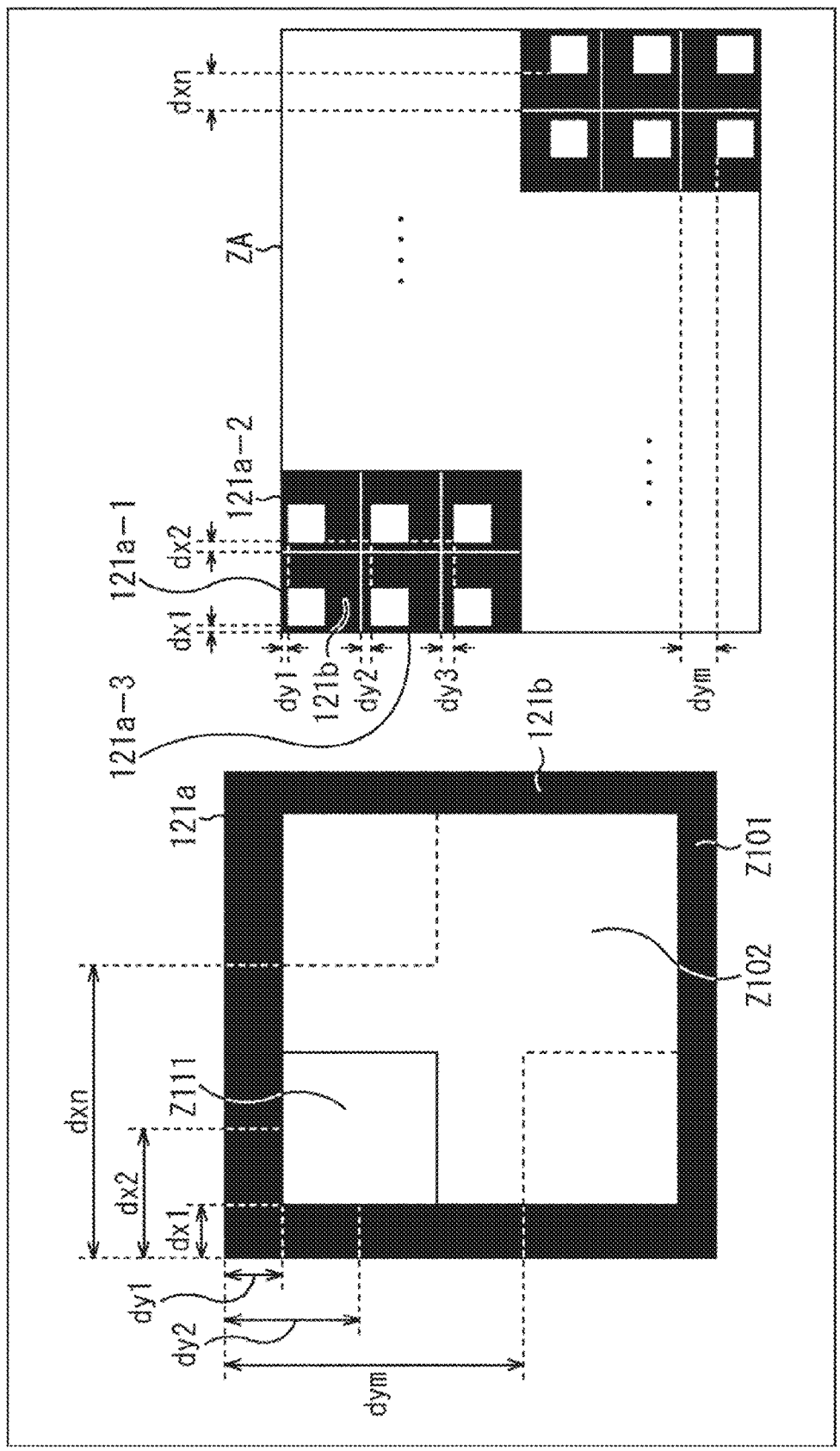
FIG. 12 is a diagram for explaining a difference in image quality between a narrow field-of-view pixel and a wide field-of-view pixel.

For example, the right portion of FIG. 12 shows an example configuration within the region ZA in the imaging device 121 shown in FIG. 11. The left portion of FIG. 12 shows an example configuration of a pixel 121a in the region ZA.

In FIG. 12, the regions in black are the light shielding films 121b, and the light-shielded region of each pixel 121a is determined in accordance with the rule shown in the left portion of FIG. 12, for example.

The principal light-shielded portion Z101 in the left portion of FIG. 12 (the black portion in the left portion of FIG. 12) is the region that is shielded from light in each pixel 121a. Specifically, the principal light-shielded portion Z101 is the region having a width dx1 from each of the right and left sides of the pixel 121a toward the inside of the pixel 121a, and is the region having a height dy1 from each of the top and bottom sides of the pixel 121a toward the inside of the pixel 121a. Further, in each pixel 121a, a rectangular opening Z111 that is not shielded from light by the light shielding film 121b is provided within a region Z102 on the inner side of the principal light-shielded portion Z101. Accordingly, in each pixel 121a, the region other than the opening Z111 is shielded from light by the light shielding film 121b.

Here, the openings Z111 of the respective pixels 121a are regularly arranged. Specifically, the position of the opening Z111 in the horizontal direction in each pixel 121a is the same among the pixels 121a in the same column in the vertical direction. Also, the position of the opening Z111 in each pixel 121a is the same among the pixels 121a in the same row in the horizontal direction.

On the other hand, the position of the opening Z111 in each pixel 121a in the horizontal direction is shifted by a predetermined distance in accordance with the position of the pixel 121a in the horizontal direction. That is, as the position of the pixel 121a becomes closer to the right, the left side of the opening Z111 moves to a position shifted to the right by a width dx1, dx2, . . . , and dxn from the left side of the pixel 121a. The distance between the width dx1 and the width dx2, the distance between the width dx2 and the width dx3, . . . , and the distance between the width dxn−1 and the width dxn each have the value obtained by dividing the length obtained by subtracting the width of the opening Z111 from the width of the region Z102 in the horizontal direction by the number n−1 of pixels in the horizontal direction.

Also, the position of the opening Z111 in each pixel 121a in the vertical direction is shifted by a predetermined distance in accordance with the position of the pixel 121a in the vertical direction. That is, as the position of the pixel 121a becomes closer to the bottom, the top side of the opening Z111 moves to a position shifted to the bottom by a height dy1, dy2, . . . , and dyn from the top side of the pixel 121a. The distance between the height dy1 and the height dy2, the distance between the height dy2 and the height dy3, . . . , and the distance between the height dyn−1 and the height dyn each have the value obtained by dividing the length obtained by subtracting the height of the opening Z111 from the height of the region Z102 in the vertical direction by the number m−1 of pixels in the vertical direction.

Figure 13:
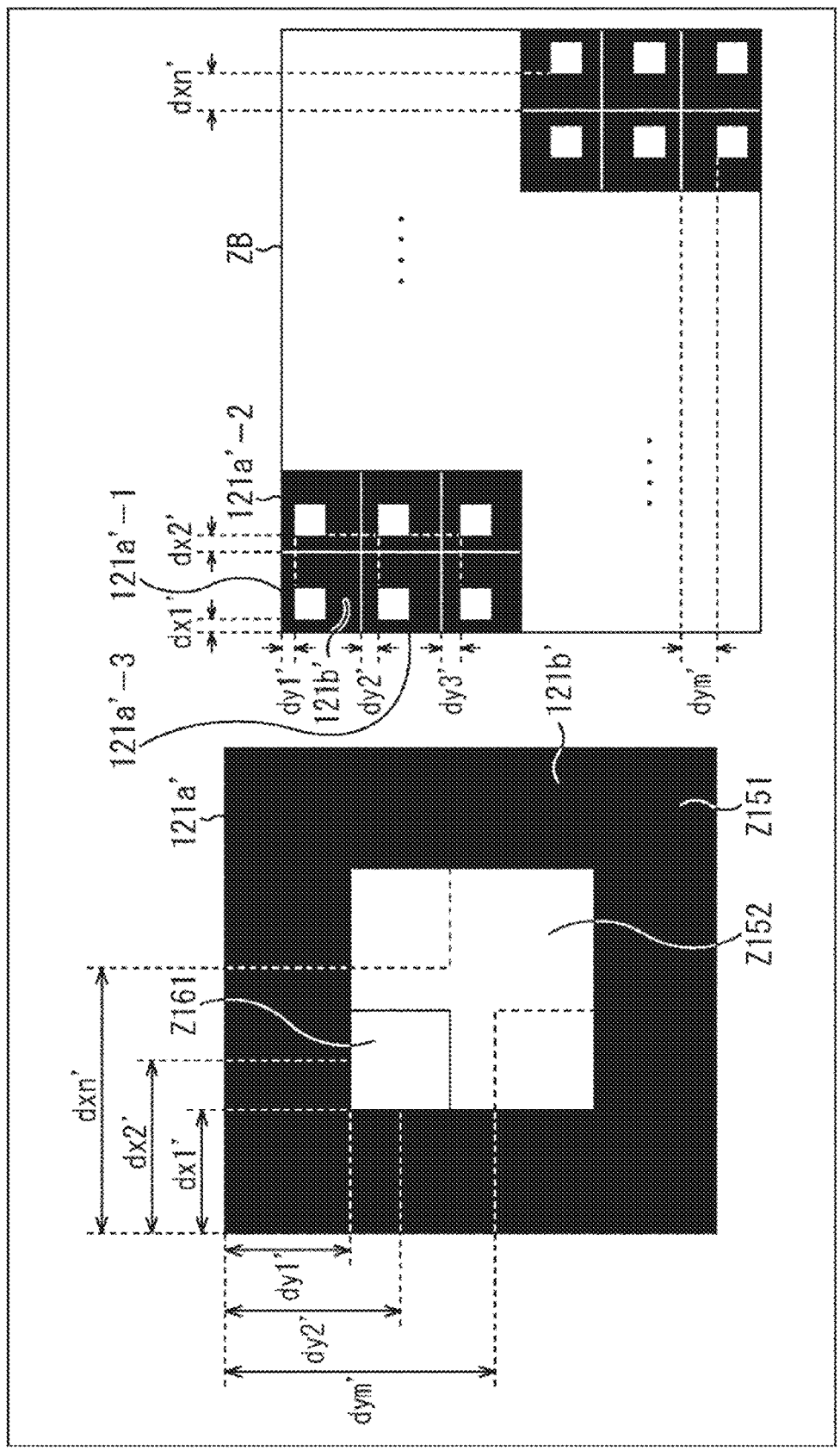
FIG. 13 is a diagram for explaining a difference in image quality between a narrow field-of-view pixel and a wide field-of-view pixel.

The right portion of FIG. 13 shows an example configuration within the region ZB in the imaging device 121 shown in FIG. 11. The left portion of FIG. 13 shows an example configuration of a pixel 121a' in the region ZB.

In FIG. 13, the regions in black are the light shielding films 121b', and the light-shielded region of each pixel 121a' is determined in accordance with the rule shown in the left portion of FIG. 13, for example.

The principal light-shielded portion Z151 in the left portion of FIG. 13 (the black portion in the left portion of FIG. 13) is the region that is shielded from light in each pixel 121a'. Specifically, the principal light-shielded portion Z151 is the region having a width dx1' from each of the right and left sides of the pixel 121a' toward the inside of the pixel 121a', and is the region having a height dy1' from each of the top and bottom sides of the pixel 121a' toward the inside of the pixel 121a'. Further, in each pixel 121a', a rectangular opening Z161 that is not shielded from light by the light shielding film 121b' is provided within a region Z152 on the inner side of the principal light-shielded portion Z151. Accordingly, in each pixel 121a', the region other than the opening Z161 is shielded from light by the light shielding film 121b'.

Here, the openings Z161 of the respective pixels 121a' are regularly arranged, like the openings Z111 of the respective pixels 121a shown in FIG. 12. Specifically, the position of the opening Z161 in the horizontal direction in each pixel 121a' is the same among the pixels 121a' in the same column in the vertical direction. Also, the position of the opening Z161 in each pixel 121a' is the same among the pixels 121a' in the same row in the horizontal direction.

On the other hand, the position of the opening Z161 in each pixel 121a' in the horizontal direction is shifted by a predetermined distance in accordance with the position of the pixel 121a' in the horizontal direction. That is, as the position of the pixel 121a' becomes closer to the right, the left side of the opening Z161 moves to a position shifted to the right by a width dx1', dx2', ..., and dxn' from the left side of the pixel 121a'. The distance between the width dx1' and the width dx2', the distance between the width dx2' and the width dx3', ..., and the distance between the width dxn−1' and the width dxn' each have the value obtained by dividing the length obtained by subtracting the width of the opening Z161 from the width of the region Z152 in the horizontal direction by the number n−1 of pixels in the horizontal direction.

Also, the position of the opening Z161 in each pixel 121a' in the vertical direction is shifted by a predetermined distance in accordance with the position of the pixel 121a' in the vertical direction. That is, as the position of the pixel 121a' becomes closer to the bottom, the top side of the opening Z161 moves to a position shifted to the bottom by a height dy1', dy2', ..., and dyn' from the top side of the pixel 121a'. The distance between the height dy1' and the height dy2', the distance between the height dy2' and the height dy3', ..., and the distance between the height dyn−1' and the height dyn' each have the value obtained by dividing the length obtained by subtracting the height of the opening Z161 from the height of the region Z152 in the vertical direction by the number m−1 of pixels in the vertical direction.

Here, the length obtained by subtracting the width of the opening Z111 from the width of the region Z102 in the horizontal direction in each pixel 121a shown in FIG. 12 is greater than the width obtained by subtracting the width of the opening Z161 from the width of the region Z152 in the horizontal direction in each pixel 121a' shown in FIG. 13. Accordingly, the stepwise differences among the widths dx1, dx2, ..., and dxn in FIG. 12 are larger than the stepwise differences among the widths dx1', dx2', ..., and dxn' in FIG. 13.

Also, the length obtained by subtracting the height of the opening Z111 from the height of the region Z102 in the vertical direction in each pixel 121a shown in FIG. 12 is greater than the length obtained by subtracting the height of the opening Z161 from the height of the region Z152 in the vertical direction in each pixel 121a' shown in FIG. 13. Accordingly, the stepwise differences among the heights dy1, dy2, ..., and dyn in FIG. 12 are larger than the stepwise differences among the heights dy1', dy2', and dyn' in FIG. 13.

As described above, the stepwise differences in the positions in the horizontal direction and the vertical direction of the opening Z111 of the light shielding film 121b of each pixel 121a shown in FIG. 12 differ from the stepwise differences in the positions in the horizontal direction and the vertical direction of the opening Z161 of the light shielding film 121b' of each pixel 121a' shown in FIG. 13. The stepwise differences then turn into differences in object resolution (angular resolution) in restored images. That is, the stepwise differences in the positions in the horizontal direction and the vertical direction of the opening Z161 of the light shielding film 121b' of each pixel 121a' shown in FIG. 13 are smaller than the stepwise differences in the positions in the horizontal direction and the vertical direction of the opening Z111 of the light shielding film 121b of each pixel 121a shown in FIG. 12. Accordingly, a restored image restored with the use of the detection signals of the respective pixels 121a' shown in FIG. 13 has a higher object resolution and a higher image quality (higher resolution) than a restored image restored with the use of the detection signals of the respective pixels 121a shown in FIG. 12.

As the combination of the light-shielded region of the principal light-shielded portion and the opening region of the opening is varied as above, it becomes possible to obtain the imaging device 121 including pixels having various fields of view (or having various incident angle directivities).

Note that, in the example described above, the pixels 121a and the pixels 121a' are separately arranged in the region ZA and the region ZB. However, this is for ease of explanation, and pixels 121a corresponding to different fields of view are preferably disposed in the same region.

Figure 14:
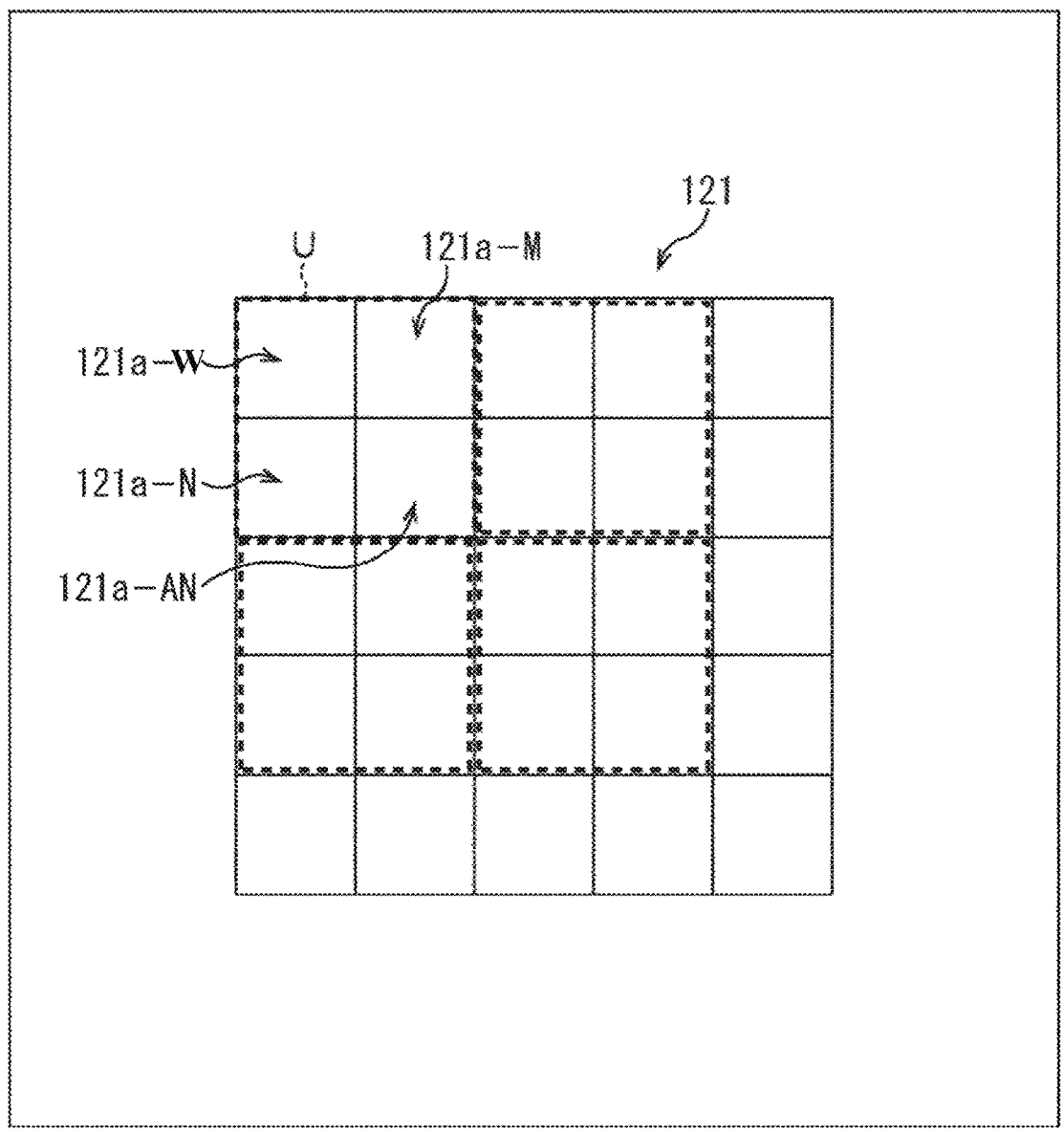
FIG. 14 is a diagram for explaining an example combination of pixels having a plurality of fields of view.

For example, as shown in FIG. 14, four pixels formed with 2×2 pixels indicated by a dashed line are set as one unit U, and each unit U is formed with the four pixels: a pixel 121a-W having a wide field of view, a pixel 121a-M having a medium field of view, a pixel 121a-N having a narrow field of view, and a pixel 121a-AN having a very narrow field of view.

In this case, or in a case where the total number of pixels 121a is X, for example, it is possible to restore a restored image, using a detection image of a X/4 pixel for each of the four kinds of fields of view. At this stage, four kinds of coefficient set groups that vary with the respective fields of view are used, and restored images with different fields of view from one another are restored with four different simultaneous equations.

Accordingly, restored image are restored with the use of detection images obtained from the pixels suitable for imaging with the fields of view of the restored image to be restored, so that appropriate restored images for the four kinds of fields of view can be obtained.

Further, an image having an intermediate field of view of the four fields of view, and images having fields of view around the intermediate field of view may be generated by interpolation from images with the four fields of view, or pseudo optical zoom may be achieved by seamlessly generating images having various fields of view.

Note that, in a case where an image with a wide field of view is to be obtained as a restored image, for example, all the wide field-of-view pixels may be used, or some of the wide field-of-view pixels may be used. Also, in a case where an image with a narrow field of view is to be obtained as a restored image, for example, all the narrow field-of-view pixels may be used, or some of the narrow field-of-view pixels may be used.

<Example Configuration of the Driver Recognition Unit 23>

Figure 15:
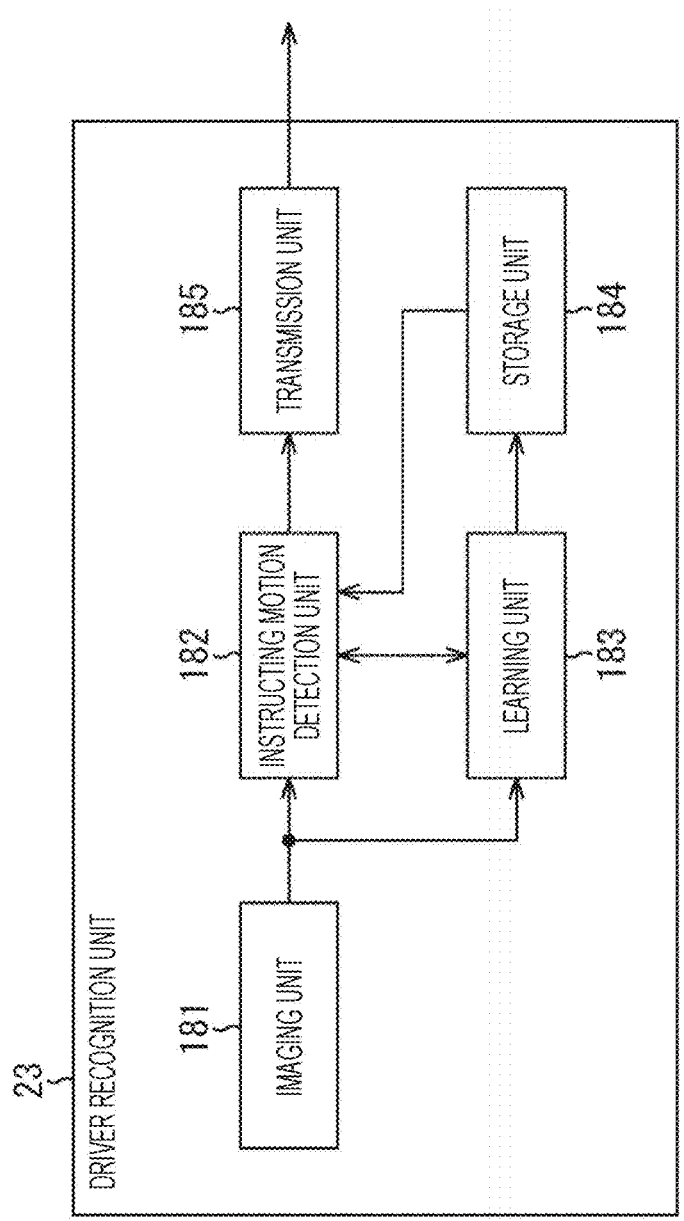
FIG. 15 is a block diagram showing an example configuration of the driver recognition unit of the in-vehicle system shown in FIG. 1.

FIG. 15 is a block diagram showing an example configuration of the driver recognition unit 23 shown in FIG. 1. The driver recognition unit 23 includes an imaging unit 181, an instructing motion detection unit 182, a learning unit 183, a storage unit 184, and a transmission unit 185.

The imaging unit 181 is installed at a position at which an image of the driver in the vehicle can be captured. The imaging unit 181 captures an image of the driver, and supplies the obtained image (hereinafter referred to as the driver image) to the instructing motion detection unit 182 and the learning unit 183.

On the basis of the driver image, and detecting conditions stored in the storage unit 184, the instructing motion detection unit 182 performs a process of detecting a motion of the driver issuing an instruction to change the display range of the side image to be displayed on the display unit 25 (this motion will be hereinafter referred to as the display change instructing motion). The display change instructing motion is made by the driver moving one or more of the following body parts: a hand, the head, the line of sight, and the like, for example.

In a case where the instructing motion detection unit 182 detects the display change instructing motion, the instructing motion detection unit 182 supplies data indicating the instruction content to the transmission unit 185. The instructing motion detection unit 182 also supplies data indicating the result of detection of the display change instructing motion, to the learning unit 183.

The learning unit 183 learns the detecting conditions for the display change instructing motion, on the basis of the driver image, the result of detection of the display change instructing motion, and an instruction input by the driver or the like via an input unit (not shown) to issue an instruction to change the display range of the side image to be displayed on the display unit 25. The learning unit 183 stores the detecting conditions obtained by the learning, into the storage unit 184.

The transmission unit 185 converts the data indicating the instruction content supplied from the instructing motion detection unit 182 into data in a communication format, and outputs the data to the bus B1.

<Example Hardware Configuration of a Camera Module 21>

Figure 16:
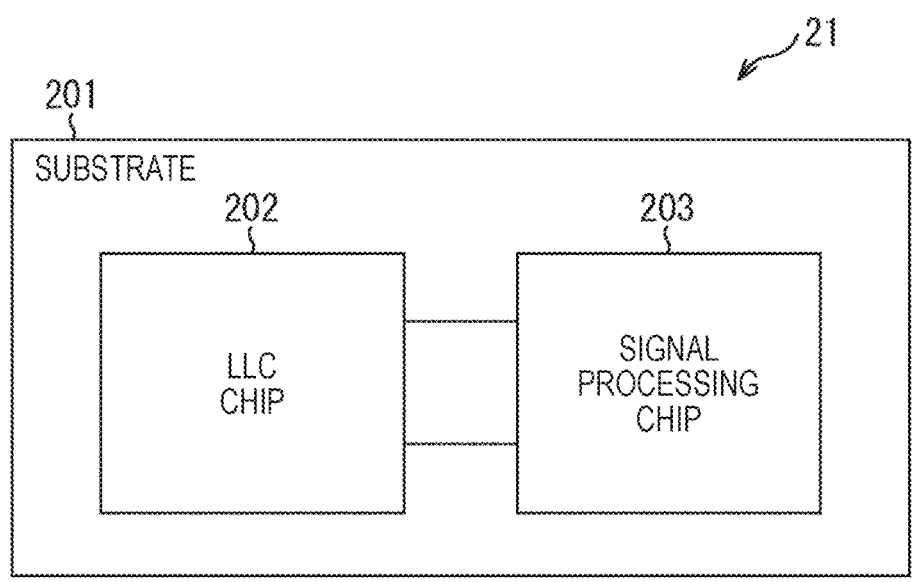
FIG. 16 is a diagram showing an example hardware configuration of a camera module.

FIG. 16 shows an example hardware configuration of a camera module 21.

In the camera module 21 shown in FIG. 16, two semiconductor chips that are an LLC chip 202 and a signal processing chip 203 are mounted on the same substrate 201.

The LLC chip 202 is a semiconductor chip including the imaging unit 41 shown in FIG. 1.

The signal processing chip 203 is a semiconductor chip including the camera ECU 42 and the MCU 43 shown in FIG. 1.

As the LLC chip 202 and the signal processing chip 203 are disposed on the same substrate 201 as described above, a flexible substrate becomes unnecessary, and unnecessary radiation is reduced.

<Example of Installation of Camera Modules 21, Display Units 25, and Imaging Units 181>

Next, an example of installation of the camera modules 21, the display units 25, and the imaging units 181 is described with reference to FIGS. 17 and 18.

Figure 17:
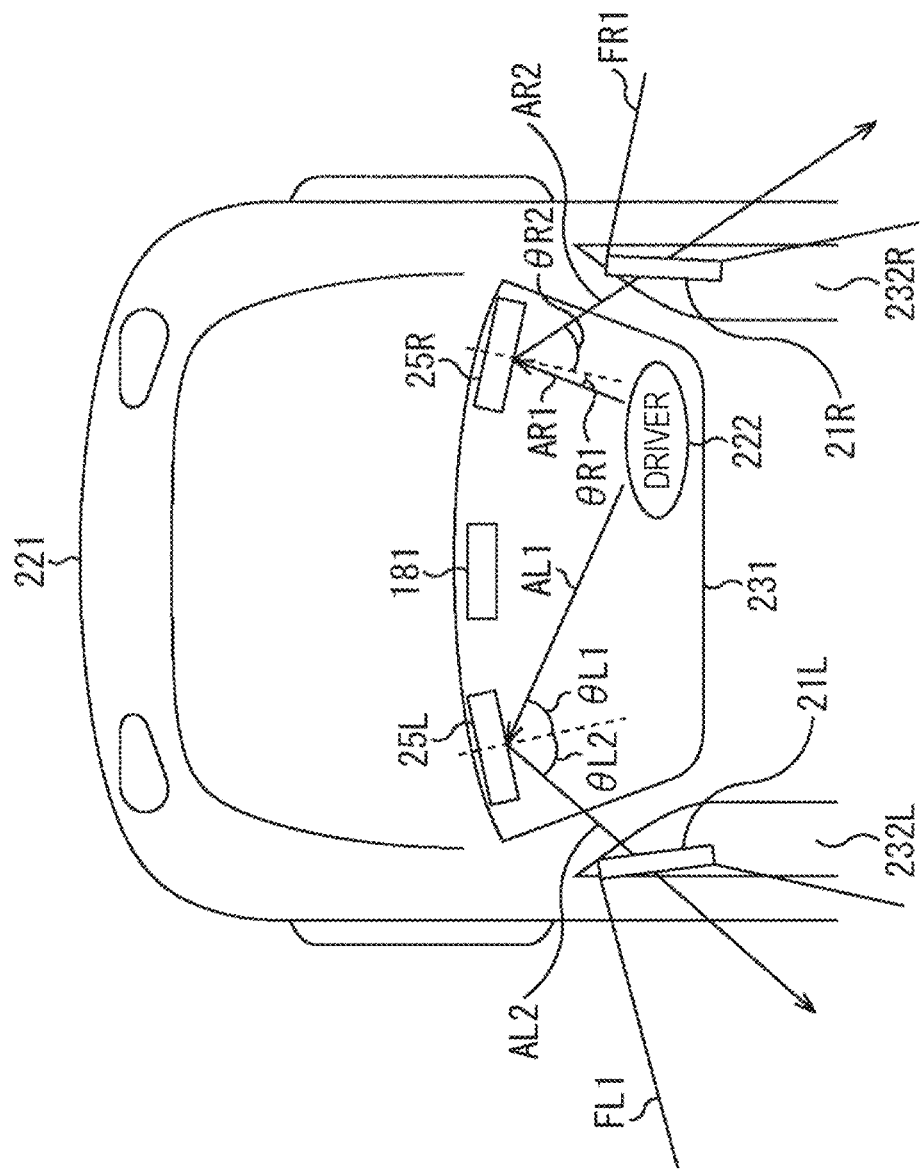
FIG. 17 is a diagram showing example of installation of camera modules, display units, and imaging units.

FIG. 17 is a schematic view of the front half of a vehicle 221 provided with the in-vehicle system 11 as viewed from above.

The camera module 21L is attached to the side window 232L of the passenger seat (the front seat on the left side) of the vehicle 221. An imaging direction AL2 that passes through the center of the field of view (FOV) FL1 of the imaging device 121L of the camera module 21L faces diagonally rearward to the left of the vehicle 221, and thus, the imaging device 121L can capture images of the left side and the rear side of the vehicle 221.

The camera module 21R is attached to the side window 232R of the driver seat (the front seat on the right side) of the vehicle 221. An imaging direction AR2 that passes through the center of the field of view (FOV) FR1 of the imaging device 121R of the camera module 21R faces diagonally rearward to the right of the vehicle 221, and thus, the imaging device 121R can capture images of the right side and the rear side of the vehicle 221.

The display unit 25L is installed at a position that is diagonally to the left of the driver 222, in front of the windshield 231 in the vehicle, and near the left end on the dashboard (not shown), with the display surface slightly facing in the direction of the driver 222 or facing diagonally rearward to the right of the vehicle 221. The display unit 25L displays a left-side image obtained by the camera module 21L.

The display unit 25R is installed at a position that is diagonally to the right of the driver 222, in front of the windshield 231 in the vehicle, and near the right end on the dashboard (not shown), with the display surface slightly facing in the direction of the driver 222 or facing diagonally rearward to the left of the vehicle 221. The display unit 25R displays a right-side image obtained by the camera module 21R.

Note that the display unit 25L and the camera module 21L are preferably installed so that the incident angle θL1 of the line of sight AL1 of the driver 222 with respect to the display surface of the display unit 25L, and the angle AL2 of the imaging direction AL2 of the imaging device 121L with respect to the display surface of the display unit 25L become as close as possible. Likewise, the display unit 25R and the camera module 21R are preferably installed so that the incident angle θR1 of the line of sight AR1 of the driver 222 with respect to the display surface of the display unit 25R, and the angle θR2 of the imaging direction AR2 of the imaging device 121R with respect to the display surface of the display unit 25R become as close as possible.

Note that an imaging direction indicates the average of the incident angles of centroidal light beams of the respective pixels 121a of an imaging device 121, and passes through the center of the field of view of the imaging device 121. For example, the imaging direction AL2 indicates the average of the incident angles of centroidal light beams of the respective pixels 121a of the imaging device 121L, and passes through the center of the field of view FL1 of the imaging device 121L. For example, the imaging direction AR2 indicates the average of the incident angles of centroidal light beams of the respective pixels 121a of the imaging device 121R, and passes through the center of the field of view FR1 of the imaging device 121R.

With this arrangement, the relationship between the line-of-sight direction of the driver 222 and the display range of the side image displayed on each display unit 25 becomes natural, and the driver 222 can be prevented from having a feeling of strangeness. Also, the driver 222 can check diagonally behind the vehicle 221 without moving his/her line of sight to a large extent.

The imaging unit 181 of the driver recognition unit 23 in FIG. 15 is installed in front of the windshield 231 in the vehicle and near the center on the dashboard (not shown). The imaging unit 181 captures images of the vicinities of the driver 222.

Figure 18:
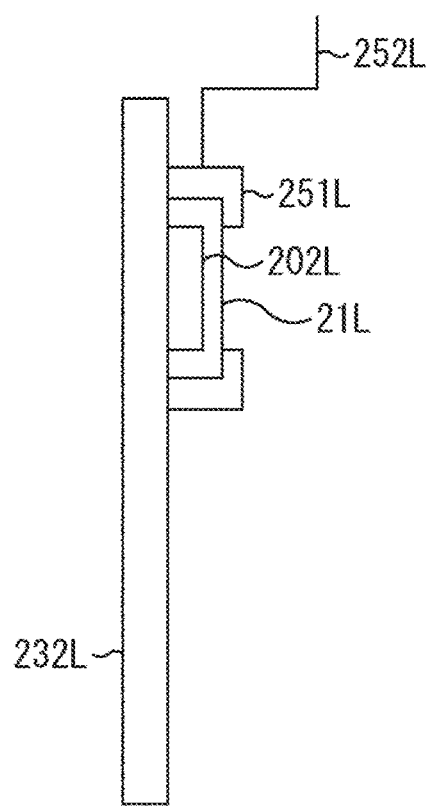
FIG. 18 is a diagram showing an example method for attaching a camera module.

FIG. 18 is a schematic view of the side window 232L to which the camera module 21L is attached, as viewed from above.

The camera module 21L is detachably attached with a bracket 251 so that the surface on which the LLC chip 202 is mounted extends along the surface of the side window 232L on the vehicle interior side. With this arrangement, the light receiving surface of the imaging device 121L provided on the surface of the LLC chip 202 faces and comes into contact with or close to the surface of the side window 232L on the vehicle interior side while facing the left side of the vehicle 221, and becomes substantially parallel to the surface of the side window 232L on the vehicle interior side.

Accordingly, the space between the light receiving surface of the imaging device 121 and the side window 232L disappears, or becomes very narrow. As a result, reflection from the side window 232L due to reflection of incident light, and dew condensation between the light receiving surface of the imaging device 121 and the side window 232L are prevented.

The camera module 21L is also connected to the bus B1 of the in-vehicle system 11 via a cable 252.

Note that, although neither shown in any drawing nor specifically described, the camera module 21R is also attached to the side window 232R with the use of a bracket in a manner similar to the camera module 21L. With this arrangement, the light receiving surface of the imaging device 121R provided on the surface of the LLC chip 202 faces and comes into contact with or close to the surface of the side window 232R on the vehicle interior side while facing the right side of the vehicle 221, and becomes substantially parallel to the surface of the side window 232R on the vehicle interior side.

Further, in the vehicle 221, a space for housing the camera module 21L and the bracket 251 is formed in the storage portion that houses the side window 232L when the side window 232L is opened. Likewise, in the vehicle 221, a space for housing the camera module 21R and the bracket is formed in the storage portion that houses the side window 232R when the side window 232R is opened.

As described above, the camera module 21L and the camera module 21R are attached to the side window 232L and the side window 232R, respectively. Thus, it is possible to prevent the imaging apparatuses for the electronic sideview mirrors from taking up space, and improve the space efficiency in the vehicle.

Further, as each camera module 21 is provided inside the vehicle, it is possible to prevent the camera modules 21 from blocking passage or being damaged by external contact or the like of the vehicle. Furthermore, there is no need to provide a drive structure for opening and closing the camera modules 21 to the right and left, or the like. Further, imaging can be performed without being affected by the surroundings such as the weather.

<First Embodiment of the Pixel Array Unit of the Imaging Device 121>

Next, a first embodiment of the pixel array unit of the imaging device 121 is described with reference to FIGS. 19 and 20.

Figure 19:
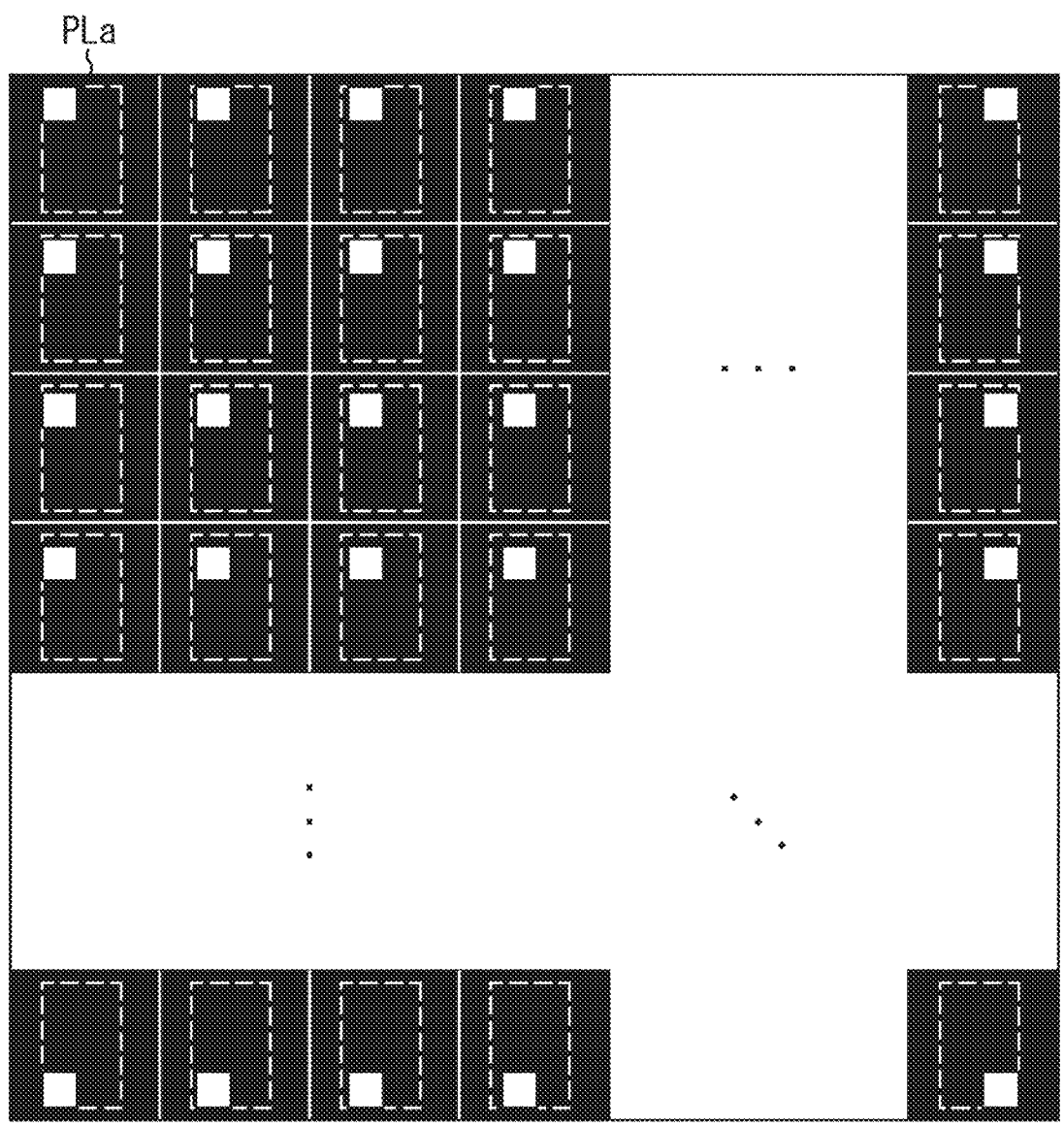
FIG. 19 is a diagram showing a first embodiment of the pixel array unit of the imaging device shown in FIG. 2.
Figure 20:
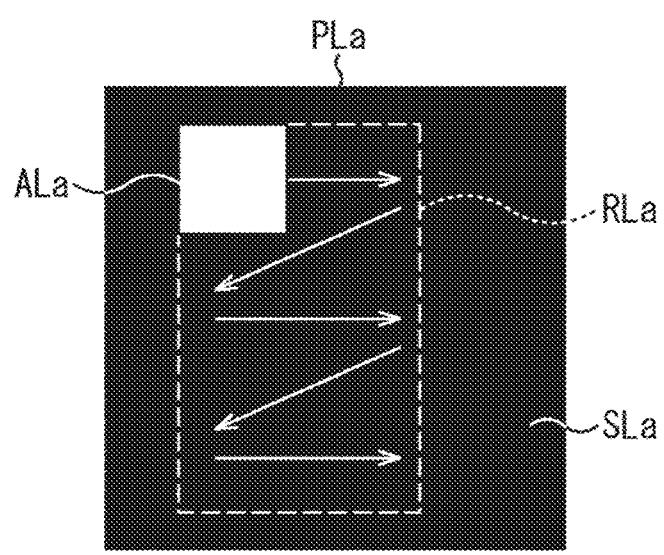
FIG. 20 is a diagram showing an example of the light shielding pattern of the pixels shown in FIG. 19.

FIG. 19 shows a first embodiment of the light shielding pattern of the pixel array unit of the imaging device 121L of the imaging unit 41L of the camera module 21L. FIG. 20 shows an example of the light shielding pattern of a pixel PLa that is a first embodiment of the pixels 121a constituting the pixel array unit shown in FIG. 19.

The opening ALa of the light shielding film SLa of each pixel PLa is set within a rectangular opening setting region RLa indicated by a dashed line. Accordingly, the region other than the opening setting region RLa of the light shielding film SLa of each pixel PLa serves as the principal light-shielded portion of the light shielding film SLa.

The size, the shape, and the position of the opening setting region RLa are common among the respective pixels PLa. The height of the opening setting region RLa in the vertical direction is slightly smaller than the height of the pixel PLa, and the width thereof in the horizontal direction is almost ½ of the width of the pixel PLa. Further, the opening setting region RLa is set at the center in the vertical direction in the pixel PLa, and at a position closer to the left in the horizontal direction. Accordingly, the centroid of the opening setting region RLa is biased leftward from the center of the pixel PLa. Further, as described above with reference to FIG. 17, in a case where the camera module 21L is attached to the side window 232L, the centroid of the opening setting region RLa moves from the center of the pixel PLa toward the front of the vehicle 211.

The shape and the size of the rectangular opening ALa are common among the respective pixels PLa. Also, the opening ALa is formed within the opening setting region RLa of each pixel PLa, in accordance with a rule similar to the rule described above with reference to FIGS. 12 and 13.

Specifically, the opening ALa is located at the left end of the opening setting region RLa in each pixel PLa in the left end column in the pixel array unit, and is located at the upper end of the opening setting region RLa in each pixel PLa in the upper end row in the pixel array unit. Further, as the position of the pixel PLa becomes closer to the right, the opening ALa shifts to the right at equal intervals within the opening setting region RLa, and is located at the right end of the opening setting region RLa in each pixel PLa in the right end column in the pixel array unit. Also, as the position of the pixel PLa becomes closer to the bottom, the opening ALa shifts to the bottom at equal intervals within the opening setting region RLa, and is located at the lower end of the opening setting region RLa in each pixel PLa in the lower end row in the pixel array unit.

Accordingly, the position of the opening ALa in the horizontal direction is the same in each pixel PLa in the same column in the vertical direction. Also, the position of the opening ALa in the vertical direction is the same in each pixel PLa in the same row in the horizontal direction. Accordingly, the position of the opening ALa in each pixel PLa, which is the position at which incident light enters each pixel PLa, varies with each pixel PLa, and, as a result, the incident angle directivities of the respective pixels PLa differ from one another.

Further, the openings ALa of the respective pixels PLa cover the opening setting region RLa. That is, the region in which the openings ALa of the respective pixels PLa are overlapped on one another is equal to the opening setting region RLa. Note that the layout pattern of the openings ALa is not limited to the above configuration, and may be any layout, as long as the region in which the openings ALa are overlapped on one another is equal to the opening setting region RLa. For example, the openings ALa may be randomly arranged within the opening setting region RLa.

Here, the centroid of the incident angle directivity of each pixel PLa substantially coincides with the centroid of the opening ALa of each pixel PLa, and is biased leftward from the center of each pixel PLa among most of the pixels PLa. Accordingly, the average of the centroids of the incident angle directivities of the respective pixels PLa is biased leftward from the centers of the pixels PLa. Further, the average of the incident angles of centroidal light beams in the respective pixels PLa is biased rightward (rearward for the vehicle 221) with respect to the normal direction of the light receiving surface of the pixel array unit.

Accordingly, the view of on the left side and the view behind the vehicle 221 with the field of view FL1 can be imaged as shown in FIG. 17, even though the LLC chip 202 is installed parallel to the side window 232L, and the light receiving surface of the pixel array unit of the imaging device 121L faces the left side of the vehicle 221.

Note that the position of the opening setting region RLa, which is the offset amount of the centroid of the opening setting region RLa from the center of the pixel PLa, and the shape and the size of the opening setting region RLa are set on the basis of the field of view FL1 in which imaging is to be performed, for example.

Furthermore, even if the LLC chip 202 (or the light receiving surface of the imaging device 121L) does not face rearward to the left of the vehicle 221, the view on the left side and the view behind the vehicle 221 can be imaged, and any imaging lens is unnecessary. Accordingly, as described above with reference to FIG. 16, the LLC chip 202L and the signal processing chip 203L is mounted on the same substrate, and the mounting surface of the LLC chip 202L of the camera module 21L is brought into contact with or close to the side window 232L so that the camera module 21L can be attached to the side window 232L.

Note that, although neither shown in any drawing nor specifically described, the light shielding pattern of the pixel array unit of the imaging device 121R of the imaging unit 41R of the camera module 21R is also set in a manner similar to the manner in the example described above with reference to FIGS. 19 and 20. However, the centroid of the opening setting region RRa of each pixel PRa of the imaging device 121R is biased to the right (the rear of the vehicle 221) from the center of the pixel PRa, as opposed to the opening setting region RLa of each pixel PLa of the imaging device 121L.

<First Embodiment of an Electronic Sideview Mirror Display Control Process>

Next, a first embodiment of an electronic sideview mirror display control process to be performed by the in-vehicle system 11 is described with reference to a flowchart shown in FIG. 21.

This process is started when the power supply to the vehicle 221 is turned on, and is ended when the power supply is turned off, for example.

Note that, although a process of displaying a left-side image obtained by the camera module 21L on the display unit 25L is described below, a similar process is performed in a case where a right-side image obtained by the camera module 21R is displayed on the display unit 25R.

In step S1, the imaging device 121L captures an image of the surroundings of the vehicle 221. As a result, a detection signal indicating the detection signal level corresponding to the amount of incident light from the object is output from each pixel PLa of the imaging device 121L having different incident angle directivities, and the imaging device 121L supplies a detection image formed with the detection signals of the respective pixels PLa to the restoration unit 122L.

In step S2, the restoration unit 122L obtains coefficients to be used for image restoration. Specifically, the restoration unit 122L sets the distance to the object surface 102 to be restored, which is the object distance. Note that any method can be adopted as the method for setting the object distance. For example, the restoration unit 122L sets an object distance set by a user, or an object distance detected by various sensors as the distance to the object surface 102 to be restored.

Next, the restoration unit 122L reads, from the storage unit 124L, the coefficient set group associated with the set object distance.

In step S3, the restoration unit 122L restores an image, using the detection image and the coefficients. Specifically, the restoration unit 122L creates the simultaneous equations described with reference to Equations (1) to (3) shown above, using the detection signal level of each pixel in the detection image and the coefficient set group acquired through the process in step S2. Next, the restoration unit 122L solves the created simultaneous equations, to calculate the light intensity of each point light source on the object surface 102 corresponding to the set object distance. The restoration unit 122L then arranges the pixels having the pixel values corresponding to the calculated light intensities, in accordance with the layout of the respective point light sources on the object surface 102. By doing so, the restoration unit 122L generates a restored image in which an image of the object is formed.

In step S4, the restoration unit 122L performs various kinds of processing on the restored image. For example, the restoration unit 122L performs demosaicing, γ correction, white balance adjustment, conversion into a predetermined compression format, and the like, on the restored image as necessary. Further, the restoration unit 122L supplies the obtained restored image (a left-side image) to the display control unit 26 via the communication unit 125, the camera ECU 42L, and the MCU 43L.

In step S5, the display unit 25L displays the restored image, which is the left-side image, under the control of the display control unit 26.

After that, the process returns to step S1, and the processes in steps S1 to S5 are repeated.

As a left-side image is displayed on the display unit 25L, and a right-side image is displayed on the display unit 25R in the above manner, electronic sideview mirrors are obtained.

<Second Embodiment of an Electronic Sideview Mirror Display Control Process>

Next, a second embodiment of an electronic sideview mirror display control process to be performed by the in-vehicle system 11 is described with reference to a flowchart shown in FIG. 22.

This process is started when the power supply to the vehicle 221 is turned on, and is ended when the power supply is turned off, for example.

Note that, although a process of displaying a left-side image obtained by the camera module 21L on the display unit 25L is described below, a similar process is performed in a case where a right-side image obtained by the camera module 21R is displayed on the display unit 25R.

Figure 21:
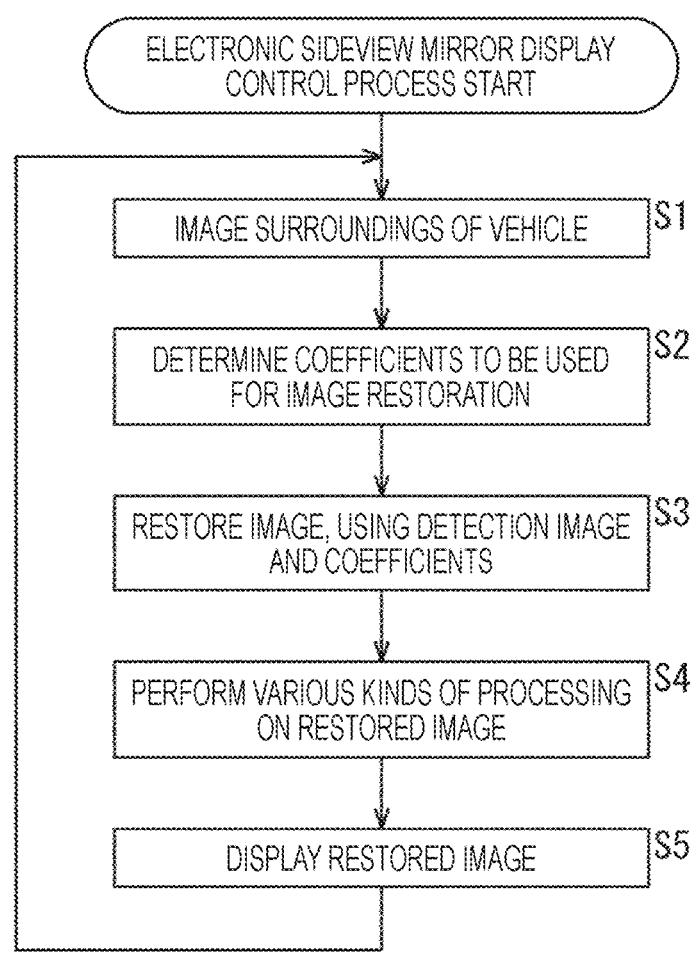
FIG. 21 is a flowchart for explaining a first embodiment of an electronic sideview mirror display control process.

In steps S51 to S53, processes similar to those in steps S1 to S3 in FIG. 21 are performed.

In step S54, the restoration unit 122L performs various kinds of processing on the restored image. For example, the restoration unit 122L performs demosaicing, γ correction, white balance adjustment, conversion into a predetermined compression format, and the like, on the restored image as necessary. Further, the restoration unit 122L supplies the obtained restored image (a left-side image) to the camera ECU 42L via the communication unit 125.

In step S55, the driver recognition unit 23 performs a process of detecting the driver's instructing motion. Specifically, the imaging unit 181 captures an image of the driver, and supplies the obtained driver image to the instructing motion detection unit 182.

On the basis of the driver image, and the detecting conditions stored in the storage unit 184, the instructing motion detection unit 182 performs a process of detecting a display change instructing motion. If a display change instructing motion is detected, the instructing motion detection unit 182 supplies data indicating the instruction content to the display control unit 26 via the transmission unit 185.

In step S56, the camera ECU 42L performs a dangerous object detection process. The camera ECU 42L performs an object recognition process on the left-side image, and detects a dangerous object (such as a pedestrian, a bicycle, a motorcycle, or a vehicle, for example) that has a possibility of a collision or contact with the vehicle, on the left side and the rear side of the vehicle. The camera ECU 42L supplies the left-side image and data indicating the result of the dangerous object detection to the alert control unit 24 and the display control unit 26 via the MCU 43L.

Note that the dangerous object detecting conditions can be set as appropriate.

For example, an object whose relative velocity in the direction toward the vehicle is equal to or higher than a predetermined threshold, or an object approaching the vehicle at a predetermined velocity or higher is detected as a dangerous object. For example, an object whose distance from the vehicle is equal to or shorter than a predetermined threshold is detected as a dangerous object.

Also, in a case where no problem will be caused even if an object satisfying the above conditions is detected and the object collides with or comes into contact with the vehicle, for example, the object is not detected as a dangerous object. Such an object may be a vinyl bag or the like, for example.

In step S57, the alert control unit 24 determines whether or not a dangerous object has been detected, on the basis of the result of the process performed by the camera ECU 42L in step S56. If it is determined that a dangerous object has been detected, the process moves on to step S58.

In step S58, the alert control unit 24 superimposes a warning display on the restored image. Specifically, the alert control unit 24 superimposes a warning display facilitating attention to a dangerous object on the left-side image. For example, to emphasize the dangerous object in the left-side image, a display effect such as surrounding with a frame is added. The alert control unit 24 supplies the display control unit 26 with the left-side image on which the warning display is superimposed.

After that, the process moves on to step S59.

If it is determined in step 357 that any dangerous object has not been detected, on the other hand, the process in step 358 is skipped, and the process moves on to step 359.

In step S59, the display control unit 26 sets display ranges, on the basis of the driver's instructing motion and the result of the dangerous object detection.

Here, methods for setting a display range are described with reference to FIGS. 23 to 27.

Figure 23:
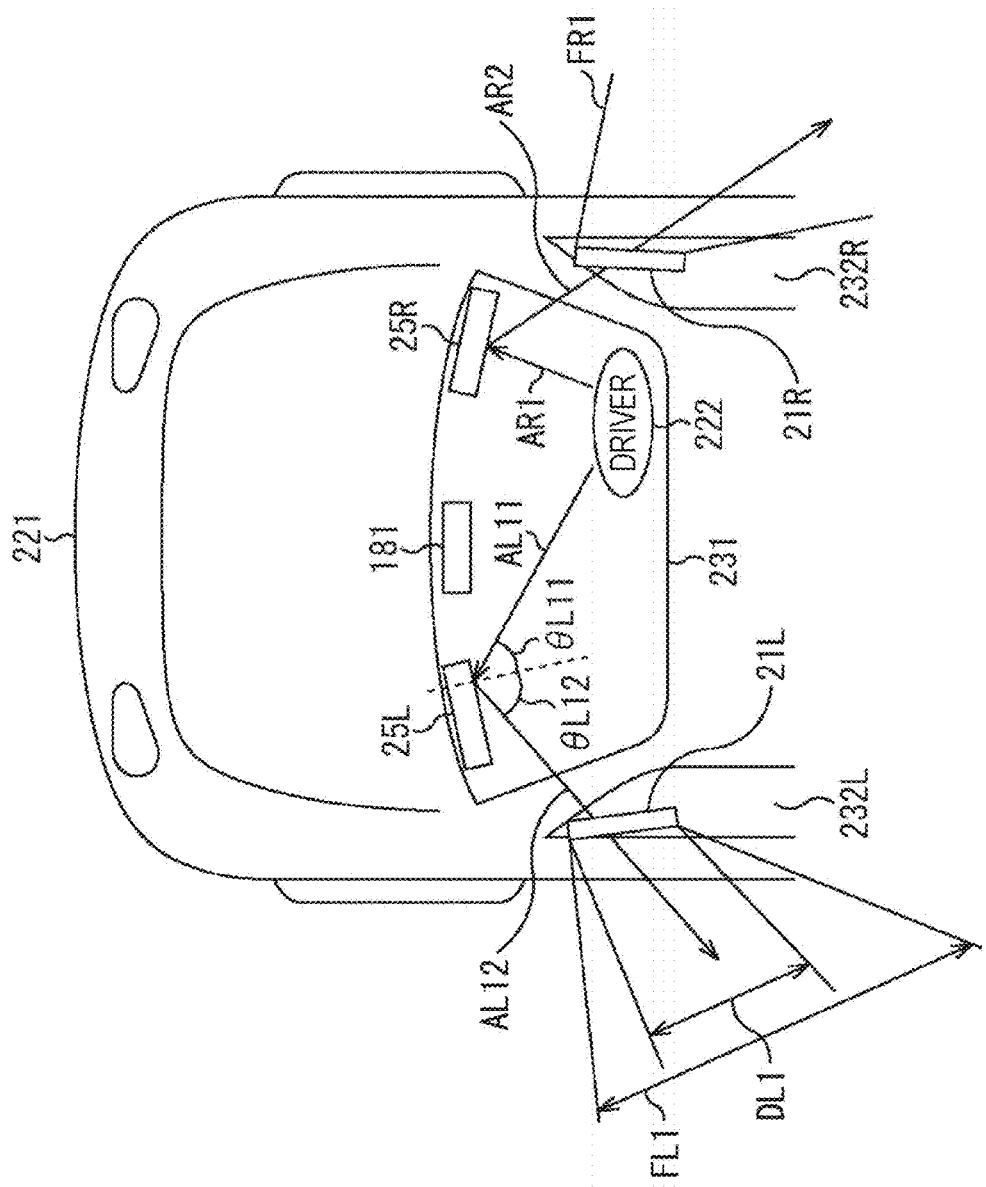
FIG. 23 is a diagram for explaining a method for changing the display range for an electronic sideview mirror.
Figure 24:
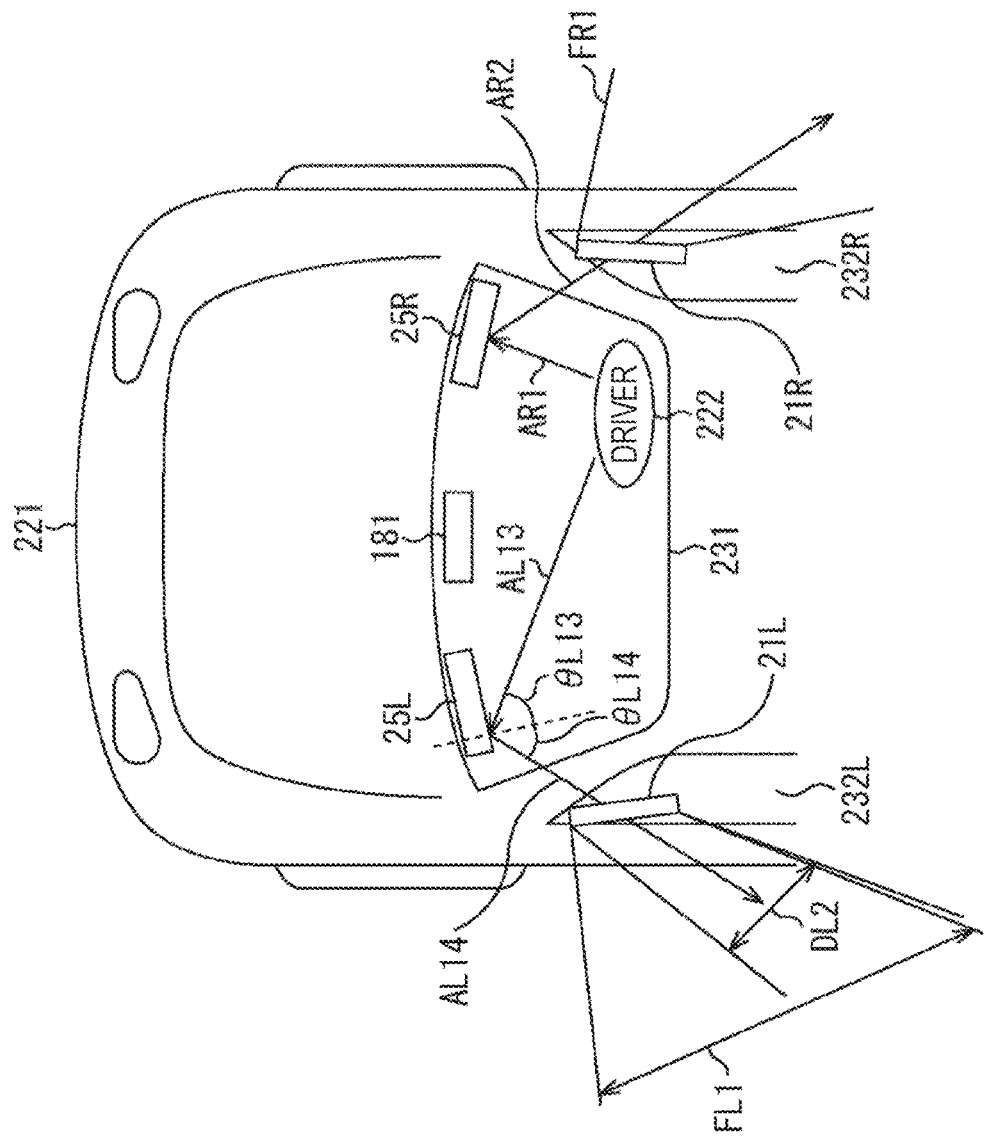
FIG. 24 is a diagram for explaining a method for changing the display range for an electronic sideview mirror.

FIGS. 23 and 24 show examples in which a display range is set on the basis of an instructing motion depending on the direction of the driver's line of sight.

FIG. 23 shows an example of a display range DL1 that is set within the field of view FL1 in accordance with a line of sight AL11 of the driver 222. In this case, the display range DL1 is set so that the incident angle θL11 of the line of sight AL11 with respect to the display surface of the display unit 25L and the angle θL12 of the center AL12 of the display range DL1 with respect to the display surface of the display unit 25L become as close as possible.

FIG. 24 shows an example of a display range DL2 that is set within the field of view FL1 in accordance with a line of sight AL13 of the driver 222. In this case, the display range DL2 is set so that the incident angle θL13 of the line of sight AL13 with respect to the display surface of the display unit 25L and the angle θL14 of the center AL14 of the display range DL2 with respect to the display surface of the display unit 25L become as close as possible.

Accordingly, in a case where the driver 222 moves his/her line of sight to the right side of the display surface of the display unit 25L, the display range of the left-side image displayed on the display unit 25L moves frontward for the vehicle 221. In a case where the driver 222 moves his/her line of sight to the left side of the display surface of the display unit 25L, on the other hand, the display range of the left-side image displayed on the display unit 25L moves backward for the vehicle 221.

As the display range of the left-side image is moved on the basis of the direction of the line of sight of the driver 222 in this manner, an image of the direction that the driver wishes to check can be displayed without giving the driver a feeling of strangeness.

Note that, although not specifically described herein, the display range of the right-side image displayed on the display unit 25R moves in a manner similar to the above, on the basis of the driver's line-of-sight direction.

Figure 25:
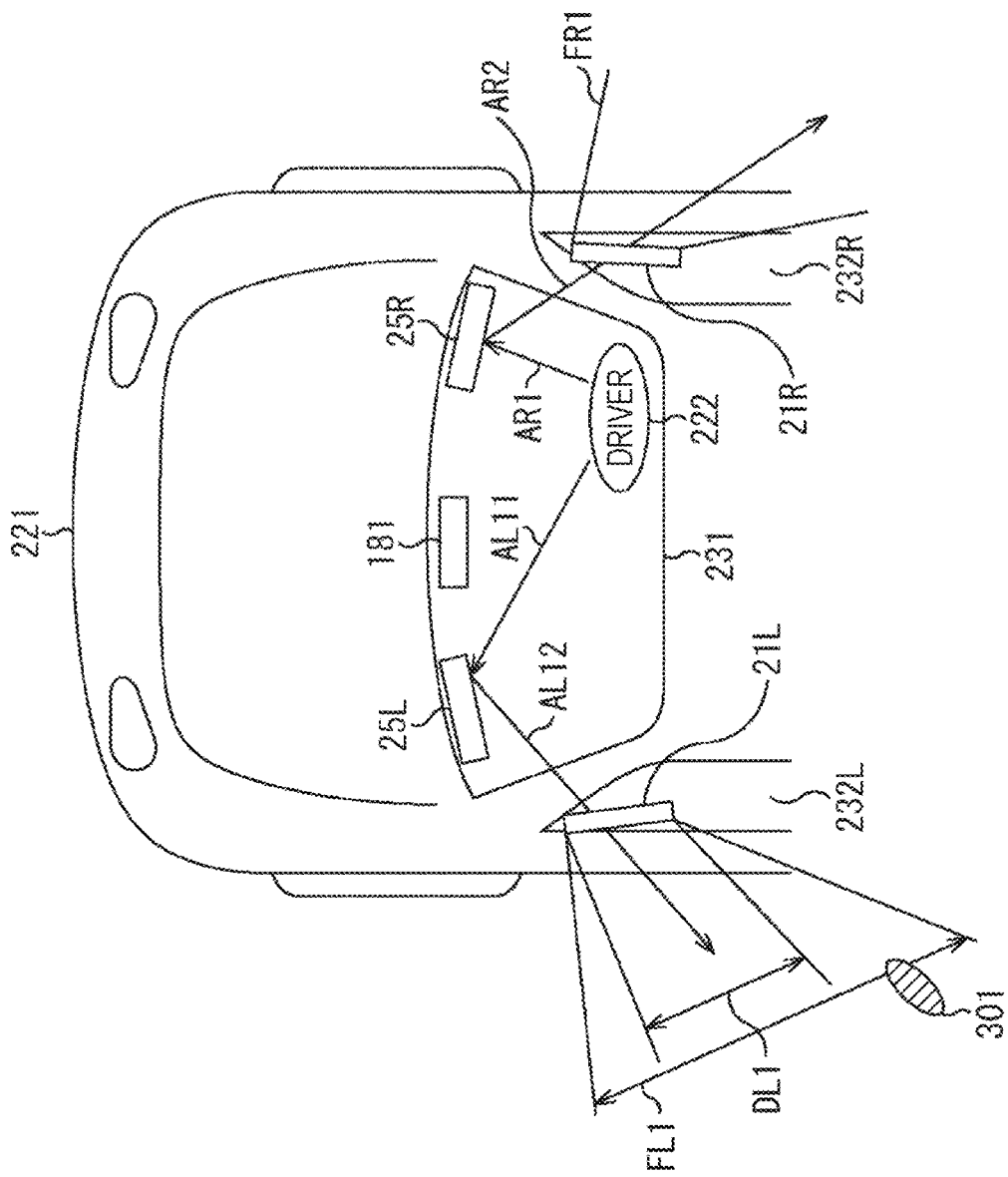
FIG. 25 is a diagram for explaining a method for changing the display range for an electronic sideview mirror.
Figure 26:
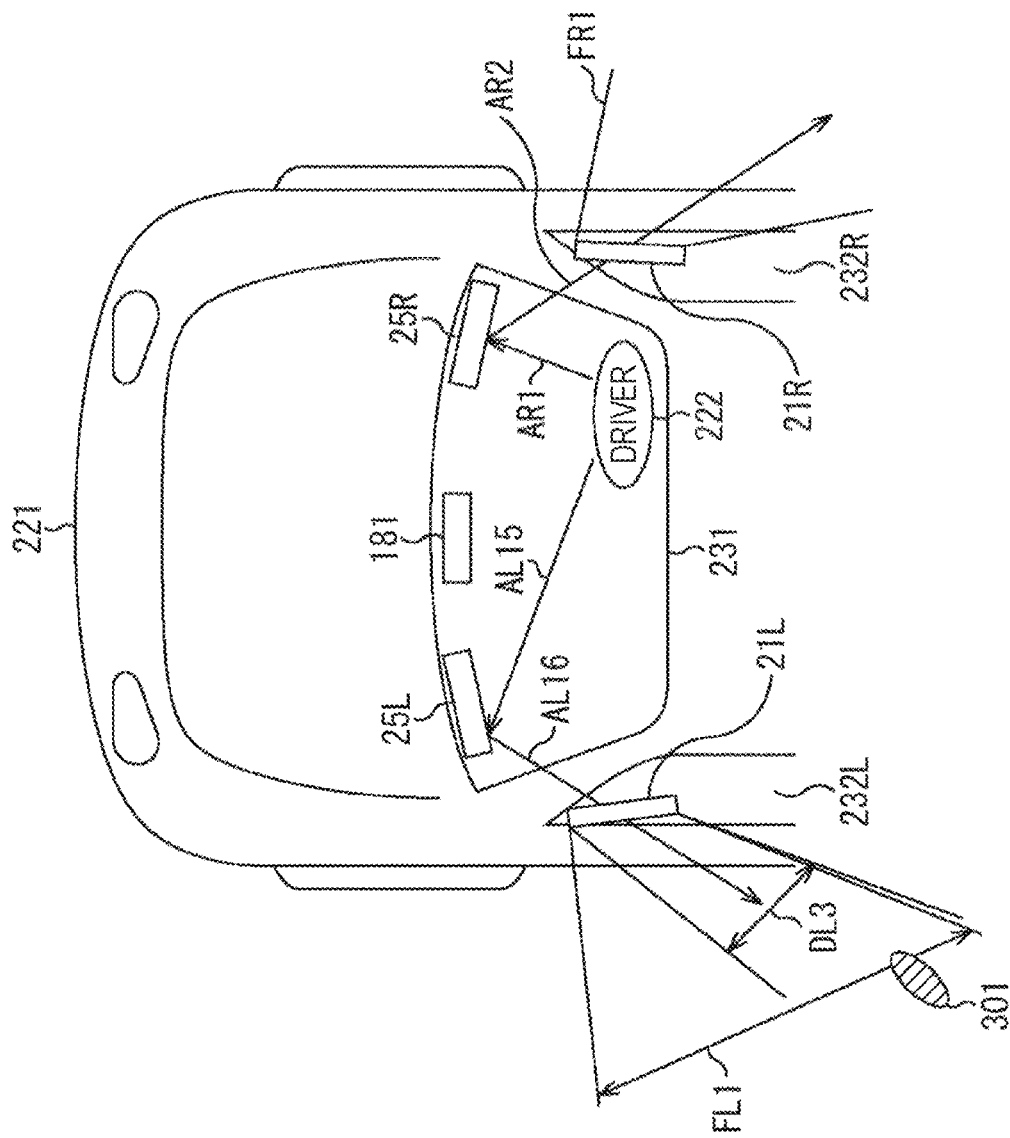
FIG. 26 is a diagram for explaining a method for changing the display range for an electronic sideview mirror.
Figure 27:
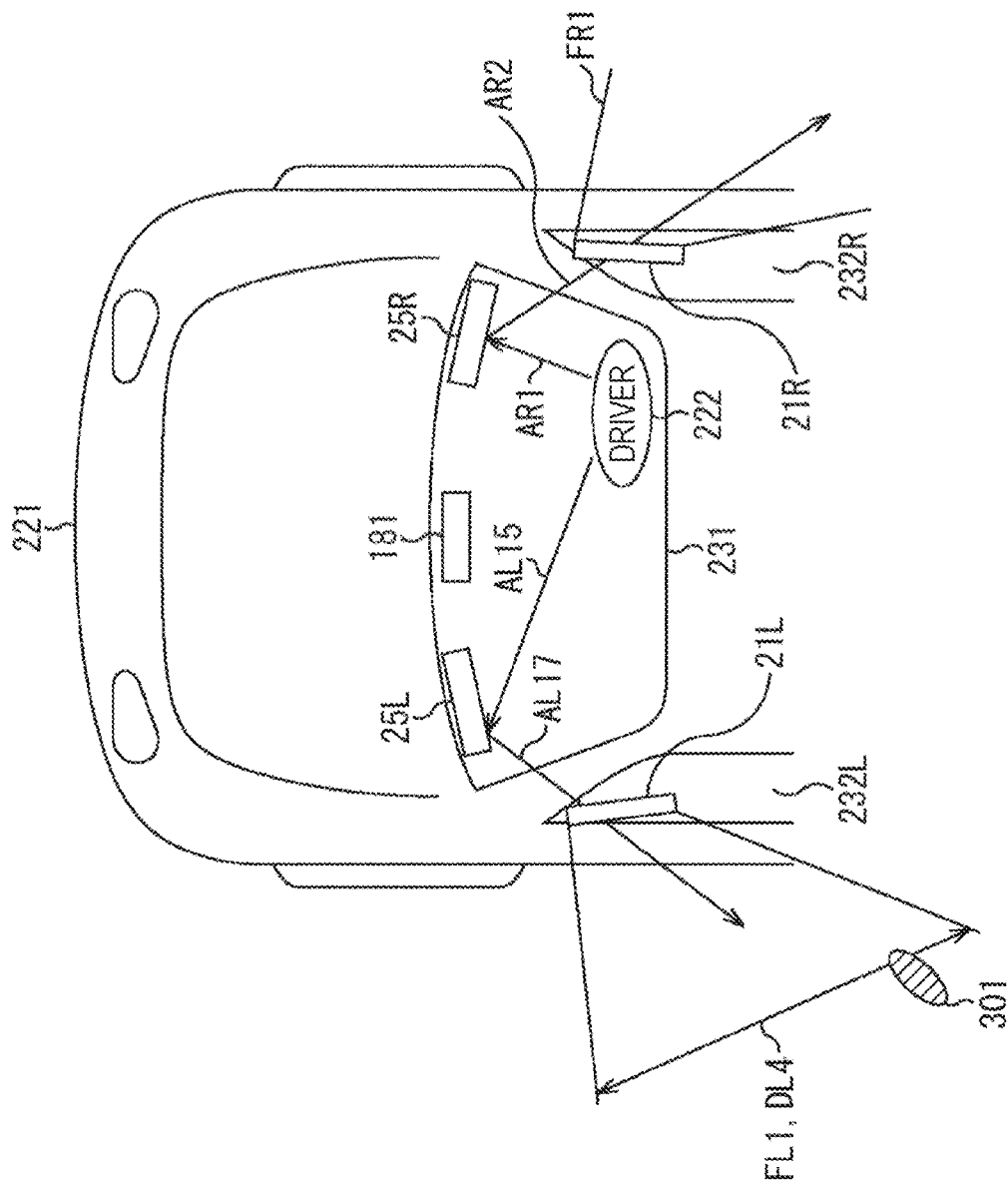
FIG. 27 is a diagram for explaining a method for changing the display range for an electronic sideview mirror.

FIGS. 25 to 27 show an example in which a display range is set on the basis of a result of dangerous object detection.

For example, in a case where the range DL1 is set as the display range of the left-side image as in the example shown in FIG. 23, a dangerous object 301 is detected within the field of view FL1 behind the vehicle 221 from the range DL1 as shown in FIG. 25.

In this case, the display range of the left-side image displayed on the display unit 25L is moved to a range DL3 including the dangerous object 301 as shown in FIG. 26, for example.

Alternatively, the display range of the left-side image displayed on the display unit 25L is widened to a range DL4 that is equal to the field of view FL1 as shown in FIG. 27, for example.

As a result, the dangerous object 301 is displayed on the display unit 25L, so that the driver can quickly recognize the existence of the dangerous object 301.

Note that, in FIGS. 26 and 27, an arrow AL15 indicates the line-of-sight direction of the driver 222. In FIG. 26, an arrow AL16 indicates the direction of the center of the display range DL3. In FIG. 27, an arrow AL17 indicates the direction of the center of the display range DL4.

Referring back to FIG. 22, in step S60, the display unit 25L displays the restored image, under the control of the display control unit 26. That is, the left-side image with the display range that has been set through the process in step S59 is displayed on the display unit 25L.

Figure 28:
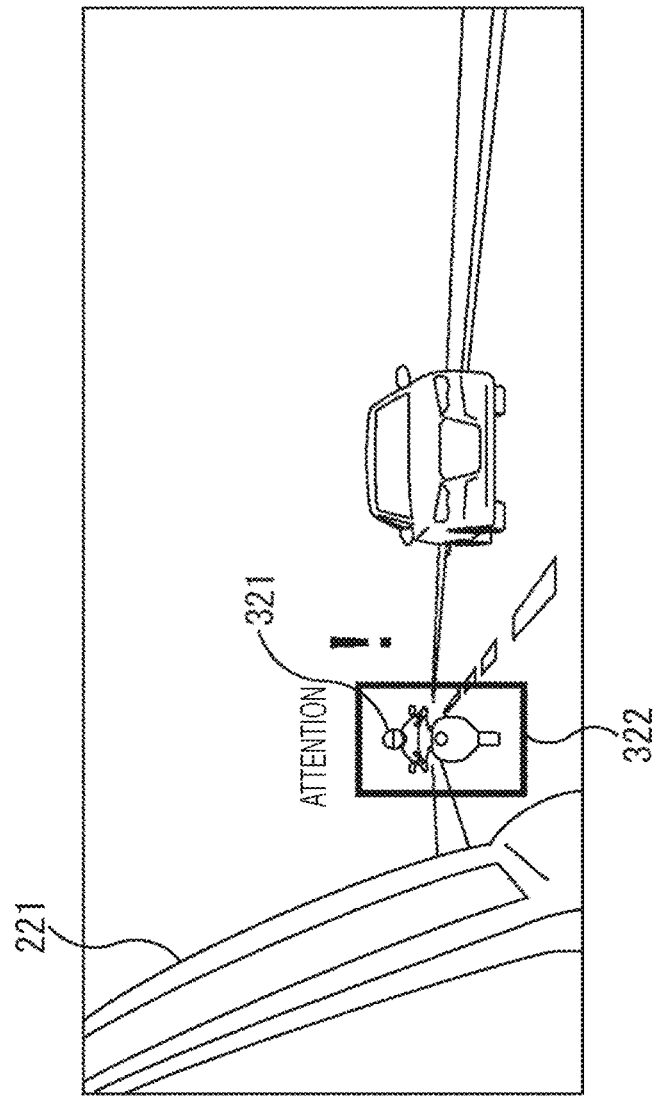
FIG. 28 is a diagram showing an example of warning display.

Note that, in a case where a dangerous object is detected, a warning is displayed as shown in FIG. 28, for example. In the example shown herein, a motorcycle 321 is detected as a dangerous object diagonally to the left of the vehicle 221 in the left-side image. A frame 322 surrounding the motorcycle 321 is then displayed, and letters and a symbol for facilitating attention are displayed around the frame 322. With this arrangement, the driver 222 can quickly recognize the existence of the motorcycle 321 as a dangerous object without fail.

Note that, even in a case where any dangerous object is not detected, such as a case where there is an area or point where accidents occur frequently in the route, for example, a warning display showing the fact may be displayed.

Alternatively, a warning display related to a dangerous object may be displayed only under specific conditions (traveling on a curve, at a time of departure, or the like, for example).

After that, the process returns to step S51, and the processes in steps S51 to S60 are repeated.

As the display ranges of side images are appropriately set in the above manner, the driver 222 can check the sides and the rear of the vehicle 221 without having a feeling of strangeness. Furthermore, the driver can be promptly notified of the presence of a dangerous object without fail.

2. Second Embodiment

Next, a second embodiment of the present technology is described with reference to FIGS. 29 to 33.

The second embodiment differs from the first embodiment in the light shielding pattern in the pixel array unit of the imaging device 121.

Figure 29:
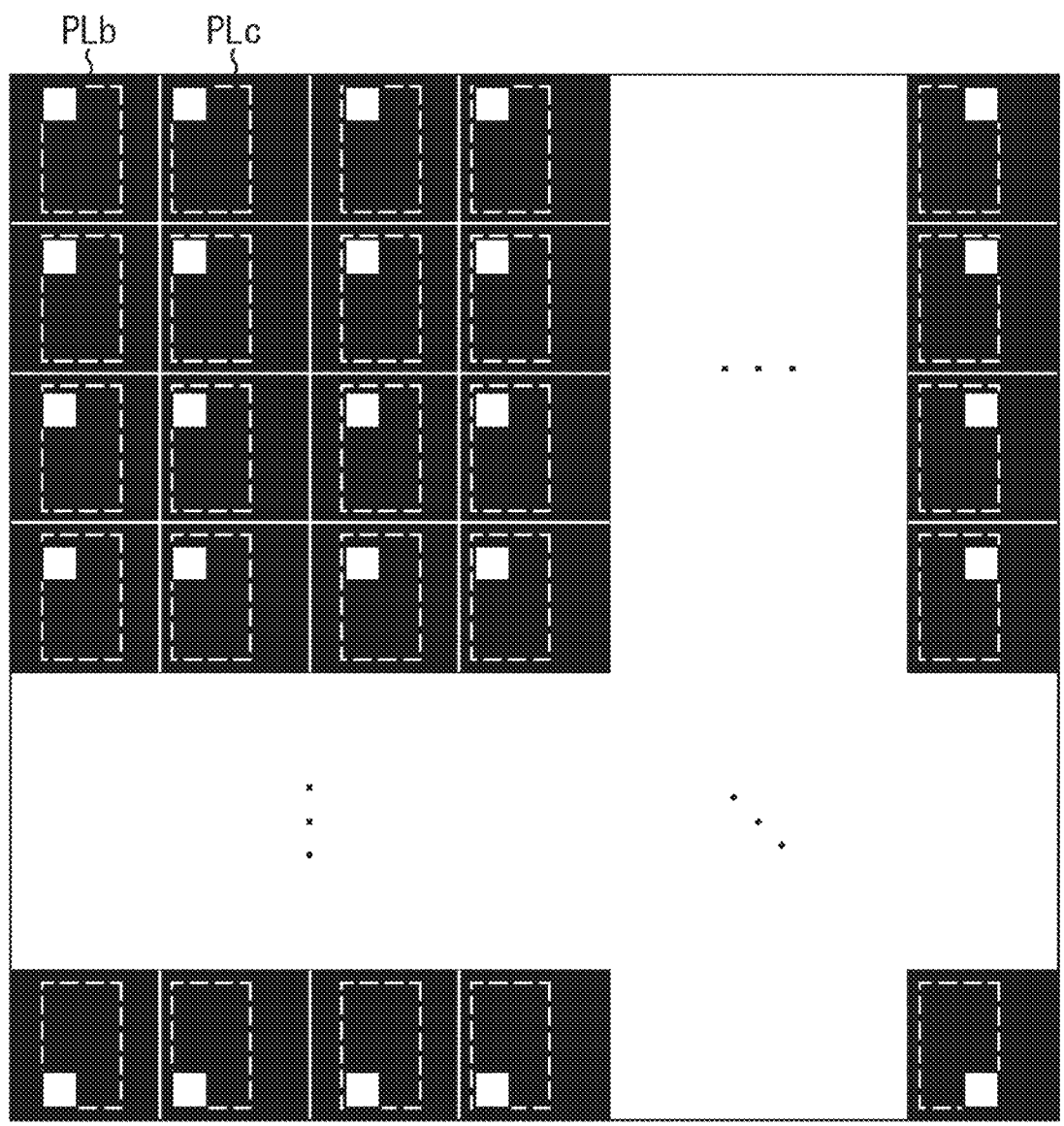
FIG. 29 is a diagram showing a second embodiment of the pixel array unit of the imaging device shown in FIG. 2.

FIG. 29 shows a second embodiment of the light shielding pattern of the pixel array unit of the imaging device 121L of the imaging unit 41L of the camera module 21L. FIG. 30 shows an example of the light shielding patterns of a pixel PLb and a pixel PLc that are the second embodiment of the pixels 121a constituting the pixel array unit shown in FIG. 29.

The pixel PLb is disposed in an odd-numbered column in the pixel array unit, and the pixel PLc is disposed in an even-numbered column in the pixel array unit.

The position of the opening setting region is different between the pixel PLb and the pixel PLc. Specifically, the shapes and the sizes of the opening setting region RLb of the light shielding film SLb of the pixel PLb and the opening setting region RLc of the light shielding film SLc of the pixel PLc are the same as those of the opening setting region RLa of the light shielding film SLa of the pixel PLa in FIG. 20.

Meanwhile, the opening setting region RLb is set at a position shifted rightward in the pixel PLb, compared with the opening setting region RLa. However, the centroid of the opening setting region RLb is biased leftward (frontward for the vehicle 221) from the center of the pixel PLb, like the centroid of the opening setting region RLa. Also, the opening setting region RLc is set at a position shifted leftward in the pixel PLc, compared with the opening setting region RLa. In this manner, the position in the horizontal direction (the frontward/rearward direction of the vehicle 221) in the pixel is different between the opening setting region RLb and the opening setting region RLc.

Further, the opening ALb of the pixel PLb has the same shape and size as those of the opening ALa of the pixel PLa, and is located in the opening setting region RLb according to a rule similar to the rule described above with reference to FIGS. 12 and 13.

Specifically, the opening ALb is located at the left end of the opening setting region RLb in each pixel PLb in the left end column in the pixel array unit, and is located at the upper end of the opening setting region RLb in each pixel PLb in the upper end row in the pixel array unit. Further, as the position of the pixel PLb becomes closer to the right, the opening ALb shifts to the right at equal intervals within the opening setting region RLb, and is located at the right end of the opening setting region RLb in each pixel PLb in the second column from the right in the pixel array unit. Also, as the position of the pixel PLb becomes closer to the bottom, the opening ALb shifts to the bottom at equal intervals within the opening setting region RLb, and is located at the lower end of the opening setting region RLb in each pixel PLb in the lower end row in the pixel array unit.

Accordingly, the position of the opening ALb in the horizontal direction in each pixel PLb is the same among the pixels PLb in the same column in the vertical direction. Also, the position of the opening ALb in the vertical direction in each pixel PLb is the same among the pixels PLb in the same row in the horizontal direction. Accordingly, the position of the opening ALb in each pixel PLb, which is the position at which incident light enters each pixel PLb, varies with each pixel PLb, and, as a result, the incident angle directivities of the respective pixels PLa differ from one another.

Further, the openings ALb of the respective pixels PLb cover the opening setting region RLb. That is, the region in which the openings ALb of the respective pixels PLb are overlapped on one another is equal to the opening setting region RLb. Note that the layout pattern of the openings ALb is not limited to the above configuration, and may be any layout, as long as the region in which the openings ALb are overlapped on one another is equal to the opening setting region RLb. For example, the openings ALb may be randomly arranged within the opening setting region RLb.

Further, the opening ALc of the pixel PLc has the same shape and size as those of the opening ALa of the pixel PLa, and is located in the opening setting region RLc according to a rule similar to the rule described above with reference to FIGS. 12 and 13.

Specifically, the opening ALc is located at the left end of the opening setting region RLc in each pixel PLc in the second column from the left in the pixel array unit, and is located at the upper end of the opening setting region RLc in each pixel PLc in the upper end row in the pixel array unit. Further, as the position of the pixel PLc becomes closer to the right, the opening ALc shifts to the right at equal intervals within the opening setting region RLc, and is located at the right end of the opening setting region RLc in each pixel PLc in the right end column in the pixel array unit. Also, as the position of the pixel PLc becomes closer to the bottom, the opening ALc shifts to the bottom at equal intervals within the opening setting region RLc, and is located at the lower end of the opening setting region RLc in each pixel PLc in the lower end row in the pixel array unit.

Accordingly, the position of the opening ALc in the horizontal direction in each pixel PLc is the same among the pixels PLc in the same column in the vertical direction. Also, the position of the opening ALc in the vertical direction in each pixel PLc is the same among the pixels PLc in the same row in the horizontal direction. Accordingly, the position of the opening ALc in each pixel PLc, which is the position at which incident light enters each pixel PLc, varies with each pixel PLc, and, as a result, the incident angle directivities of the respective pixels PLc differ from one another.

Further, the openings ALc of the respective pixels PLc cover the opening setting region RLc. That is, the region in which the openings ALc of the respective pixels PLc are overlapped on one another is equal to the opening setting region RLc. Note that the layout pattern of the openings ALc is not limited to the above configuration, and may be any layout, as long as the region in which the openings ALc are overlapped on one another is equal to the opening setting region RLc. For example, the openings ALc may be randomly arranged within the opening setting region RLc.

Here, the centroid of the incident angle directivity of each pixel PLb substantially coincides with the centroid of the opening ALb of each pixel PLb, and is biased leftward (frontward for the vehicle 221) from the center of each pixel PLb among most of the pixels PLb. Accordingly, the average of the centroids of the incident angle directivities of the respective pixels PLb is biased leftward from the centers of the pixels PLb. Further, the average of the incident angles of centroidal light beams in the respective pixels PLb is biased rightward (rearward for the vehicle 221) with respect to the normal direction of the light receiving surface of the pixel array unit.

Further, the centroid of the incident angle directivity of each pixel PLc substantially coincides with the centroid of the opening ALc of each pixel PLc, and is biased leftward (frontward for the vehicle 221) from the center of each pixel PLc among most of the pixels PLc. Accordingly, the average of the centroids of the incident angle directivities of the respective pixels PLc is biased leftward from the centers of the pixels PLc. Also, the average of the incident angles of centroidal light beams in the respective pixels PLc is biased rightward (rearward for the vehicle 221) with respect to the normal direction of the light receiving surface of the pixel array unit.

Meanwhile, the offset from the center of each pixel PLc in the opening setting region RLc is larger than the offset from the center of each pixel PLb in the opening setting region RLb. Therefore, the average of the incident angles of centroidal light beams in the respective pixels PLc is inclined rightward (rearward for the vehicle 221), compared with the average of the incident angles of the centroidal light beams in the respective pixels PLb.

Figure 31:
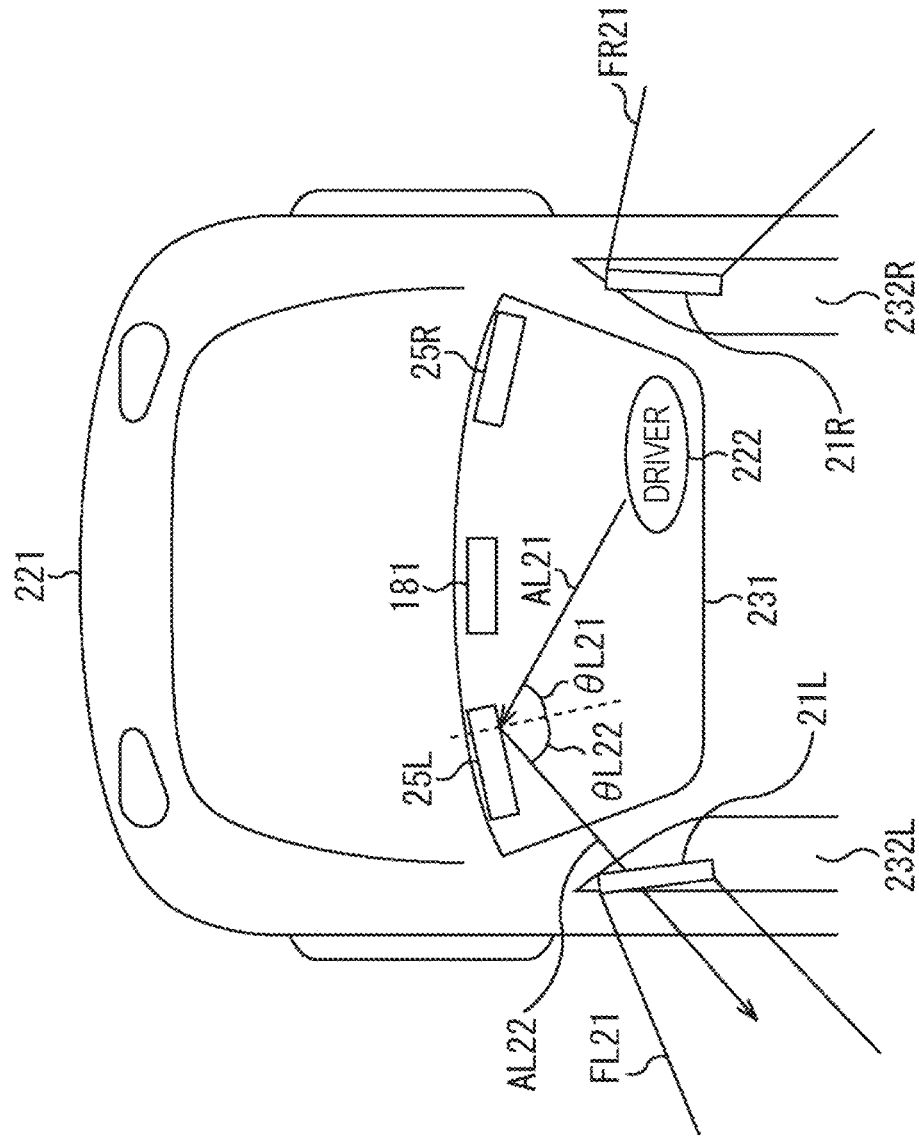
FIG. 31 is a diagram for explaining a method for changing an imaging range.
Figure 32:
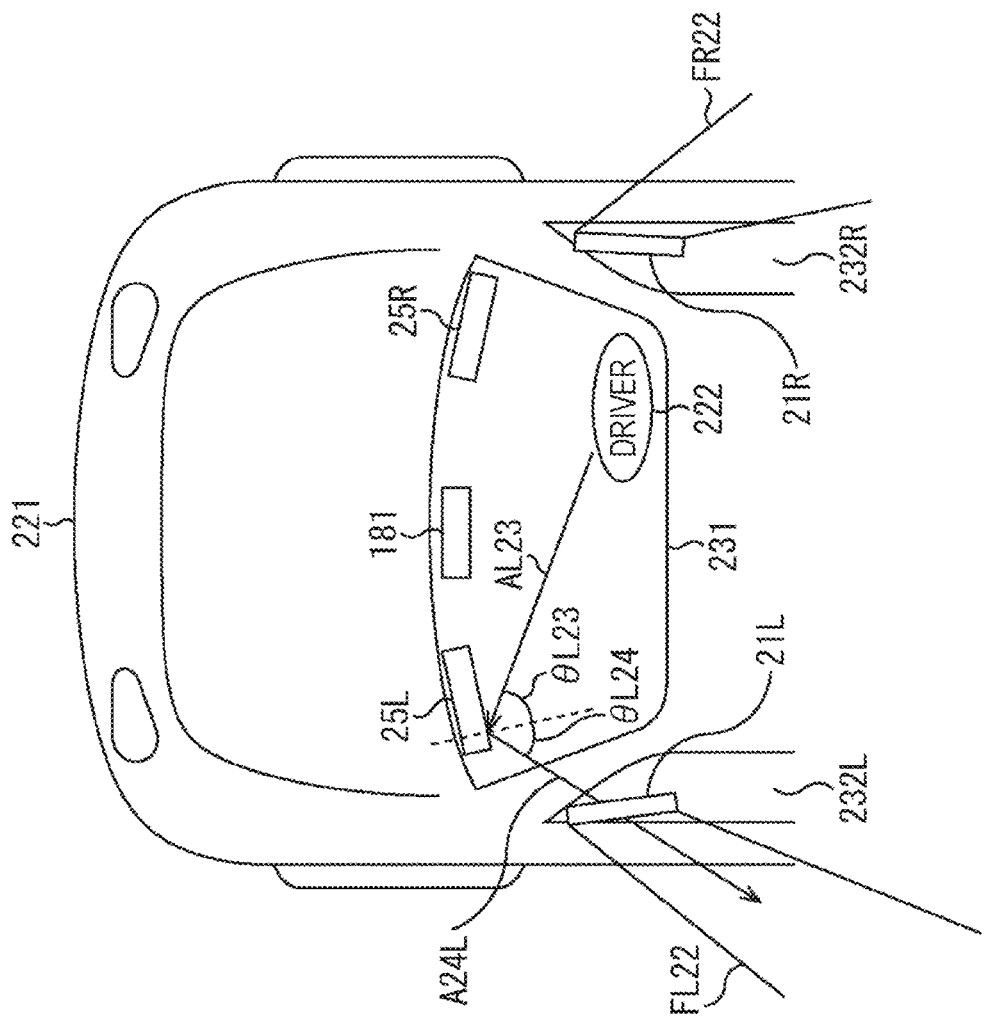
FIG. 32 is a diagram for explaining a method for changing an imaging range.

Accordingly, as shown in FIGS. 31 and 32, the pixels PLb and the pixels PLc of the imaging device 121 enable imaging of different fields of view FL21 and FL22 in the frontward and rearward directions of the vehicle 221.

Specifically, FIG. 31 shows the field of view FL21 to be imaged by each pixel PLb of the imaging device 121L. Note that an arrow AL21 indicates the line-of-sight direction of the driver 222, and an arrow AL22 indicates the imaging direction of each pixel PLb of the imaging device 121L. An angle θL21 indicates the incident angle of the line of sight AL21 of the driver 222 with respect to the display surface of the display unit 25L. An angle θL22 indicates the angle of the imaging direction AL22 with respect to the display surface of the display unit 25L.

FIG. 32 shows the field of view FL22 to be imaged by each pixel PLv of the imaging device 121L. Note that an arrow AL23 indicates the line-of-sight direction of the driver 222, and an arrow AL24 indicates the imaging direction of each pixel PLc of the imaging device 121L. An angle θL23 indicates the incident angle of the line of sight AL23 of the driver 222 with respect to the display surface of the display unit 25L. An angle θL24 indicates the angle of the imaging direction AL24 with respect to the display surface of the display unit 25L. The field of view FL22 is shifted toward the rear of the vehicle 221 from the field of view FL21.

Note that, although not specifically described, the imaging device 121 of the camera module 21R also include two kinds of pixels that are capable of imaging different fields of view FR21 (FIG. 31) and FL22 (FIG. 32) in the frontward/rearward direction of the vehicle 221.

<Electronic Sideview Mirror Display Control Process>

Figure 33:
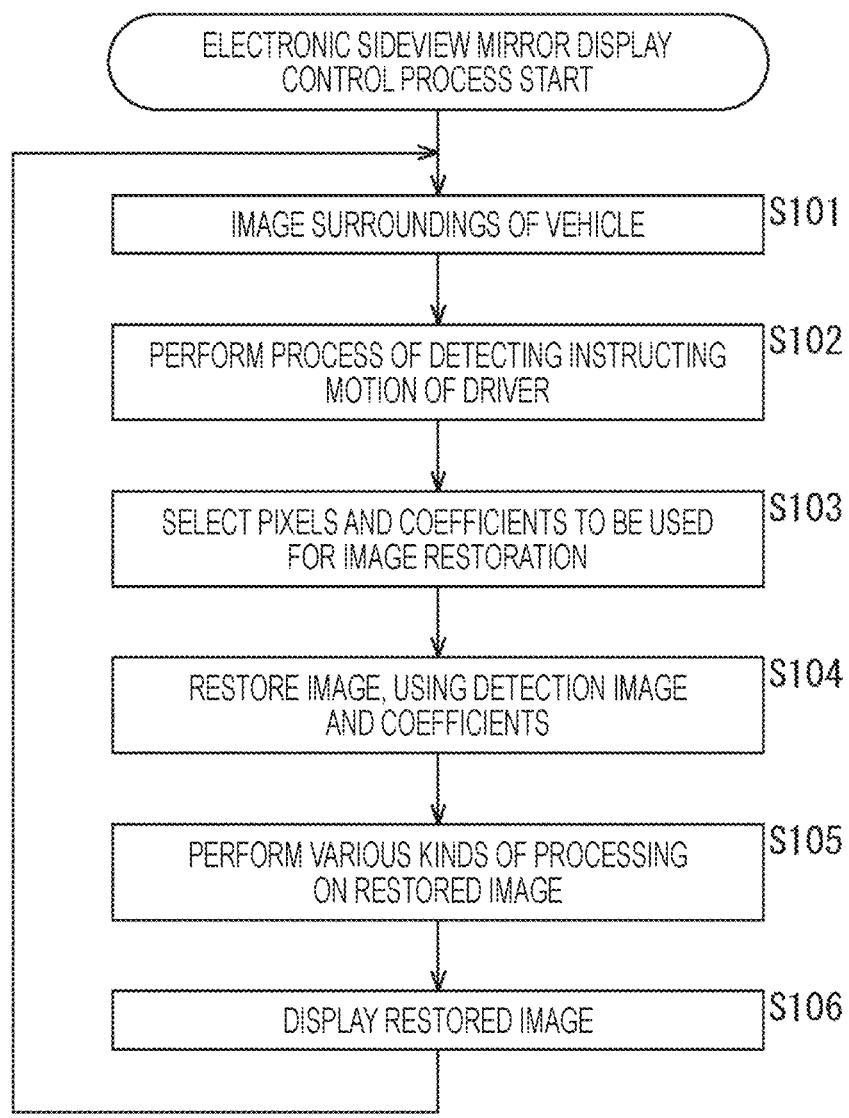
FIG. 33 is a flowchart for explaining the second embodiment of an electronic sideview mirror display control process.

Next, an electronic sideview mirror display control process to be performed by the in-vehicle system 11 according to the second embodiment of the present technology is described with reference to a flowchart shown in FIG. 33.

This process is started when the power supply to the vehicle 221 is turned on, and is ended when the power supply is turned off, for example.

Note that, although a process of displaying a left-side image obtained by the camera module 21L on the display unit 25L is described below, a similar process is performed in a case where a right-side image obtained by the camera module 21R is displayed on the display unit 25R.

In step S101, imaging of the surroundings of the vehicle 221 is performed in a manner similar to the process in step S1 in FIG. 21.

Figure 22:
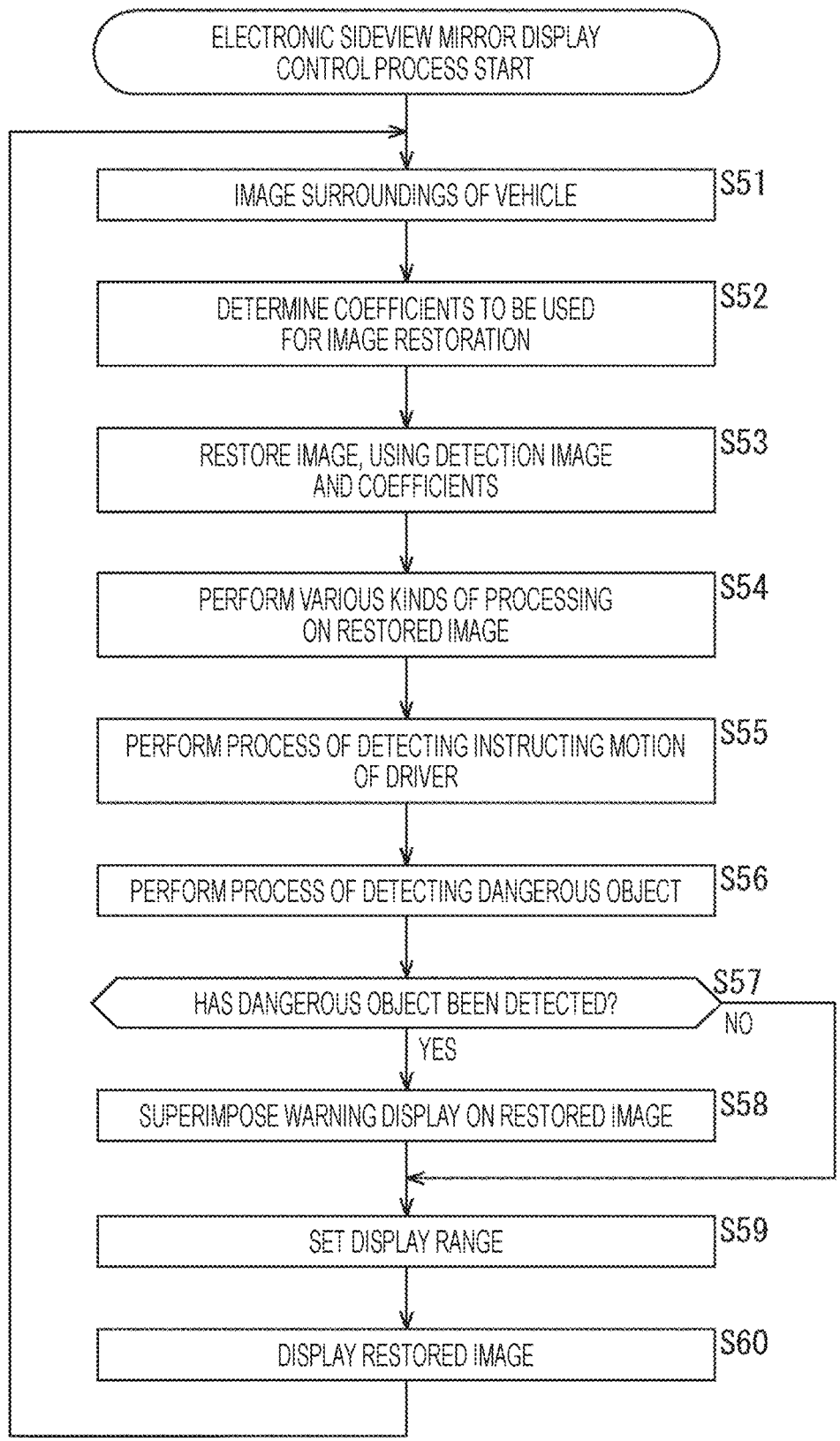
FIG. 22 is a flowchart for explaining a second embodiment of an electronic sideview mirror display control process.

In step S102, a process of detecting the driver's instructing motion is performed in a manner similar to that in the process in step S55 in FIG. 22.

In step S103, the restoration unit 122L selects pixels and coefficients to be used for image restoration.

For example, in a case where the pixels to be used for image restoration are selected on the basis of an instructing motion depending on the line-of-sight direction of the driver, pixels whose angle of the imaging direction with respect to the display surface of the display unit 25L is closer to the incident angle of the line of sight of the driver 222 with respect to the display surface of the display unit 25L are selected from the pixels PLb and the pixels PLc.

For example, the angle θL22 of the imaging direction AL22 formed by each pixel PLb of the imaging device 121L in FIG. 31 is closer to the incident angle θL21 of the line of sight AL21 of the driver 222 in FIG. 31 than the angle θL24 of the imaging direction AL24 formed by each pixel PLc of the imaging device 121L in FIG. 32. Therefore, the pixels PLb are selected in accordance with the line of sight AL21 of the driver 222.

On the other hand, for example, the angle θL24 of the imaging direction AL24 formed by each pixel PLc of the imaging device 121L in FIG. 32 is closer to the incident angle AL23 of the line of sight AL23 of the driver 222 in FIG. 32 than the angle θL22 of the imaging direction AL22 formed by each pixel PLb of the imaging device 121L in FIG. 31. Therefore, the pixels PLc are selected in accordance with the line of sight AL23 of the driver 222.

Also, the restoration unit 122L sets the distance to the object surface 102 to be restored, which is the object distance. Note that any method can be adopted as the method for setting the object distance. For example, the restoration unit 122L sets an object distance set by a user, or an object distance detected by various sensors as the distance to the object surface 102 to be restored.

Next, the restoration unit 122L reads, from the storage unit 124L, the coefficient set group associated with the selected pixels and the set object distance.

In steps S104 and S105, processes similar to those in steps S3 and S4 in FIG. 21 are performed.

In step S106, the display unit 25L displays the restored image, under the control of the display control unit 26. That is, the left-side image with the field of view selected in the process in step S103 is displayed on the display unit 25L. As a result, the field of view (display range) of the left-side image displayed on the display unit 25L is appropriately changed on the basis of the instructing motion of the driver 222.

After that, the process returns to step S101, and the processes in steps S101 to S106 are performed.

As the fields of view (the imaging ranges and the display ranges) of side images are appropriately set in the above manner, the driver 222 can check the sides and the rear of the vehicle 221 without having a feeling of strangeness.

Note that, the field of view of a side image may be changed on the basis of a result of dangerous object detection, as in the first embodiment described above.

3. Modifications

The following is a description of modifications of the above described embodiment of the present technology.

<Modifications Relating to the Camera Modules 21>

In the above description, the camera modules 21 are attached to the inside surfaces of side windows of the vehicle 221. However, the camera modules 21 may be attached to the outside surfaces of side windows of the vehicle, for example.

Also, for example, the camera modules 21 may be attached to outer side surfaces of the vehicle 221. For example, the camera modules 21 may be attached to the outside surfaces of pillars or doors.

Figure 34:
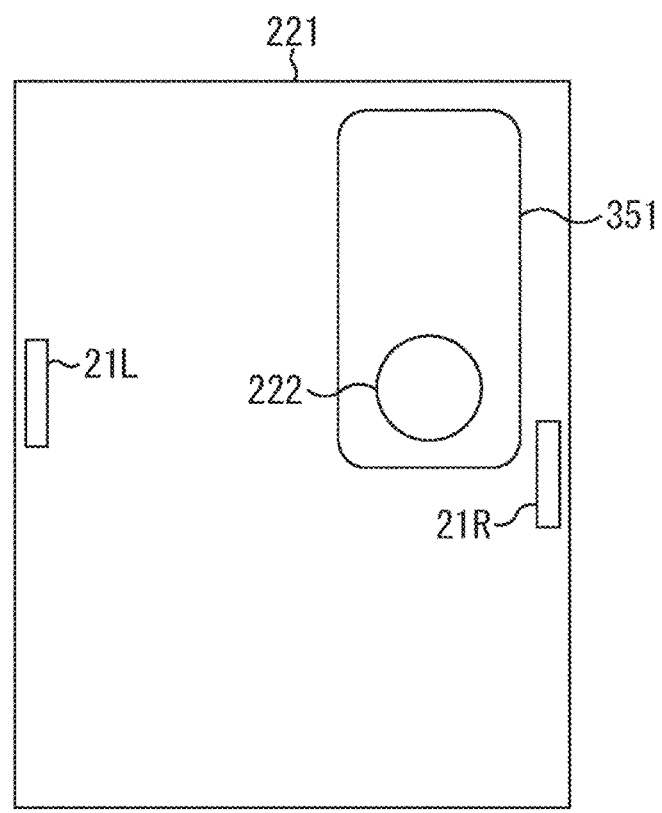
FIG. 34 is a diagram showing an example installation of camera modules.

Further, as described above, the imaging directions of the camera modules 21 can be adjusted with the light shielding patterns of the imaging devices 121. Accordingly, the degree of freedom in an installation position with respect to the field of view to be imaged is high. Furthermore, the imaging direction of the imaging device 121L of the camera module 21L and the imaging direction of the imaging device 121R of the camera module 21R can be set individually of each other. Accordingly, as shown in FIG. 34, for example, the camera module 21L and the camera module 21R are not necessarily attached to the vehicle 221 at symmetrical positions on both sides thereof.

In this example, the camera module 21L is mounted on the left side surface of the vehicle 221 at substantially the same position as the driver 222 in the frontward and rearward directions. The camera module 21R is mounted on the right side surface of the vehicle 221 at substantially the same position as the rear end of the driver seat 351 in the frontward and rearward directions. Accordingly, the camera module 21L is attached to a portion closer to the front than the camera module 21R in the frontward and rearward directions of the vehicle 221.

Also, in the examples described above, an imaging unit 41, and a camera ECU 42 and an MCU 43 are provided on two different semiconductor chips. However, other configurations can be adopted. For example, the imaging device 121 of the imaging unit 41, and the signal processing control unit 111 of the imaging unit 41, the camera ECU 42, and the MCU 43 may be provided on two different semiconductor chips, or the imaging device 121, the signal processing control unit 111 of the imaging unit 41, and the camera ECU 42 and the MCU 43 may be provided on three different semiconductor chips. Alternatively, the imaging unit 41, the camera ECU 42, and the MCU 43 may be provided on one semiconductor chip, for example.

Further, for example, a camera module 21 may be formed with a semiconductor chip in which the LLC chip 202 and the signal processing chip 203 shown in FIG. 16 are stacked.

Further, for example, the imaging unit 41 or the imaging device 121 may be provided in the vehicle separately from the other components of the camera module 21. With this arrangement, the degree of freedom in the installation position of the imaging unit 41 or the imaging device 121 becomes higher.

Further, two camera modules 21 may be bonded to each other so that the light receiving surfaces face in the opposite direction from each other, for example. The camera module that is formed in this manner and is capable of imaging two sides may be installed at a position similar to that in the example shown in FIG. 17, 34, or the like, so that the inside of the vehicle, as well as the outside of the vehicle, can be imaged.

With this arrangement, the passengers sitting in the passenger and rear seats can be monitored, for example. For example, to maintain safety, a child safety seat may be installed behind the driver seat. In this case, however, the child safety seat is difficult for the driver to see. To counter this, the above-mentioned camera module capable of imaging both sides is installed at the same position as the above-described camera module 21R shown in FIG. 34, for example. Thus, a child sitting in the child safety seat behind the driver seat can be imaged and monitored.

Note that it is also possible to use a lensless camera capable of imaging both front and back surfaces, instead of a module formed by bonding the camera modules 21 to each other. For example, it is also possible to use a lensless camera that is formed by bonding CMOS image sensors each having a predetermined pattern formed with holes to each other. Each of the image sensors performs imaging, using the pattern formed on the other image sensor as the light shielding pattern. Such a lensless camera is capable of two-side imaging This type of lensless camera is specifically described by Tomoya Nakamura and four others in "Super Field-of-View Lensless Camera by Coded Image Sensors, 2019", for example.

Further, in a case where a camera module capable of two-side imaging can only restore one image at a time, imaging the outside of the vehicle and imaging the inside of the vehicle may be switched for each frame. In this case, monitoring the outside of the vehicle is more important, and therefore, the frequency of imaging the outside of the vehicle may be higher than the frequency of imaging the inside of the vehicle.

<Modifications Relating to the Display Units>

The installation positions of the display units 25 are not limited to the example described above, but can be changed.

Figure 35:
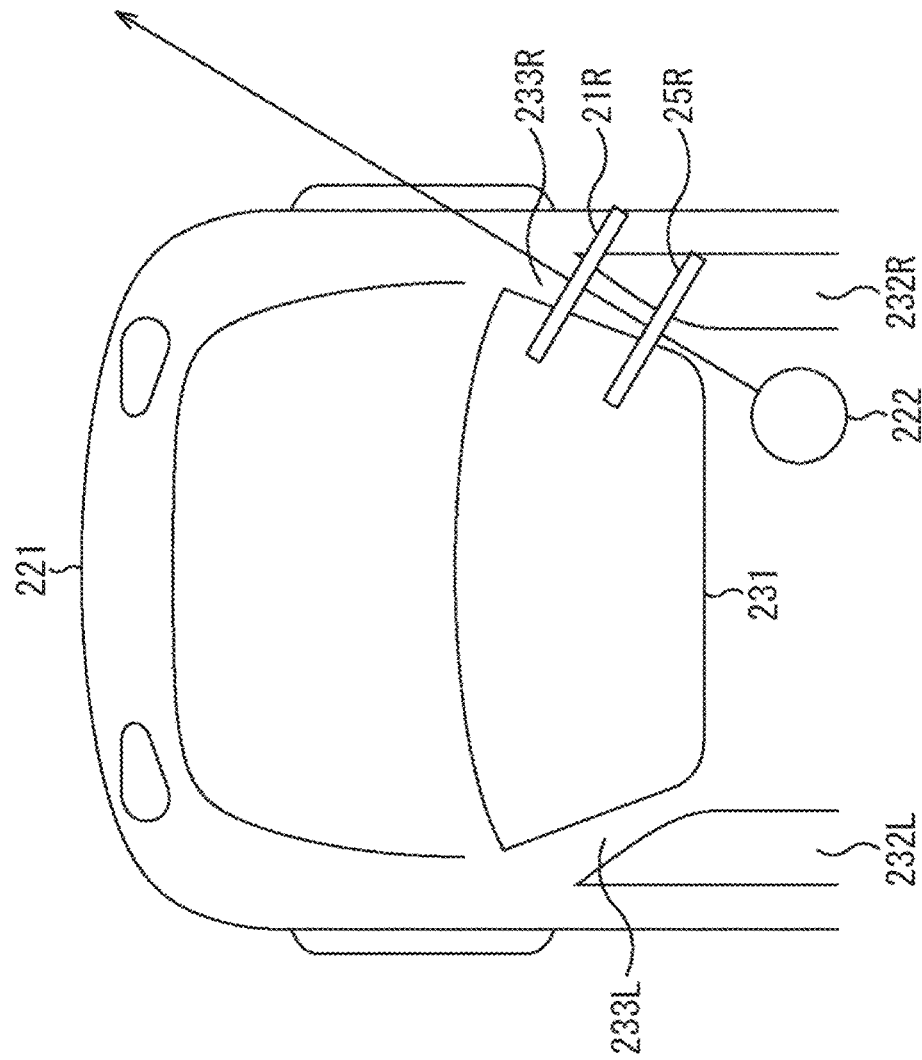
FIG. 35 is a diagram showing an example of installation of a camera module and a display unit.

For example, as shown in FIG. 35, the display unit 25R may be provided on the inside surface of a pillar 233R at the right end of the windshield 231 of the vehicle 221. Likewise, although not shown in any drawing, the display unit 25L may be provided on the inside surface of a pillar 233L at the left end of the windshield 231 of the vehicle 221.

In this case, for example, the camera module 21R may be provided on the outside surface of the pillar 233R, and an image in a direction that cannot be seen from the driver 222 due to the pillar 233R may be captured by the camera module 21R and be displayed on the display unit 25R. Likewise, although not shown in any drawing, the camera module 21L may be provided on the outside surface of the pillar 233L, and an image in a direction that cannot be seen from the driver 222 due to the pillar 233L may be captured by the camera module 21L and be displayed on the display unit 25L.

Furthermore, the display units 25 may not be separated into the right one and the left one. Instead, one display unit may be provided in the center of the front surface of the dashboard of the vehicle 221 so that a left-side image and a right-side image can be displayed separately at the left side and the right side on the one display unit, for example.

Further, in the above-described example shown in FIG. 17, for example, in a case where the driver 222 looks at the display unit 25L or the display unit 25R, he/she does not turn his/her line of sight to the imaging unit 181. Therefore, in a driver image captured by the imaging unit 181, the accuracy of detection in the line-of-sight direction of the driver might decrease.

Figure 36:
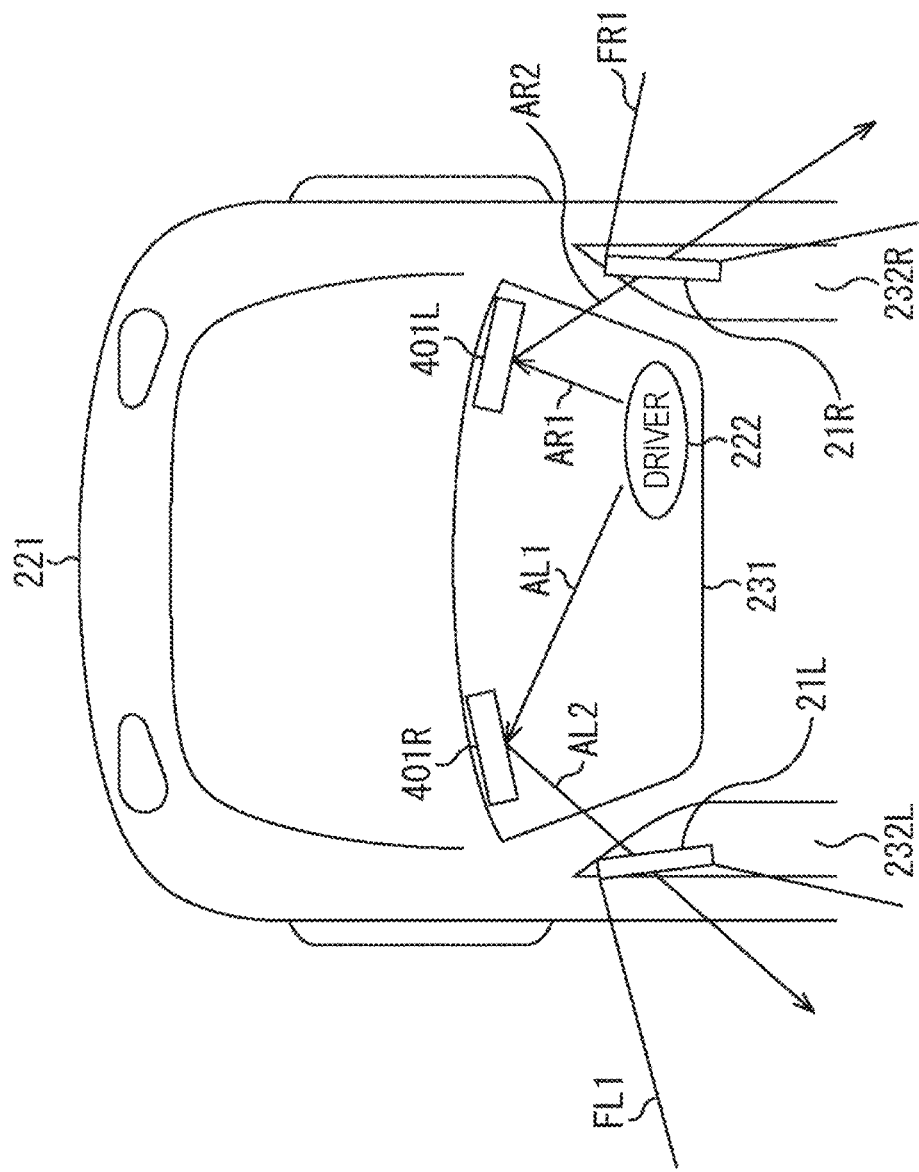
FIG. 36 is a diagram showing a modification of the display units.

On the other hand, as shown in FIG. 36, for example, instead of the display unit 25L and the display unit 25R, a display unit 401L and a display unit 401R may be provided at substantially the same positions as the display unit 25L and the display unit 25R.

The display unit 401L displays a left-side image, and also captures an image of the driver, to supply the obtained driver image to the driver recognition unit 23. On the basis of the obtained driver image, the driver recognition unit 23 monitors the driver, and performs line-of-sight direction detection or the like.

Likewise, the display unit 401R displays a right-side image, and also captures an image of the driver, to supply the obtained driver image to the driver recognition unit 23. On the basis of the obtained driver image, the driver recognition unit 23 monitors the driver, and performs line-of-sight direction detection or the like.

With this arrangement, in a case where the driver looks at the display unit 401L or the display unit 401R, the driver can be imaged from the direction in which the driver directs his/her line of sight, and thus, the accuracy of detection of the driver's line-of-sight direction becomes higher.

Note that the display unit 401L and the display unit 401R will be hereinafter referred to simply as the display units 401 in a case where there is no need to distinguish the display units from each other.

Figure 37:
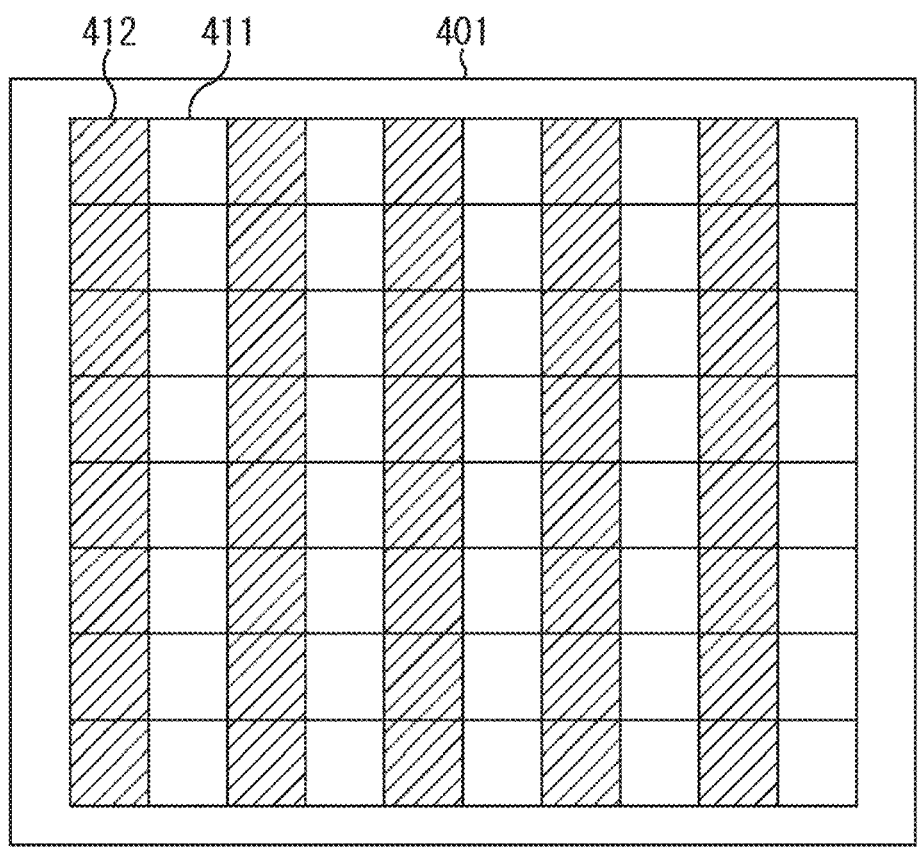
FIG. 37 is a diagram showing an example in which imaging devices are provided in a micro LED display.
Figure 38:
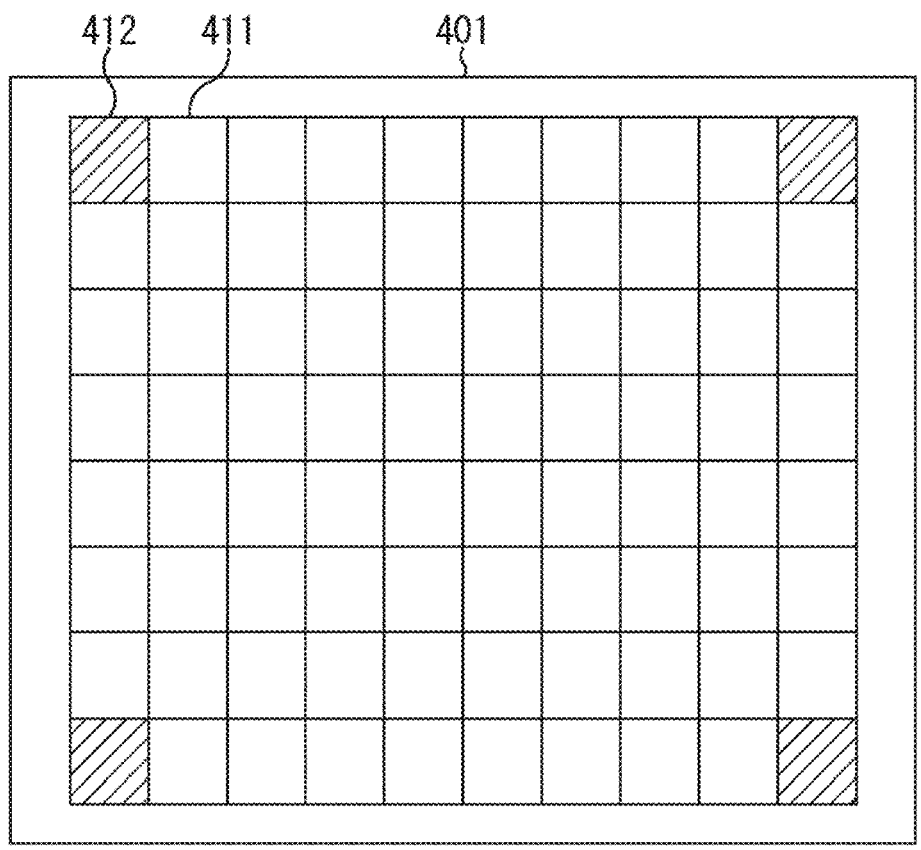
FIG. 38 is a diagram showing an example in which imaging devices are provided in a micro LED display.

FIGS. 37 and 38 show example configurations of the display surface of a display unit 401 in a case where the display unit 401 is formed with a micro LED display having micro LEDs as display elements.

In the example shown in FIG. 37, pixels that include micro LEDs 411 and are represented by white squares, and pixels that include imaging devices 412 and are represented by shaded squares are alternately arranged in an array every other row.

Note that the imaging devices 412 are imaging devices similar to the imaging devices 121.

In the example shown in FIG. 38, imaging devices 412 are provided at the four corners of the region in which pixels including micro LEDs 411 are arranged in a two-dimensional array.

Here, in each pixel of a display unit 401, the area occupied by the micro LED 411, which is a light source, is very small. Accordingly, the imaging devices 412 can be easily disposed in the gaps or the like between the adjacent micro LEDs 411. With this arrangement, the driver can be imaged by the imaging devices 412, while a side image is displayed by the micro LEDs 411.

Note that the display elements are not necessarily micro LEDs. For example, the display elements may be organic EL elements.

<Modifications Relating to the Method for Changing the Display Range for a Side Image>

As described above, the learning unit 183 learns the detecting conditions that serve as the reference for detecting a display change instructing motion. With this arrangement, for example, a motion that the driver does not intend to make is not erroneously detected as a display change instructing motion, the display range of any side image is not changed, any stress is not applied to the driver, and monitoring of a desired region is not hindered. For example, a motion of a driver who moves his/her line of sight to see the person sitting in the passenger seat or a car navigation device, looks back to see a person sitting in the back seat, or raises his/her hand to touch the head can be prevented from being erroneously detected as a display change instructing motion.

Note that, because each driver has a characteristic movement (such as moving with a large motion or being overactive, for example), detecting conditions are preferably learned separately for each driver. For example, the default detecting conditions are initially used, and the detecting conditions are learned and updated on the basis of the driver's reaction in a case where the display range of a side image is changed. For example, in a case where the driver does not respond, the change in the display range is determined to be appropriate (correct). In a case where the driver makes an action to change the display range, the change in the display range is determined to be inappropriate (incorrect). The motion to be made by the driver to change the display range may be a new display change instructing motion, or a manual operation using a button or the like, for example.

Alternatively, a display change instructing motion may be detected, with a condition other than a motion of the driver being taken into consideration, for example. For example, a display change instructing motion may be detected, with a condition such as the velocity of the vehicle, the traveling route, or the traveling state being taken into consideration.

Specifically, for example, when the vehicle is approaching a curve, a wide display range is considered desirable for a side image. Therefore, the detecting conditions may be alleviated so that a display change instructing motion can be easily detected.

Further, in a case where the vehicle is traveling at high speed or is entering an expressway, for example, the driver pays close attention to the front, and therefore, the side image viewing time is very short. In view of this, the detecting conditions may be changed so that the time required for detecting a display change instructing motion is shortened.

Further, for example, the detecting conditions may be learned not only for the driver but also for each region (each country, for example), each vehicle, or each type of vehicle (such as large vehicle, trailer, or small vehicle, for example).

Furthermore, the display range of a side image may be changed, for example, on the basis of a condition other than the driver's display change instructing motion and a result of the dangerous object detection described above.

For example, the display range of a side image may be changed on the basis of a driving operation. For example, the display range of a side image may be changed due to a sudden start, sudden braking, a sudden turn, a retreat, parking, or the like.

Also, in a case where some other sensor detects an alarming object approaching from behind, for example, the display ranges of the side images are changed so that the detected object is displayed as soon as possible.

Further, for example, the display range of a side image may be changed on the basis of the situation around the vehicle. For example, the display range of a side image may be changed on the basis of the width of the road on which the vehicle is traveling, the weather, the brightness of the surroundings, or the like.

Also, the display range of a side image may be changed on the basis of the planned route of the vehicle, for example.

Further, the display range of a side image may be changed by a manual operation such as a button operation, or by a voice command or the like.

<Modifications Relating to the Imaging Devices 121>

Although FIG. 29 shows an example in which two kinds of opening setting regions are set for the imaging devices 121, three or more kinds of opening setting regions may be set.

For example, three or more kinds of opening setting regions having different horizontal positions may be set.

Also, for example, two or more kinds of opening setting regions that differ in at least either height or width may be set.

Further, for example, each imaging device 121 may include pixels having an opening setting region capable of imaging not only in an obliquely rearward direction of the vehicle but also in an obliquely frontward direction of the vehicle.

Also, for example, a drive unit that drives the pixels 121a of the respective fields of view independently of one another may be provided so that imaging by the pixels 121a of the respective fields of view can be performed simultaneously or separately. Further, for example, only the pixels 121a corresponding to the restored image to be used for displaying an electronic sideview mirror may perform imaging. With this arrangement, the processing to be performed by the imaging devices 121 is reduced.

Figure 39:
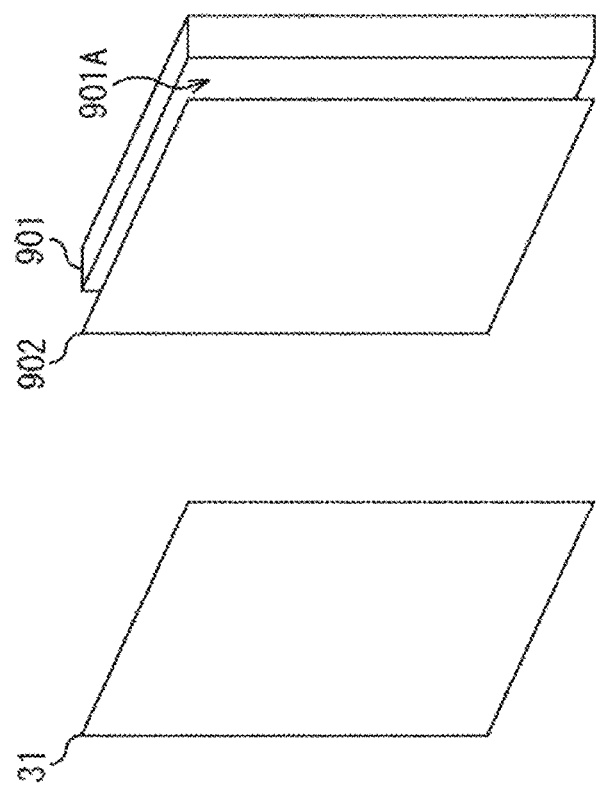
FIG. 39 is a diagram showing a modification of the imaging device.

Further, FIG. 5 shows an example in which the light shielding films 121b are used as modulation elements, or combinations of photodiodes that contribute to outputs are changed, so that different incident angle directivities are provided for the respective pixels. However, according to the present technology, an optical filter 902 covering the light receiving surface of an imaging device 901 may be used as a modulation element so that incident angle directivities are provided for the respective pixels, as shown in FIG. 39, for example.

Specifically, the optical filter 902 is disposed at a predetermined distance from the light receiving surface 901A of the imaging device 901 so as to cover the entire surface of the light receiving surface 901A. Light from the object surface 102 is modulated by the optical filter 902, and then enters the light receiving surface 901A of the imaging device 901.

Figure 40:
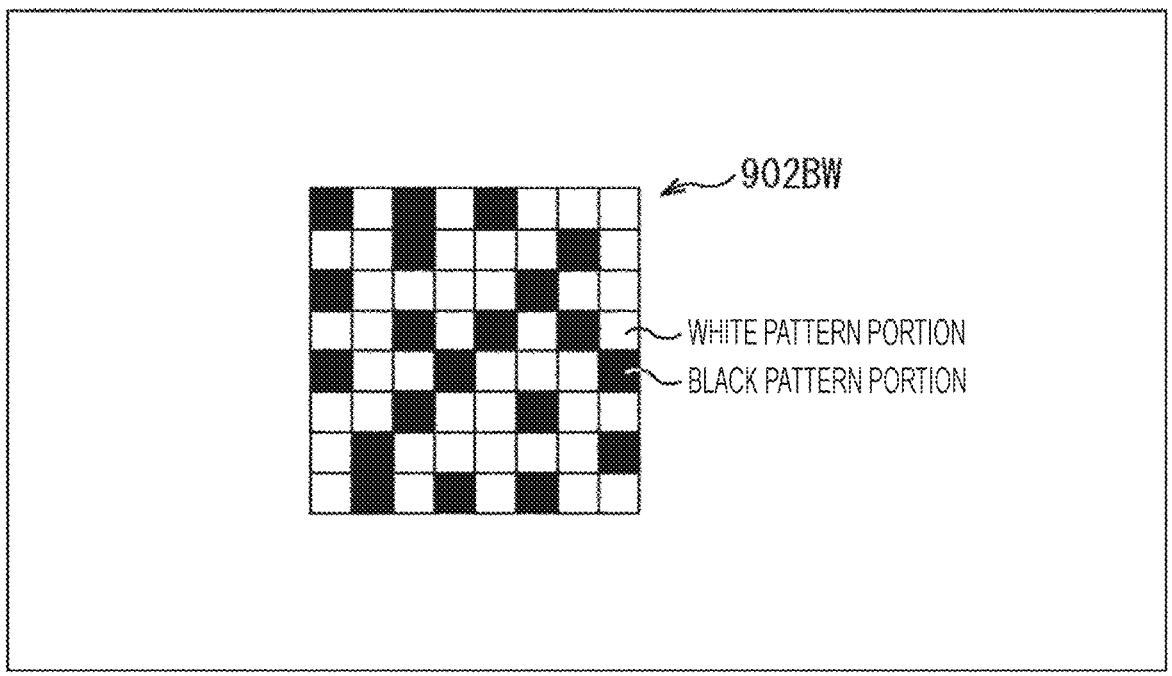
FIG. 40 is a diagram showing a modification of the imaging device.

For example, an optical filter 902BW having a black-and-white lattice pattern shown in FIG. 40 can be used as the optical filter 902. In the optical filter 902BW, white pattern portions that transmit light and black pattern portions that block light are randomly arranged. The size of each pattern is set independently of the size of the pixels of the imaging device 901.

Figure 41:
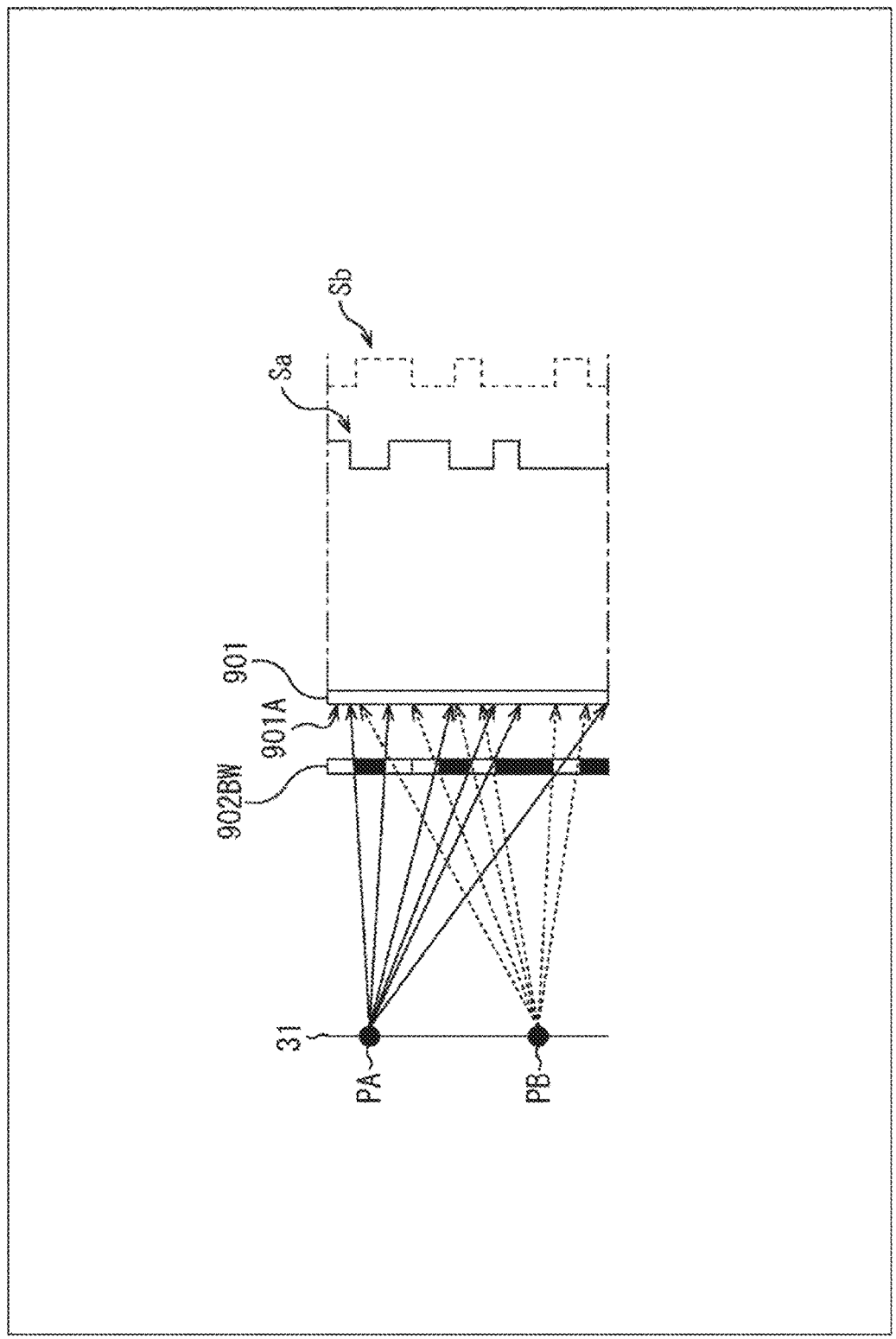
FIG. 41 is a diagram showing a modification of the imaging device.

FIG. 41 shows the light-receiving sensitivity characteristics of the imaging device 901 with respect to light from a point light source PA and a point light source PB on the object surface 102 in a case where the optical filter 902BW is used. Light from each of the point light source PA and the point light source PB is modulated by the optical filter 902BW, and then enters the light receiving surface 901A of the imaging device 901.

The light-receiving sensitivity characteristics of the imaging device 901 with respect to light from the point light source PA are like a waveform Sa, for example. That is, shadows are formed by the black pattern portions of the optical filter 902BW, and therefore, a grayscale pattern is formed in the image on the light receiving surface 901A with respect to the light from the point light source PA. Likewise, the light-receiving sensitivity characteristics of the imaging device 901 with respect to light from the point light source PB are like a waveform Sb, for example. That is, shadows are formed by the black pattern portions of the optical filter 902BW, and therefore, a grayscale pattern is formed in the image on the light receiving surface 901A with respect to the light from the point light source PB.

Note that light from the point light source PA and light from the point light source PB have different incident angles with respect to the respective white pattern portions of the optical filter 902BW, and therefore, differences are generated in the appearance of the grayscale pattern on the light receiving surface. Accordingly, each pixel of the imaging device 901 has an incident angle directivity with respect to each point light source on the object surface 102.

Details of this method are disclosed by M. Salman Asif and four others in "Flatcam: Replacing lenses with masks and computation", "2015 IEEE International Conference on Computer Vision Workshop (ICCVW)", 2015, pp. 663-666, for example.

Figure 42:
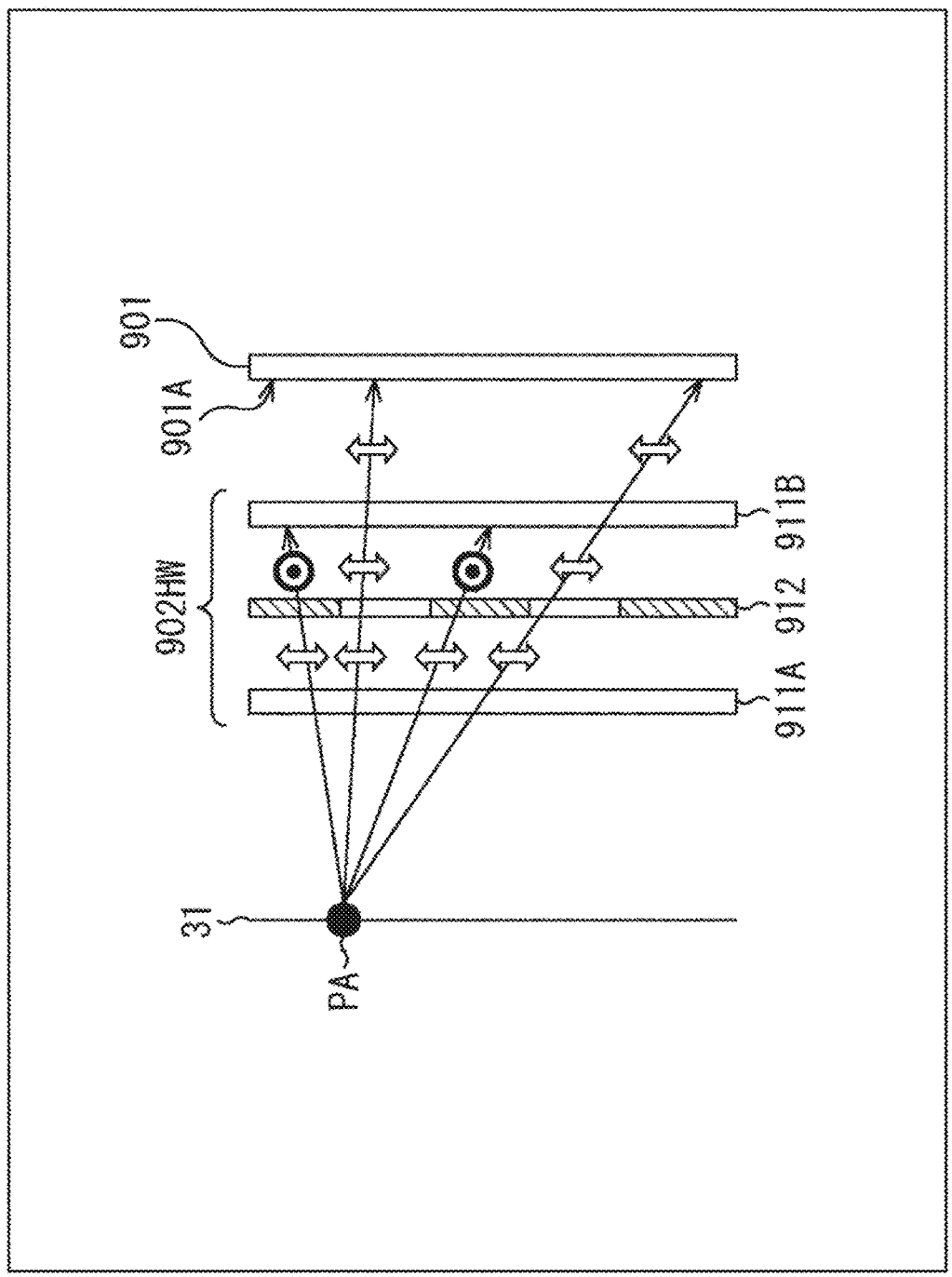
FIG. 42 is a diagram showing a modification of the imaging device.

Note that an optical filter 902HW shown in FIG. 42 may be used, instead of the black pattern portions of the optical filter 902BW. The optical filter 902HW includes a linearly polarizing element 911A and a linearly polarizing element 911B that have the same polarizing direction, and a ½ wavelength plate 912. The ½ wavelength plate 912 is interposed between the linearly polarizing element 911A and the linearly polarizing element 911B. Instead of the black pattern portions of the optical filter 902BW, polarizing portions indicated by shaded portions are provided in the ½ wavelength plate 912, and the white pattern portions and the polarizing portions are randomly arranged.

The linearly polarizing element 911A transmits only light in a predetermined polarizing direction among substantially unpolarized light beams emitted from the point light source PA. In the description below, the linearly polarizing element 911A transmits only light in a polarizing direction parallel to the drawing. Of the polarized light beams transmitted through the linearly polarizing element 911A, polarized light transmitted through the polarizing portions of the ½ wavelength plate 912 changes its polarizing direction to a direction perpendicular to the drawing, as the polarization plane is rotated. On the other hand, of the polarized light beams transmitted through the linearly polarizing element 911A, polarized light transmitted through the white pattern portions of the ½ wavelength plate 912 does not change its polarizing direction that remains parallel to the drawing. The linearly polarizing element 911B then transmits the polarized light transmitted through the white pattern portions, but hardly transmits the polarized light transmitted through the polarizing portions. Therefore, the light amount of the polarized light transmitted through the polarizing portions becomes smaller than that of the polarized light transmitted through the white pattern portions. As a result, a grayscale pattern substantially similar to that in the case with the optical filter BW is formed on the light receiving surface 901A of the imaging device 901.

Figure 43:
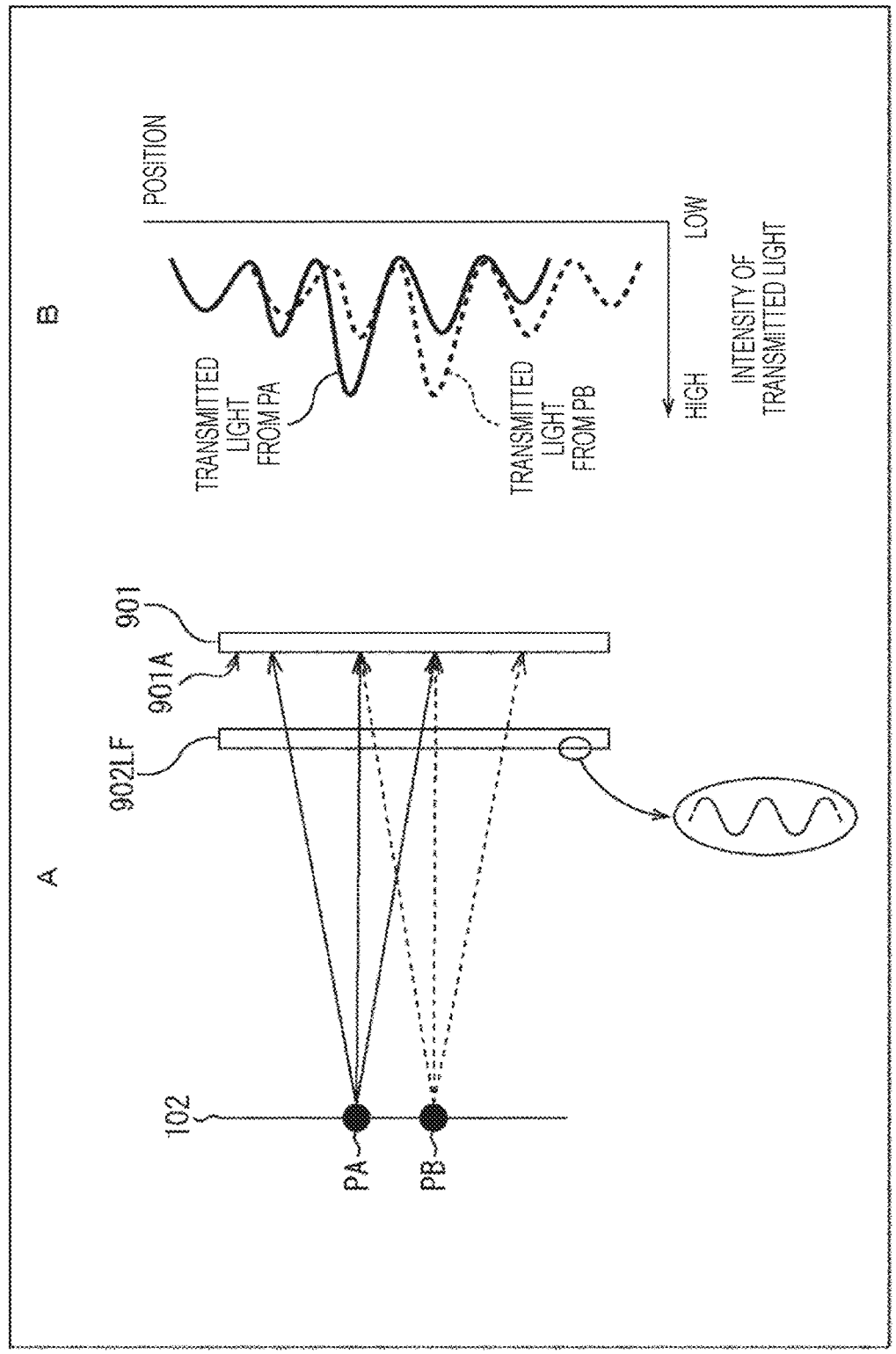
FIG. 43 is a diagram showing a modification of the imaging device.

Further, as shown in A of FIG. 43, an optical interference mask can be used as an optical filter 902LF. Light emitted from the point light sources PA and PB on the object surface 102 is emitted onto the light receiving surface 901A of the imaging device 901 via the optical filter 902LF. As shown in an enlarged view in a lower portion of A of FIG. 43, the light incident face of the optical filter 902LF has irregularities of a size similar to the size of a wavelength, for example. Also, the optical filter 902LF maximizes transmission of light of a specific wavelength emitted from the vertical direction. When the change in the incident angle of light of the specific wavelength emitted from the point light sources PA and PB on the object surface 102 with respect to the optical filter 902LF (or the inclination with respect to the vertical direction) becomes greater, the optical path length changes. Here, when the optical path length is an odd multiple of the half wavelength, light beams weaken each other. When the optical path length is an even multiple of the half wavelength, light beams strengthen each other. That is, as shown in B of FIG. 43, the intensity of transmitted light of the specific wavelength emitted from the point light sources PA and PB and transmitted through the optical filter 902LF is modulated in accordance with the incident angle with respect to the optical filter 902LF, and then enters the light receiving surface 901A of the imaging device 901. Accordingly, the detection signal output from each pixel of the imaging device 901 is a signal obtained by combining the light intensities after modulation of the respective point light sources for each pixel.

Details of this method are disclosed in JP 2016-510910 W, for example.

<Modifications of Dividing of Processes in the In-Vehicle System 11>

The dividing of processes in the in-vehicle system 11 can be changed as appropriate.

For example, the processes to be performed by the driver recognition unit 23 can also be performed by the control unit 27.

For example, the processes to be performed by the alert control unit 24 can also be performed by the control unit 27 or the camera ECUs 42.

For example, the processes to be performed by the restoration unit 122 can also be performed by the camera ECUs 42 or the control unit 27.

Other Modifications

The present technology can be applied to an imaging apparatus and an imaging device that images light of a wavelength other than visible light, such as infrared light. In this case, a restored image is not an image from which the user can visually recognize the object, but an image from which the user cannot visually recognize the object. In this case, the present technology is also used to increase the quality of a restored image in an image processing apparatus or the like that can recognize the object. Note that it is difficult for a conventional imaging lens to transmit far-infrared light, and therefore, the present technology is effective in a case where imaging of far-infrared light is performed, for example. Accordingly, a restored image may be an image of far-infrared light. Alternatively, a restored image is not necessarily an image of far-infrared light, but may be an image of some other visible light or invisible light.

Further, by applying machine learning such as deep learning, for example, it is also possible to perform image recognition and the like using a detection image before restoration, without a restored image. In this case, the present technology can also be used to increase the accuracy of image recognition using a detection image before restoration. In other words, the image quality of the detection image before restoration becomes higher.

In this case, the camera ECU 42L and the camera ECU 42R in FIG. 1 perform image recognition using the detection image, for example.

4. Other Aspects

The series of processes described above can be performed by hardware, and can also be performed by software. In a case where the series of processes are to be performed by software, the program that forms the software is installed into a computer. Here, the computer may be a computer (such as the control unit 123, for example) incorporated in dedicated hardware.

The program to be executed by the computer may be recorded on a recording medium as a packaged medium or the like, for example, and be then provided. Alternatively, the program can be provided via a wired or wireless transmission medium, such as a local area network, the Internet, or digital satellite broadcasting.

Note that the program to be executed by the computer may be a program for performing processes in chronological order in accordance with the sequence described in this specification, or may be a program for performing processes in parallel or performing a process when necessary, such as when there is a call.

Further, embodiments of the present technology are not limited to the above described embodiments, and various modifications may be made to them without departing from the scope of the present technology.

For example, the present technology may be embodied in a cloud computing configuration in which one function is shared among a plurality of devices via a network, and processing is performed by the devices cooperating with one another.

Further, the respective steps described with reference to the flowcharts described above may be carried out by one device or may be shared among a plurality of devices.

Furthermore, in a case where a plurality of processes is included in one step, the plurality of processes included in the one step may be performed by one device or may be shared among a plurality of devices.

Note that the present technology may also be embodied in the configurations described below.

(1)

An imaging device including
a plurality of pixels that receives incident light entering from an object after passing through neither an imaging lens nor a pinhole, and each outputs a detection signal indicating an output pixel value modulated in accordance with an incident angle of the incident light,
in which the imaging device is attached to a vehicle so that a light receiving surface faces a side of the vehicle, and an average of centroids of incident angle directivities indicating directivities of the plurality of pixels with respect to the incident angle of the incident light deviates in one direction from a center of the pixel.

(2)

The imaging device according to (1), in which
the plurality of pixels includes a plurality of first pixels in which the incident light enters at different positions from one another in a first region in which the centroid is biased to a front of the vehicle from the center of the pixel, in a state where the imaging device is attached to the vehicle.

(3)

The imaging device according to (2), in which
each of the plurality of pixels includes:
a photoelectric conversion element; and
a light shielding film that blocks part of the incident light from entering the photoelectric conversion element, and
openings of the light shielding films of the plurality of first pixels are located at different positions from one another in the first region.

(4)

The imaging device according to (3), in which
the plurality of pixels further includes a plurality of second pixels in which the openings of the light shielding films are located at different positions from one another in a second region, the second region being different from the first region and being a region in which the centroid is biased in a frontward/rearward direction of the vehicle from the center of the pixel, in a state where the imaging device is attached to the vehicle.

(5)

The imaging device according to any one of (1) to (4), in which
the average of the centroids of the incident angle directivities is biased to the front of the vehicle, in a state where the imaging device is attached to the vehicle.

(6)

The imaging device according to any one of (1) to (5), in which
the imaging device is attached to both sides of the vehicle.

(7)

The imaging device according to (6), in which
the imaging device is attached to the vehicle so that the light receiving surface faces, and contacts or approaches an inside surface of a side window of the vehicle.

(8)

The imaging device according to (6), in which
the imaging device is attached to an outer side surface of the vehicle.

(9)

The imaging device according to any one of (6) to (8), in which
the imaging device is attached to one side of the vehicle at a different position from another imaging device in the frontward/rearward direction of the vehicle, the another imaging device being attached to the other side of the vehicle.

(10)

The imaging device according to any one of (1) to (9), in which
a restored image restored from a detection image based on the detection signals of the plurality of pixels is used for an electronic sideview mirror of the vehicle.

(11)

A display device that is provided diagonally on a left side or a right side in front of a driver inside a vehicle,
the display device including:
 a display surface on which a plurality of display elements is aligned; and
 a plurality of pixels that is provided on the display surface, receives incident light entering from an object after passing through neither an imaging lens nor a pinhole, and each outputs a detection signal indicating an output pixel value modulated in accordance with an incident angle of the incident light.

(12)

The display device according to (11), in which
the display device displays images of a side and a rear side of the vehicle.

(13)

The display device according to (11) or (12), in which
the detection signals of the plurality of pixels are used for detecting a line-of-sight direction of the driver.

(14)

An imaging system including:
an imaging device that includes a plurality of pixels that receives incident light entering from an object after passing through neither an imaging lens nor a pinhole, and each outputs a detection signal indicating an output pixel value modulated in accordance with an incident angle of the incident light, the imaging device being attached to a vehicle so that a light receiving surface faces a side of the vehicle, in which an average of centroids of incident angle directivities indicating directivities of the plurality of pixels with respect to the incident angle of the incident light deviates in one direction from a center of the pixel; and
a display unit that displays a restored image restored from a detection image based on the detection signals of the plurality of pixels.

(15)

The imaging system according to (14), in which
the plurality of pixels includes: a plurality of first pixels in which the incident light enters at different positions from one another in a first region in which the centroid is biased to a front of the vehicle from the center of the pixel, in a state where the imaging device is attached to the vehicle; and a plurality of second pixels in which the incident light enters at different positions from one another in a second region that is a different region from the first region and is a region in which the centroid is biased in a frontward/rearward direction of the vehicle from the center of the pixel.

(16)

The imaging system according to (15), further including
a display control unit that controls display of a restored image restored from a detection image based on the detection signals from the first pixels, and a restored image restored from a detection image based on the detection signals from the second pixels, the display being performed by the display unit.

(17)

The imaging system according to (16), in which
the display control unit changes the restored image displayed by the display unit, on the basis of at least one of a motion of the driver of the vehicle or a result of dangerous object detection.

(18)

The imaging system according to any one of (14) to (17), further including
a display control unit that controls a range of the restored image being displayed by the display unit, on the basis of at least one of a motion of the driver of the vehicle or a result of dangerous object detection.

(19)

The imaging system according to any one of (14) to (18), in which
the display unit includes:
 a display surface on which a plurality of display elements is aligned; and
 a plurality of pixels that is provided on the display surface, receives incident light entering from an object after passing through neither an imaging lens nor a pinhole, and each outputs a detection signal indicating an output pixel value modulated in accordance with an incident angle of the incident light.

(20)

The imaging system according to (19), in which
the detection signals of the plurality of pixels of the display unit are used for detecting a line-of-sight direction of the driver of the vehicle.

Note that the advantageous effects described in this specification are merely examples, and the advantageous effects of the present technology are not limited to them and may include other effects.

REFERENCE SIGNS LIST

11 In-vehicle system
21L, 21R Camera module
23 Driver recognition unit
24 Alert control unit
25L, 25R Display unit
26 Display control unit
27 Control unit
41L, 41R Imaging unit
42L, 42R Camera ECU
121 Imaging device
121a Pixel
122 Restoration unit
123 Control unit
181 Imaging unit
182 Instructing motion detection unit
201 Substrate
202 LLC chip
221 Vehicle
222 Driver
232L, 232R Side window

The invention claimed is:

1. An imaging device comprising:
pixels that each receive incident light entering from an object without first passing through an imaging lens or a pinhole, at least a subset of the pixels having incident angle directivities that are different from one another with respect to an incident angle of the incident light, and each outputting a detection signal indicating an output pixel value modulated differently in accordance with the incident angle of the incident light based on corresponding one of the incident angle directivities, wherein
the imaging device is attached to a vehicle so that a light receiving surface faces a side of the vehicle, and an average of centroids of the incident angle directivities within respective pixels of the subset of the pixels deviates in one direction from a center of each of the respective pixels of the subset of the pixels.

2. The imaging device according to claim 1, wherein
the subset of the pixels includes first pixels each having a first region in which the incident light enters at different positions from one another, and a centroid of the first region is biased to a front of the vehicle from the center of each of the first pixels, in a state where the imaging device is attached to the vehicle.

3. The imaging device according to claim 2, wherein
each of the pixels includes
a photoelectric conversion element, and
a light shielding film that blocks part of the incident light from entering the photoelectric conversion element, the light shielding film having an opening through which the incident light enters the photo electric conversion element, and
respective openings of the light shielding films of the first pixels are located at different positions from one another in the first region.

4. The imaging device according to claim 3, wherein
the subset of the pixels further includes second pixels each having a second region in which respective openings of the light shielding films are located at different positions from one another, the second region being different from the first region and a centroid of the second region being biased in a frontward/rearward direction of the vehicle from the center of each of the second pixels, in a state where the imaging device is attached to the vehicle.

5. The imaging device according to claim 1, wherein
the average of the centroids of the incident angle directivities within the respective pixels of the subset of the pixels is biased to a front of the vehicle, in a state where the imaging device is attached to the vehicle.

6. The imaging device according to claim 1, wherein
the imaging device is attached to both sides of the vehicle.

7. The imaging device according to claim 6, wherein
the imaging device is attached to the vehicle so that the light receiving surface faces, and contacts or is adjacent to an inside surface of a side window of the vehicle.

8. The imaging device according to claim 6, wherein
the imaging device is attached to an outer side surface of the vehicle.

9. The imaging device according to claim 6, wherein
the imaging device is attached to one side of the vehicle at a different position from another imaging device in a frontward/rearward direction of the vehicle, the another imaging device being attached to the other side of the vehicle.

10. The imaging device according to claim 1, wherein
a restored image restored from a detection image based on the detection signal output from each of the pixels is used for an electronic sideview mirror of the vehicle.

11. An imaging system comprising:
an imaging device that includes pixels that each receive incident light entering from an object without first passing through an imaging lens or a pinhole, at least a subset of the pixels having incident angle directivities that are different from one another with respect to an incident angle of the incident light, and each outputting a detection signal indicating an output pixel value modulated differently in accordance with the incident angle of the incident light based on corresponding one of the incident angle directivities, the imaging device being attached to a vehicle so that a light receiving surface faces a side of the vehicle, and an average of centroids of the incident angle directivities within respective pixels of the subset of the pixels deviating in one direction from a center of each of the respective pixels of the subset of the pixels; and
a display that displays a restored image restored from a detection image based on the detection signal output from each of the pixels.

12. The imaging system according to claim 11, wherein
the subset of the pixels includes
first pixels each having a first region in which the incident light enters at different positions from one another, and a centroid of the first region is biased to a front of the vehicle from the center of each of the first pixels, in a state where the imaging device is attached to the vehicle, and
second pixels each having a second region in which the incident light enters at different positions from one another, the second region being different from the first region and a centroid of the second region being biased in a frontward/rearward direction of the vehicle from the center of each of the second pixels.

13. The imaging system according to claim 12, further comprising
display control circuitry configured to control the display to display a first restored image restored from a first detection image based on the detection signal from each of the first pixels, and a second restored image restored from a second detection image based on the detection signal from each of the second pixels.

14. The imaging system according to claim 13, wherein
the display control circuitry is further configured to change the restored image displayed by the display, on the basis of at least one of a motion of the driver of the vehicle or a result of dangerous object detection.

15. The imaging system according to claim 11, further comprising
display control circuitry configured to control a range of the restored image being displayed by the display, on the basis of at least one of a motion of the driver of the vehicle or a result of dangerous object detection.

16. The imaging system according to claim 11, wherein
the display includes
a display surface on which a plurality of display elements is provided, and
a pixels that is provided on the display surface, receives incident light entering from another object without first passing through an imaging lens or a pinhole, and each outputs a detection signal indicating an output pixel value modulated in accordance with an incident angle of the incident light from the another object.

17. The imaging system according to claim 16, wherein the detection signal output from each of the pixels of the display is used for detecting a line-of-sight direction of the driver of the vehicle.

\* \* \* \* \*